(12) United States Patent
Barry et al.

(10) Patent No.: US 6,615,258 B1
(45) Date of Patent: Sep. 2, 2003

(54) INTEGRATED CUSTOMER INTERFACE FOR WEB BASED DATA MANAGEMENT

(75) Inventors: B. Reilly Barry, Colorado Springs, CO (US); Mark A. Chodoronek, Centreville, VA (US); Eric DeRose, Falls Church, VA (US); Mark N. Gonzales, Manassas, VA (US); Angela R. James, Chevy Chase, MD (US); Lynne Levy, Herndon, VA (US); Michael Tusa, Ridgefield, CT (US)

(73) Assignee: Worldcom, Inc., Clinton, MS (US)

( * ) Notice: Subject to any disclaimer, the term of this patent is extended or adjusted under 35 U.S.C. 154(b) by 0 days.

(21) Appl. No.: 09/159,505

(22) Filed: Sep. 24, 1998

Related U.S. Application Data
(60) Provisional application No. 60/060,655, filed on Nov. 1, 1997.

(51) Int. Cl.[7] .............................................. G06F 15/173
(52) U.S. Cl. ........................................ 709/223; 709/229
(58) Field of Search ................................ 709/223–224, 709/217–219, 229; 713/151, 154; 705/40–44, 63, 75, 77; 379/112, 114, 140, 201, 265

(56) References Cited

U.S. PATENT DOCUMENTS

| | | |
|---|---|---|
| 4,160,129 A | 7/1979 | Peyser et al. |
| 4,345,315 A | 8/1982 | Cadotte et al. |
| 4,817,050 A | 3/1989 | Komatsu et al. |
| 4,823,373 A | 4/1989 | Takahashi et al. |
| 4,893,248 A | 1/1990 | Pitts et al. |
| 4,972,504 A | 11/1990 | Daniel, Jr. et al. |
| 5,041,972 A | 8/1991 | Frost |
| 5,075,771 A | 12/1991 | Hashimoto |
| 5,131,020 A | 7/1992 | Liebesny et al. |
| 5,136,707 A | 8/1992 | Block et al. |
| 5,223,699 A | 6/1993 | Flynn et al. |
| 5,228,076 A | 7/1993 | Hopner et al. |
| 5,245,533 A | 9/1993 | Marshall |
| 5,262,760 A | 11/1993 | Iwamura et al. |
| 5,285,494 A | 2/1994 | Sprecher et al. |
| 5,287,270 A | 2/1994 | Hardy et al. |
| 5,313,598 A | 5/1994 | Yamakawa |
| 5,315,093 A | 5/1994 | Stewart |

(List continued on next page.)

FOREIGN PATENT DOCUMENTS

| | | |
|---|---|---|
| EP | 0 809 387 A2 | 5/1997 |
| JP | 09064870 A | 3/1997 |
| WO | WO97/11443 | 3/1997 |
| WO | WO 97/16911 | 5/1997 |
| WO | WO 97/23988 | 7/1997 |
| WO | WO 98/19472 | 5/1998 |
| WO | WO 99/01826 | 1/1999 |

OTHER PUBLICATIONS

"HP and Cisco Deliver Internet Usage Platform and Billing and Analysis Solutions, New Platform and Solutions Allow ISPs and Carriers to Offer Value–added Services", Copyright 1998 Cisco Systems, Inc. http://www.cisco.com/warp/public/146/pressroom/1998/apr98/28.html.

(List continued on next page.)

Primary Examiner—Bunjob Jaroenchonwanit

(57) ABSTRACT

An integrated data management system for providing data management services from an enterprise over the Internet is described. A user interface executable in a customer workstation authenticate the customer's access to the system and presents one or more data management services according a customer entitlement, for the customer to select. Client applications representing the data management services re initiated by the user interface in response to customer selection. Consequently, the customer is enabled at the customer site to request and receive the data management services according to the customer's entitlements in a secure Internet-based computing environment.

63 Claims, 43 Drawing Sheets

U.S. PATENT DOCUMENTS

| | | |
|---|---|---|
| 5,325,290 A | 6/1994 | Cauffman et al. |
| 5,327,486 A | 7/1994 | Wolff et al. |
| 5,361,259 A | 11/1994 | Hunt et al. |
| 5,369,571 A | 11/1994 | Metts |
| 5,452,446 A | 9/1995 | Johnson |
| 5,475,836 A | 12/1995 | Harris et al. |
| 5,481,542 A | 1/1996 | Logston et al. |
| 5,483,596 A | 1/1996 | Rosenow et al. |
| 5,490,060 A | 2/1996 | Malec et al. |
| 5,491,779 A | 2/1996 | Bezjian |
| 5,506,893 A | 4/1996 | Buscher et al. |
| 5,526,257 A | 6/1996 | Lerner |
| 5,530,744 A | 6/1996 | Charalambous et al. |
| 5,533,108 A | 7/1996 | Harris et al. |
| 5,537,611 A | 7/1996 | Rajagopal et al. |
| 5,539,734 A | 7/1996 | Burwell et al. |
| 5,548,726 A | 8/1996 | Pettus |
| 5,551,025 A | 8/1996 | O'Reilly et al. |
| 5,555,290 A | 9/1996 | McLeod et al. |
| 5,563,805 A | 10/1996 | Arbuckle et al. |
| 5,566,351 A | 10/1996 | Crittenden et al. |
| 5,586,260 A | 12/1996 | Hu |
| 5,602,918 A | 2/1997 | Chen et al. |
| 5,610,915 A | 3/1997 | Elliott et al. |
| 5,621,727 A | 4/1997 | Vaudreuil |
| 5,623,601 A | 4/1997 | Vu |
| 5,630,066 A | 5/1997 | Gosling |
| 5,649,182 A | 7/1997 | Reitz |
| 5,650,994 A | 7/1997 | Daley |
| 5,659,601 A | 8/1997 | Cheslog |
| 5,666,481 A | 9/1997 | Lewis |
| 5,671,354 A | 9/1997 | Ito et al. |
| 5,689,645 A | 11/1997 | Schettler et al. |
| 5,692,030 A | 11/1997 | Teglovic et al. |
| 5,692,181 A | 11/1997 | Anand et al. |
| 5,694,546 A | 12/1997 | Reisman |
| 5,696,906 A | 12/1997 | Peters et al. |
| 5,699,403 A | 12/1997 | Ronnen |
| 5,699,528 A | 12/1997 | Hogan |
| 5,706,502 A | 1/1998 | Foley et al. |
| 5,708,780 A | 1/1998 | Levergood et al. |
| 5,710,882 A | 1/1998 | Svennevik et al. |
| 5,721,908 A | 2/1998 | Lagarde et al. |
| 5,721,913 A | 2/1998 | Ackroff et al. |
| 5,727,129 A | 3/1998 | Barrett et al. |
| 5,734,709 A | 3/1998 | DeWitt et al. |
| 5,734,831 A | 3/1998 | Sanders |
| 5,742,762 A | 4/1998 | Scholl et al. |
| 5,742,763 A | 4/1998 | Jones |
| 5,742,768 A | 4/1998 | Gennaro et al. |
| 5,742,905 A | 4/1998 | Pepe et al. |
| 5,745,754 A | 4/1998 | Lagarde et al. |
| 5,754,830 A | 5/1998 | Butts et al. |
| 5,757,900 A | 5/1998 | Nagel et al. |
| 5,764,756 A | 6/1998 | Onweller |
| 5,768,501 A | 6/1998 | Lewis |
| 5,774,660 A | 6/1998 | Brendel et al. |
| 5,778,178 A | 7/1998 | Arunachalam |
| 5,778,377 A | 7/1998 | Marlin et al. |
| 5,781,550 A | 7/1998 | Templin et al. |
| 5,781,632 A | 7/1998 | Odom |
| 5,787,160 A | 7/1998 | Chaney et al. |
| 5,787,412 A | 7/1998 | Bosch et al. |
| 5,790,780 A | 8/1998 | Brichta et al. |
| 5,790,789 A | 8/1998 | Suarez |
| 5,790,797 A | 8/1998 | Shimada et al. |
| 5,793,762 A | 8/1998 | Penners et al. |
| 5,793,964 A | 8/1998 | Rogers et al. |
| 5,796,393 A | 8/1998 | MacNaughton et al. |
| 5,799,154 A | 8/1998 | Kuriyan |
| 5,802,320 A | 9/1998 | Baehr et al. |
| 5,805,803 A | 9/1998 | Birrell et al. |
| 5,812,533 A | 9/1998 | Cox et al. |
| 5,812,654 A | 9/1998 | Anderson et al. |
| 5,812,750 A | 9/1998 | Dev et al. |
| 5,815,080 A | 9/1998 | Taguchi |
| 5,815,665 A | 9/1998 | Teper et al. |
| 5,819,225 A | 10/1998 | Eastwood et al. |
| 5,819,271 A | 10/1998 | Mahoney et al. |
| 5,825,769 A | 10/1998 | O'Reilly et al. |
| 5,825,890 A | 10/1998 | Elgamal et al. |
| 5,826,029 A | 10/1998 | Gore, Jr. et al. |
| 5,826,269 A | 10/1998 | Hussey |
| 5,832,519 A | 11/1998 | Bowen et al. |
| 5,835,084 A | 11/1998 | Bailey et al. |
| 5,844,896 A | 12/1998 | Marks et al. |
| 5,845,067 A | 12/1998 | Porter et al. |
| 5,845,267 A | 12/1998 | Ronen |
| 5,848,233 A * | 12/1998 | Radia et al. ............ 395/187.01 |
| 5,848,396 A | 12/1998 | Gerace |
| 5,848,399 A | 12/1998 | Burke |
| 5,850,517 A | 12/1998 | Verkler et al. |
| 5,852,810 A | 12/1998 | Sotiroff et al. |
| 5,852,812 A | 12/1998 | Reeder |
| 5,862,325 A | 1/1999 | Reed et al. |
| 5,867,495 A | 2/1999 | Elliott et al. |
| 5,870,558 A | 2/1999 | Branton, Jr. et al. |
| 5,875,236 A | 2/1999 | Jankowitz et al. |
| 5,877,759 A | 3/1999 | Bauer |
| 5,881,237 A | 3/1999 | Schwaller et al. |
| 5,883,948 A | 3/1999 | Dunn |
| 5,884,032 A | 3/1999 | Bateman et al. |
| 5,884,312 A | 3/1999 | Dustan et al. |
| 5,892,900 A | 4/1999 | Ginter et al. |
| 5,907,681 A | 5/1999 | Bates et al. |
| 5,909,679 A | 6/1999 | Hall |
| 5,909,682 A | 6/1999 | Cowan et al. |
| 5,915,001 A | 6/1999 | Uppaluru |
| 5,920,542 A | 7/1999 | Henderson |
| 5,923,016 A | 7/1999 | Fredregill et al. |
| 5,930,764 A | 7/1999 | Melchione et al. |
| 5,930,804 A | 7/1999 | Yu et al. |
| 5,933,142 A * | 8/1999 | LaStrange et al. .......... 345/340 |
| 5,937,165 A | 8/1999 | Schwaller et al. |
| 5,938,729 A | 8/1999 | Cote et al. |
| 5,949,976 A | 9/1999 | Chappelle |
| 5,953,389 A | 9/1999 | Pruett et al. |
| 5,956,714 A | 9/1999 | Condon |
| 5,958,016 A | 9/1999 | Chang et al. |
| 5,960,411 A | 9/1999 | Hartman et al. |
| 5,961,602 A | 10/1999 | Thompson et al. |
| 5,963,925 A | 10/1999 | Kolling et al. |
| 5,966,695 A | 10/1999 | Melchione et al. |
| 5,970,467 A | 10/1999 | Alavi |
| 5,974,396 A | 10/1999 | Anderson et al. |
| 5,974,441 A | 10/1999 | Rogers et al. |
| 5,982,864 A | 11/1999 | Jagadish et al. |
| 5,982,891 A | 11/1999 | Ginter et al. |
| 5,983,350 A | 11/1999 | Minear et al. |
| 5,991,733 A | 11/1999 | Aleia et al. |
| 5,991,746 A | 11/1999 | Wang |
| 5,991,806 A | 11/1999 | McHann, Jr. |
| 5,995,948 A | 11/1999 | Whitford et al. |
| 5,999,525 A | 12/1999 | Krishnaswamy et al. |
| 5,999,965 A | 12/1999 | Kelly |
| 5,999,972 A | 12/1999 | Gish |
| 5,999,973 A | 12/1999 | Glitho et al. |
| 6,003,079 A | 12/1999 | Friedrich et al. |
| 6,006,265 A | 12/1999 | Rangan et al. |
| 6,011,844 A | 1/2000 | Uppaluru et al. |
| 6,012,090 A * | 1/2000 | Chung et al. ................ 709/219 |

| | | |
|---|---|---|
| 6,014,647 A | 1/2000 | Nizzari et al. |
| 6,014,702 A | 1/2000 | King et al. |
| 6,018,768 A | 1/2000 | Ullman et al. |
| 6,021,409 A | 2/2000 | Burrows |
| 6,023,762 A | 2/2000 | Dean et al. |
| 6,029,182 A | 2/2000 | Nehab et al. |
| 6,031,904 A | 2/2000 | An et al. |
| 6,032,132 A | 2/2000 | Nelson |
| 6,032,184 A | 2/2000 | Cogger et al. |
| 6,041,325 A | 3/2000 | Shah et al. |
| 6,041,357 A | 3/2000 | Kunzelman et al. |
| 6,044,144 A | 3/2000 | Becker et al. |
| 6,044,362 A | 3/2000 | Neely |
| 6,049,602 A | 4/2000 | Foladare et al. |
| 6,052,450 A | 4/2000 | Allison et al. |
| 6,058,170 A | 5/2000 | Jagadish et al. |
| 6,058,381 A | 5/2000 | Nelson |
| 6,064,667 A | 5/2000 | Gisby et al. |
| 6,065,002 A | 5/2000 | Knotts et al. |
| 6,065,059 A | 5/2000 | Shieh et al. |
| 6,072,493 A | 6/2000 | Driskell et al. |
| 6,073,105 A | 6/2000 | Sutcliffe et al. |
| 6,073,122 A | 6/2000 | Wool |
| 6,073,241 A | 6/2000 | Rosenberg et al. |
| 6,078,891 A | 6/2000 | Riordan et al. |
| 6,078,924 A | 6/2000 | Ainsbury et al. |
| 6,084,953 A | 7/2000 | Bardenheuer et al. |
| 6,085,171 A | 7/2000 | Leonard |
| 6,085,190 A | 7/2000 | Sakata |
| 6,088,451 A | 7/2000 | He et al. |
| 6,088,796 A * | 7/2000 | Cianfrocca et al. ......... 713/152 |
| 6,091,808 A | 7/2000 | Wood et al. |
| 6,094,655 A | 7/2000 | Rogers et al. |
| 6,104,704 A | 8/2000 | Buhler et al. |
| 6,105,131 A * | 8/2000 | Carroll ...................... 713/155 |
| 6,108,700 A | 8/2000 | Maccobee et al. |
| 6,108,782 A | 8/2000 | Fletcher et al. |
| 6,112,238 A | 8/2000 | Boyd et al. |
| 6,112,242 A | 8/2000 | Jois et al. |
| 6,115,040 A | 9/2000 | Bladow et al. |
| 6,115,458 A | 9/2000 | Taskett |
| 6,115,693 A | 9/2000 | McDonough et al. |
| 6,115,737 A | 9/2000 | Ely et al. |
| 6,119,109 A | 9/2000 | Muratani et al. |
| 6,122,258 A | 9/2000 | Brown |
| 6,128,624 A | 10/2000 | Papierniak et al. |
| 6,130,933 A | 10/2000 | Miloslavsky |
| 6,131,095 A | 10/2000 | Low et al. |
| 6,131,116 A * | 10/2000 | Riggins et al. ............. 709/219 |
| 6,134,584 A | 10/2000 | Chang et al. |
| 6,137,869 A | 10/2000 | Voit et al. |
| 6,145,001 A | 11/2000 | Scholl et al. |
| 6,154,744 A | 11/2000 | Kenner et al. |
| 6,161,102 A | 12/2000 | Yanagihara et al. |
| 6,161,126 A | 12/2000 | Wies et al. ................. 709/203 |
| 6,161,128 A | 12/2000 | Smyk |
| 6,163,597 A | 12/2000 | Voit |
| 6,173,311 B1 | 1/2001 | Hassett et al. |
| 6,182,113 B1 | 1/2001 | Narayanaswami |
| 6,205,456 B1 | 3/2001 | Nakao |
| 6,212,506 B1 | 4/2001 | Shah et al. |
| 6,212,558 B1 | 4/2001 | Antur et al. |
| 6,240,450 B1 | 5/2001 | Sharples et al. |
| 6,275,490 B1 | 8/2001 | Mattaway et al. |
| 6,286,050 B1 | 9/2001 | Pullen et al. |
| 6,292,481 B1 | 9/2001 | Voit et al. |
| 6,295,551 B1 | 9/2001 | Roberts et al. |
| 6,377,993 B1 | 4/2002 | Brandt et al. |
| 2001/0001014 A1 | 5/2001 | Akins, III et al. |
| 2001/0003828 A1 | 6/2001 | Peterson et al. |

OTHER PUBLICATIONS

HP Smart Internet, "Transform User Data Into Revenue", Copyright Hewlett–Packard Company, 1999.

HP Smart Internet Usage Analysis Solution, "Transform User Data Into Competitive Advantage", Copyright Hewlett–Packard Company, 1999.

HP/Cisco, Internet Usage Platform, "Transforming Internet Services Into Revenue" ©Hewlett–Packard Co. 1998.

"Release Note for Netflow FlowCollector Release 2.0," ©Jul. 1998 and "Release Notes for Netflow FlowAnalyzer Release 1.0" ©Sep. 1997.

HP Invent, "Capturing the Usage Billing Advantage", Copyright 1994–2001, Hewlett Packard http://www.hp.com/communications/usage/infolibrary/whitepapers/dsforum print.html.

Anonymous, "Call Accounting Products", Teleconnect, vol. 15, No. 3, p. 89, Mar. 1997.

Deixler, Lyle, "Call Accounting Update", Teleconnect, vol. 15, No. 10, p. 87, Oct. 1997.

Deixler, Lyle, "Micro–Tel's Microcall for Windows 95/NT", Teleconnect, vol. 15, No. 12, p. 35, Dec. 1997.

Kenney, Kathleen, "American Management Systems Launces Internet–Based Customer Care and Billing Tool for Telecom Firms", PR Newswire, New York, Oct. 9, 1996, extracted from http://proquest.umi.com on internet Feb. 28, 2002.

Morgan, Rick, "When Used Right, Internet can be Effective Marketing Tool", Madison Capital Times, Madison, WI, Nov. 8, 1996, extracted from http://proquest.umi.com on internet on Feb. 28, 2002.

Edwards, Morris, "The Electronic Commerce Juggernaut", Communication News, Nokomis, Sep. 1997, vol. 34, Issue 9, extracted from http://proquest.umi.com on Internet on Feb. 28, 2002.

"Cryptography and the Internet", www.echonyc.com/~ysue/crypt.html, 1995.

Lee et al., "Supporting Multi–User, Multi–Applet Workspaces in CBE", Computer Supported Cooperative Work 1996, Cambridge, MA.

"Netscape 2.0 Beta Hip or Hype?", www.plant.net.au/innovations/20beta.html, Planet Internet, 1995.

Meterology; Databases, "Inforonics offers controlled access to Web Meterology", Information Today, Apr. 1997, vol. 14 Issue 4, p53, 2p. This article reports that Inforonics has developed a controlled access gateway to MGA (Meteorological and Geoastrophysica).

Rosen,Michele, BPCS steps into new millennium, Midrange Systems; Spring House; May 10, 1996. This article informs about the new release of BPCS Client/Server Software as the most extensive upgrade of the product since 1980s. It incorporates onject tech.

Inoue et al., "Secure Mobile IP Using Security Primitives", IEEE 1997.

Biggs, M., "Help for the Web enhances customer support, reduces help desk load" *Inforworld*, Jun. 16, 1997, v. 19, No. 24, pp. 82+.

Burch, B., "AT&T, MCI to release new management tools", *Network World*, Jan. 17, 1994, p. 19.

Low, C., "Integrating Communication Services", *IEEE Communication Magazine*, Jun. 1997, pp. 164–169.

"McAfee's New 'Self–Service' Help Desk Web Suite Makes PCs Help Desk–Ready", Newswire Association Inc., Oct. 13, 1997.

Niemeyer, R., "Using Web Technologies in Two MLS Environments: A Security Analysis." *IEEE*, pp. 205–214, 1997.

Porter, T., "MCI offers tracking system: Direct Dispatch lets users eye problems remotely", *Service News*, Apr. 1994, p. 17.

Shklar, L., et al., "MetaMagic: Generating Virtual Web Sites Through Data Modeling," http://www.scope.gmd.de/info/www6/posters/714/poster714.html.

Vizard, M. et al., "MCI to Pilot Convergence Billing Service", *InfoWorld*, v. 18, Issue 37, Sep. 9, 1996.

Yager, T., "Mixed Messages", *UNIX Review*, v. 16, n. 2, p. 29, Feb. 1998.

"Carriers Improve Net Management Services", *Communications Week*, May 2, 1994, p. 74.

"Network management; new software platform enhances network management capabilities; MCI ServiceView offers greater cost savings, increased flexibility.", Product Announcement, *Edge*, Oct. 2, 1995, on & about AT&T, v. 10, n. 375, p. 11(1).

He, Taniguchi, "Internet Traffic Control and Management Architecture", IEEE, Oct. 22–24, 1998, pp. s46–03–1–s46–03–5.

Sixth International Conference on Network Protocols, IEEE, Technical Communication Services, Oct. 13–16, 1998, Table of Contents.

Markovich, Robert, "WAN Service Level Management Could Keep Your Feet Out of the Fire, Ensure Carriers Dilligence", Network World, Jul. 7, 1997.

*Computer Networks*, Andrew S. Tanenbaum, pp. 410–412.

"XIIR6.3 (Broadway) Overview", http://www.x.org/broadway.htm.

"Stac Unveils Windows NT 4.0 and Web Browser Support in New ReachOut 7" http://www.stac.com/news/pressrel/pr_ro7_unveil.html.

"Help–Desk Market Seeks Suite Success", Computer Reseller News, Jan. 5, 1998, p. 49.

\* cited by examiner

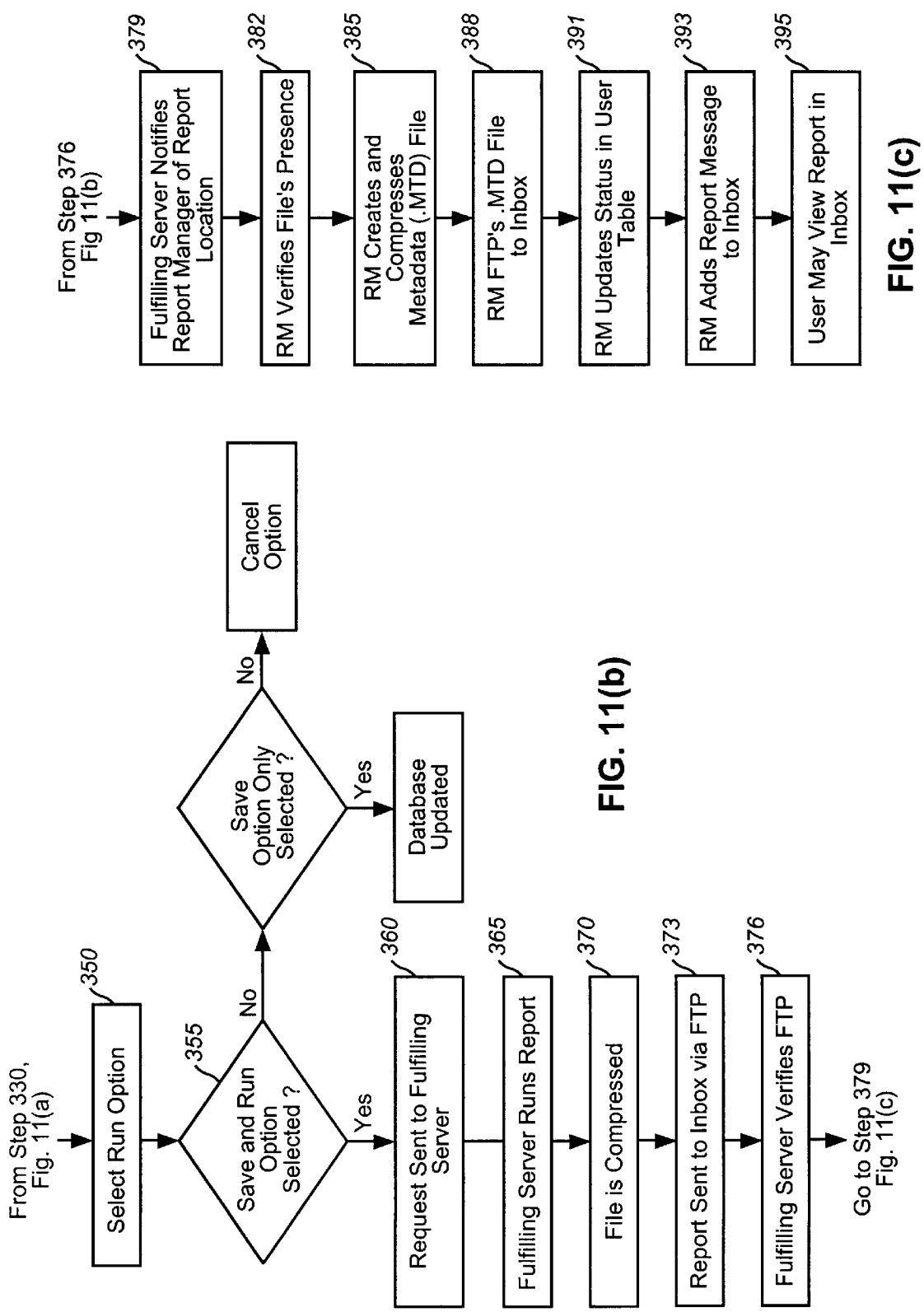

FIG. 15

```
Invoice: 061546245                                    _ □ ×
File  Find  Page  View  Help
Find  Back  Next  Retrieve  Print  Help  Cust. Service
```

SUMMARY OF AMOUNT DUE

CITICORP USCPG (CORP. FEATURE)        BILLING PERIOD 06/01/98 THROUGH 06/30/98
12355 SUNRISE VALLEY DRIVE ATTN: INVOICE ADMINISTRATION
RESTON, VA 22091

CUSTOMER NUMBER 99991477     BILL PAYER Y0051360     NODE NO. 00099156

|  | CORPORATE LEVEL CHARGES | LOCATION LEVEL CHARGES |
|---|---|---|
| DESCRIPTION | | |
| CURRENT CHARGES UNDER CITICORP/MCI/CITIBANK SD 99991477/99991477 | | |
| LONG DISTANCE USAGE CHARGES* | | |
| DOMESTIC | $0.00 | $0.00 |
| INTERNATIONAL DDD | 0.00 | 0.00 |
| CUSTOMIZED ANNOUNCEMENTS | 0.00 | 0.00 |
| DIRECTORY ASSISTANCE | 0.00 | 0.00 |
| TOTAL | $0.00 | $0.00 |
| NON-USAGE | | |
| FEATURES | $0.00 | $0.00 |
| SUPPLEMENTAL CHARGES | 0.00 | 0.00 |
| ALLOCATED CHARGES*** | 35,000.53 | 0.00 |
| MISCELLANEOUS**** | 0.00 | 0.00 |

Page: 1 (in range 1 to 3)

FIG. 20

INTEGRATED CUSTOMER INTERFACE FOR WEB BASED DATA MANAGEMENT

CROSS-REFERENCE TO RELATED APPLICATIONS

The following patent application is based on and claims the benefit of U.S. Provisional Patent Application Ser. No. 60/060,655 filed Nov. 1, 1997, entitled INTEGRATED CUSTOMER INTERFACE SYSTEM FOR COMMUNICATIONS MANAGEMENT.

BACKGROUND OF THE INVENTION

1. Field of the Invention

The present invention relates in general to a data processing system and more particularly to a system for providing data management services over the Internet.

2. Background Art

In conventional customer enabled reporting and data management systems, a connection is made with a large legacy system via a dial-up connection from a customer owned personal computer or work station. This connection frequently, although not always, emulates a terminal addressable by the legacy system. The dial-up access requires custom software on the customer workstation to provide dial-up services, communication services, emulation and/or translation services and generally some resident custom form of the legacy application to interface with the mid range or mainframe computer running the legacy system.

There are several problems associated with this approach:

First, the aforementioned software is very hardware specific, and customers generally have a wide range of workstation vendors, which requires extensive inventory for distribution, and generally, intensive customer hand holding through initial setup and installation before reliable and secure sessions are possible. If the customer hardware platform changes through an upgrade, most of these issues need renegotiation.

Secondly, dial-up, modem, and communications software interact with each other in many ways which are not always predictable to a custom application, requiring extensive trouble shooting and problem solving for an enterprise wishing to make the legacy system available to the customer, particularly where various telephone exchanges, dialing standards or signal standards are involved.

Third, when an enterprise wishes to make more than one system available to the customer, the custom application for one legacy system is not able to connect to a different legacy system, and the customer must generally logoff and logon to switch from one to the other. The delivery technology used by the two legacy systems may be different, requiring different interface standards, and different machine level languages may be used by the two systems, as for example, the 96 character EBCDIC language used by IBM, and the 127 character ASCII language used by contemporary personal computers.

Finally, the security and entitlement features of the various legacy systems may be completely different, and vary from system to system and platform to platform.

It is therefore desired to provide connectivity to enterprise legacy systems providing data management services over the public Internet, as the Internet provides access connectivity world wide via the TCP/IP protocol, without a need to navigate various telephone exchanges, dialing standards or signal standards.

One such type of legacy system is used for a telecommunications industry and provides a data reporting services to larger customers of the enterprise. In the context of telecommunications services and products offered by large telecommunications network service providers for their customers, the assignee of the present invention, MCI, has deployed an MCI ServiceView ("MSV") platform comprising a number of independent legacy systems enabling dial-up connectivity for those customers desiring to obtain the following network management service and reporting data pertaining to their telecommunications networks: priced call detail data and reporting; toll-free network manager "800NM" call routing data; outbound network management data; trouble ticket information; fault manager alarms. Limited interactive toll free network control is additionally supported whereby customers may change the configuration of their toll-free networks and "virtual" networks, i.e., Vnet networks. In addition to the MSV platform, the present assignee has implemented a variety of stand alone applications including: a Traffic View system enabling customers to perform real-time network traffic monitoring of their toll-free networks, and obtain near-real time call detail data and reports, and, a "Hyperscope" reporting system for providing reports on the performance of customers' Broadband (data) networks.

More particularly, MCI's ServiceView platform ("MSV") provides for the generation of Toll-free Network Management data, priced call detail ("Perspective") data for usage analysis and trending, each of which requires a different reporting mechanism due to the nature of the data being presented. Such reporting systems typically do not provide any report customization or presentation options for the customer, and any reporting customization is provided by an application specific program running on the client workstation. Furthermore, such systems do not readily provide for the scheduling of periodic or ad hoc "one-shot" reports.

Thus, what is needed is a comprehensive system that provides customers with simplified access to a data management relating to products and/or services provided by an enterprise. This comprehensive system should not be limited in its application to enterprises which provide telecommunications network management services, but should be generally applicable in enterprises offering various products and services, such as manufacturing industries, utilities companies, and/or enterprises providing courier services, etc., providing the customers with a standard online access and management tools to the various information and data relating to the services and/or products to which they have subscribed from the enterprise.

The rapid adoption and use of the Internet for data exchange has prompted a desire on the part of customers to access their data over the Internet. The popularity of the public Internet provides a measure of platform independence for the customer, as the customer can run their own Internet Web-browser and utilize their own platform connection to the Internet to enable service. This resolves many of the platform hardware and connectivity issues in the customers favor, and lets the customer choose their own platform and operating system. Web-based programs can minimize the need for training and support since they utilize existing client software which the user has already installed and already knows how to use, i.e., the browser. Further, if the customer later changes that platform, then, as soon as the new platform is Internet enabled, service is restored to the customer. The connectivity and communications software burden is thus resolved in favor of standard and readily available hardware and the browser and dial-up software used to obtain and establish a public Internet connection.

An Internet delivered paradigm obviates many of the installation and configuration problems involved with initial setup and configuration of a customer workstation, since the custom application required to interface with the legacy system can be delivered via the public Internet and run within a standard Web-browser, reducing application compatibility issues to browser compatibility issues.

For the enterprise, the use of off-the-shelf Web browsers by the customer significantly simplifies the enterprise burden by limiting the client development side to screen layouts and data presentation tools that use a common interface enabled by the Web browser. Software development and support resources are thus available for the delivery of the enterprise legacy services and are not consumed by a need for customer support at the work station level.

Thus, it would be highly desirable to provide an integrated system that provides for secure remote connectivity to enterprise legacy systems over the public Internet. The public Internet provides access connectivity world wide via the TCP/IP protocol, without need to navigate various disparate security protocols, telephone exchanges, dialing standards or signal standards, thereby providing a measure of platform independence for the customer.

Furthermore, it would be desirable to provide an Intranet/Internet/Web-based reporting system that provides a common GUI enabling both report requesting, customizing, scheduling and viewing of various types of data from different back-end services and applications.

It would also be highly desirable to provide a Intranet/Internet/Web-based data management system infrastructure capable of providing the enterprise's products and services data to customer's over the Intranet and/or Extranet.

SUMMARY OF THE INVENTION

The present invention is directed to a Web-based, integrated customer interface system for data management. The customer interface system is provided with a graphical user interface for enabling a user to interact with one or more services provided by remote servers located in an Intranet/Extranet of an enterprise providing products and services, and utilizes a Web paradigm to allow easy and convenient access to all of the services from the user's perspective.

In the preferred embodiment, the data management products and services delivered to a client workstation having the integrated customer interface include: 1) report requester, report viewer, and report management applications enabling a customer to request, specify, customize and schedule delivery of reports pertaining to customer's data; 2) centralized inbox system for providing on-line reporting, presentation, and notifications to a client workstation from one or more Intranet application services over an Internet/Intranet network; 3) an operational data storage system implementing a data mart approach for maintaining the data used for customer reporting; 4) a trouble ticket tool enabling a customer to open and monitor trouble tickets relating to products and services provided by an enterprise; 5) a Web-based invoice reporting system allowing the customers access to their billing and invoice reports associated with services provided to a customer; 6) an Internet "online" order entry and administration service to enable customers to manage their accounts; and, 7) a system for handling security and authentication requests from both client and server side of the applications implementing the suite of data management products and services.

Integrated within the customer interface system is an application backplane unit for controlling and managing the overall user interface system to a number of Web enabled application services. By invoking the backplane unit a user may receive a number of disparate services available from the remote servers.

Each remote service provided includes its own user interface unit, referred to as a client application, independently implemented of one another and the backplane. Although the client applications are independently developed as separate modules, the interface of the present invention integrates the client applications into one unified system, allowing users to access the individual client applications via the backplane unit. Thus, the present invention provides interoperability between each of the client applications and the backplane, as well as among each of the client applications.

Accordingly, the present invention provides an integrated customer interface and Web-based delivery system for delivering to customers a number of products and services available from remote servers, wherein separate client applications may communicate with one another and with the backplane unit.

Thus, in accordance with the principles of the invention, there is provided an integrated system for providing one or more data management services relating to products and services provided by an enterprise to customers over the public Internet, the data management services accessible from a client workstation employing a client browser associated with a customer and capable of receiving Web pages from a service/product provider of the data management services. The system includes one or more secure Web servers for managing one or more secure client sessions over the Internet in response to user entry into the system, each Web server supporting secure communications with the client workstation. During the initiation of a customer session, a logon Web page is downloaded to the client workstation from the one or more Web servers. According to the customer's entry on the logon Web page, the customer is authenticated by a remote authentication server, a component of the present invention. The customer is then presented with another Web page, a home page, which includes integrated customer interfaces to remote application services according to pre-determined customer entitlements. Each customer interface is associated with a data management services and enables interactive Web/Internet based communications with the Web servers. Each Web server supports communication of messages entered via the integrated customer interface to one or more remote data management application server providing associated data management capabilities. The messages include: i) requests for information pertaining to a customer's products and/or services, ii) directives for modifying a customer's data assets. The remote data management application server processes the requests or directives and provides responses to the one or more Web server(s) for secure downloading to the customer workstation for display via said integrated interface.

Advantageously, the integrated customer interface implementing an Internet delivered paradigm for data management services obviates many of the installation and configuration problems involved with initial setup and configuration of a dial-up customer workstation, since the custom application required to interface with the legacy system can be delivered via the public Internet and run within a standard Web-browser, reducing application compatibility issues to browser compatibility issues.

Further features and advantages of the present invention as well as the structure and operation of various embodiments of the present invention are described in detail below with reference to the accompanying drawings. In the drawings, like reference numbers indicate identical or functionally similar elements.

BRIEF DESCRIPTION OF THE DRAWINGS

Preferred embodiments of the present invention will now be described, by way of example only, with reference to the accompanying drawings in which like reference numbers indicate identical or functionally similar elements, and in which:

FIGS. 11(a)–11(c) illustrate flow diagrams depicting the report request/scheduling process 600 implemented by WRS Report Manager and Report Requestor tools of the invention;

FIG. 15 is a sample order entry screen 1540 for adding and modifying notification options which are used by the WRS when a notification needs to be sent to a customer;

FIGS. 16(c)–16(l) illustrate examples of Trouble Ticketing application dialog windows enabling user creation and querying of trouble tickets;

FIG. 20 is a sample screen displaying an invoice document generated by the online invoicing system component of the invention;

DETAILED DESCRIPTION OF THE PREFERRED EMBODIMENT OF THE INVENTION

The present invention is an integrated suite of customer data management and report applications using a Web browser paradigm. Such an integrated suite of Web-based applications provides an invaluable tool for enabling customers to manage their business data assets, quickly and securely, from anywhere in the world.

The architecture for the system of the present invention is organized as a set of common components comprising the following:

1) an object-oriented software architecture detailing the client and server based aspect;
2) a network architecture defining the physical network needed to satisfy the security and data volume requirements of the system;
3) a data architecture detailing the application, back-end or legacy data sources; and
4) an infrastructure covering security, order entry, fulfillment, billing, self-monitoring, metrics and support. Each of these common component areas will be generally discussed herein below.

Figure 1:
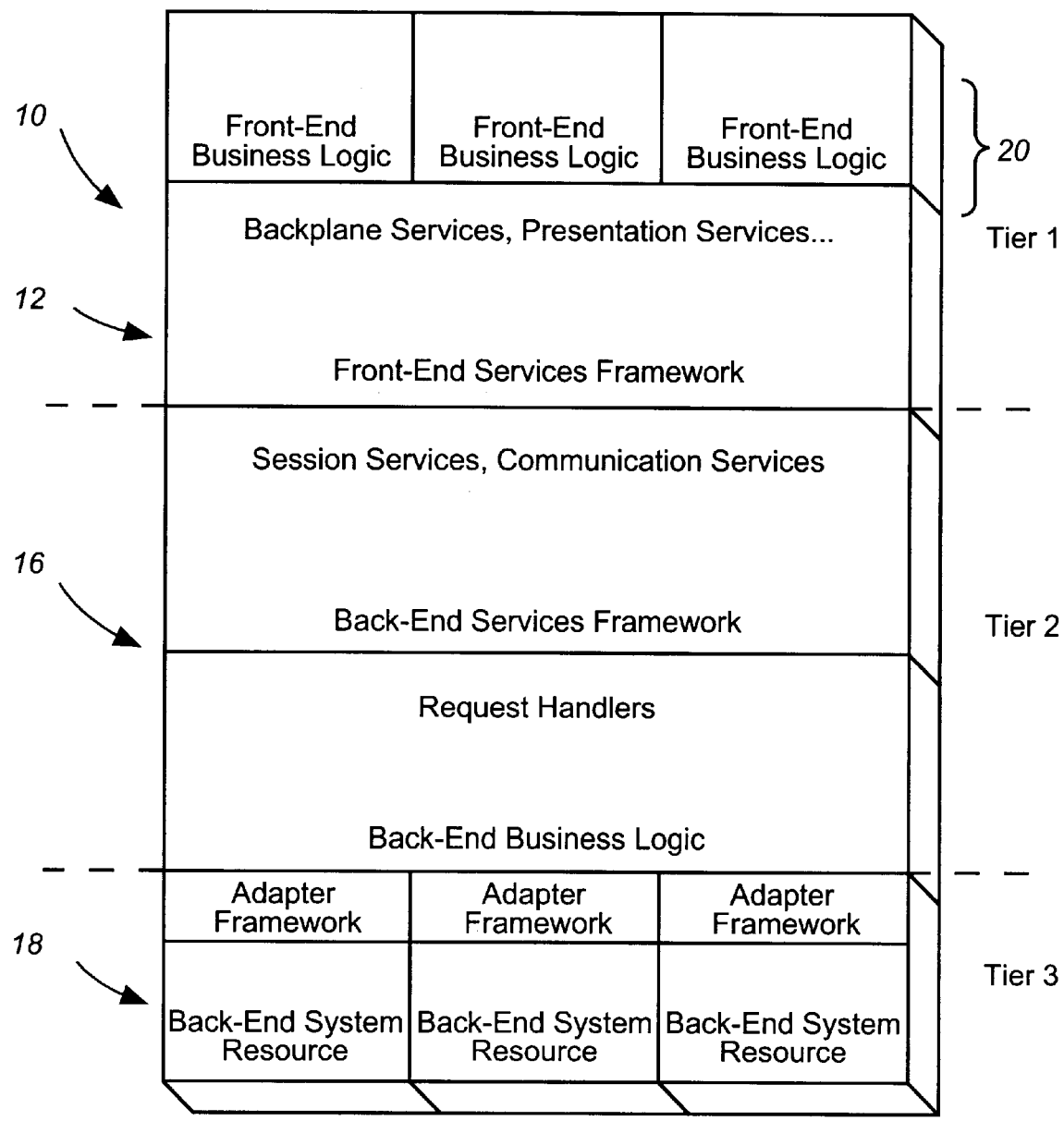
FIG. 1 illustrates the software architecture component comprising a three-tiered structure.

FIG. 1 is a diagrammatic illustration of the software architecture component in which the present invention functions. A first or client tier 10 of software services are resident on a customer workstation 10 and provides customer access to the enterprise system, having one or more downloadable application objects directed to front-end business logic, one or more backplane service objects for managing sessions, one or more presentation services objects for the presentation of customer options and customer requested data in a browser recognizable format and a customer supplied browser for presentation of customer options and data to the customer and for communications over the public Internet. Additional applications are directed to front-end services such as the presentation of data in the form of tables and charts, and data processing functions such as sorting and summarizing in a manner such that multiple programs are combined in a unified application suite.

A second or middle tier 16, is provided having secure Web servers and back-end services to provide applications that establish user sessions, govern user authentication and their entitlements, and communicate with adaptor programs to simplify the interchange of data across the network.

A third or back-end tier 18 having applications directed to legacy back-end services including database storage and retrieval systems and one or more database servers for accessing system resources from one or more legacy hosts.

The customer workstation includes client software capable of providing a platform-independent, browser-based, consistent user interface implementing objects programmed to provide a reusable and common GUI abstraction and problem-domain abstractions. More specifically, the client-tier software is created and distributed as a set of Java classes including the applet classes to provide an industrial strength, object-oriented environment over the Internet. Application-specific classes are designed to support the functionality and server interfaces for each application with the functionality delivered through the system being of two-types: 1) cross-product, for example, inbox and reporting functions, and 2) product specific, for example, online invoice viewing functions. The system is capable of delivering to customers the functionality appropriate to their product mix.

Figure 2:
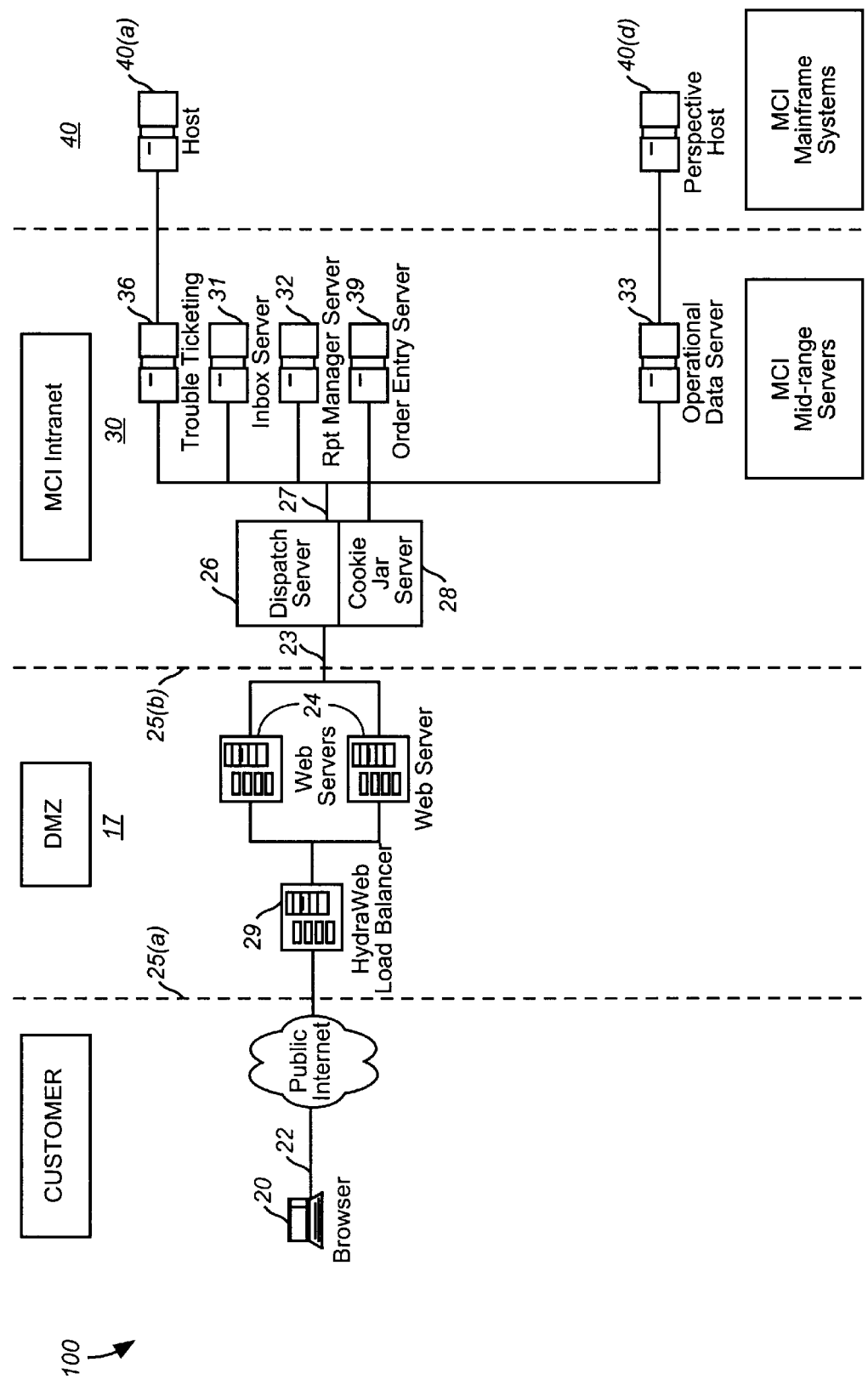
FIG. 2 is a diagrammatic overview of the software architecture of the system of the present invention.

FIG. 2 is a diagrammatic overview of the software architecture of the system of the present invention, including: the Customer Browser (a.k.a. the Client) 20; the Demilitarized Zone (DMZ) 17 comprising a Web Servers cluster 24; the enterprise Intranet Dispatch server 26; and the enterprise Intranet Application servers 30, and the data warehouses, legacy systems, etc. 40.

The Customer Browser 20, is a Web browser which is Java-enabled and includes client applications responsible for presentation and front-end services. Its functions include providing a user interface to various data management services and supporting communications with the enterprise's Web server cluster 24. The client tier software is responsible for presentation services to the customer and generally includes a Web browser 14 and additional object-oriented programs residing in the client workstation platform 20. The client software is generally organized into a component architecture with each component generally comprising a specific application, providing an area of functionality. The applications generally are integrated using a "backplane" services layer 12 which provides a set of services to the application objects that provide the front-end business logic. The backplane services layer 12 also manages the launching of the application objects. The common set of objects provide a set of services to each of the applications. The set of services include: 1) session management; 2) application launch; 3) inter-application communications; 4) window navigation among applications; 5) log management; and 6) version management.

The use of a set of common objects for implementing the various functions provided by the system of the present invention, and particularly the use of browser based objects to launch applications and pass data therebetween is more fully described in the co-pending U.S. patent application Ser. No. 09/159,515, entitled GRAPHICAL USER INTERFACE FOR WEB ENABLED APPLICATIONS, the disclosure of which is incorporated herein by reference thereto.

As shown in FIG. 2, the aforesaid objects will communicate the data by establishing a secure TCP messaging session with one of the DMZ Web servers 24 via an Internet secure communications path 22 established, preferably, with a secure sockets layer (SSL) version of HTTPS. The DMZ Web servers 24 function to decrypt the client message, preferably via the SSL implementation, and unwrap the session key and verify the users session. After establishing that the request has come from a valid user and mapping the request to its associated session, the DMZ Web servers 24 re-encrypt the request using symmetric encryption and forward it over a second socket connection 23 to the dispatch server 26 inside the enterprise Intranet.

As will be hereinafter described in greater detail a customer session is designated by a logon, successful authentication, followed by use of server resources, and logoff. However, the world-wide Web communications protocol uses HTTP, a stateless protocol, each HTTP request and reply is a separate TCP/IP connection, completely independent of all previous or future connections between the same server and client. The system of the present invention is implemented with a secure version of HTTP such as S-HTTP or HTTPS, and preferably utilizes the SSL implementation of HTTPS. The preferred embodiment uses SSL which provides a cipher spec message which provides server authentication during a session. The preferred embodiment further associates a given HTTPS request with a logical session which is initiated and tracked by a "cookie jar server" 28 to generate a "cookie" which is a unique server-generated key that is sent to the client along with each reply to a HTTPS request. The client holds the cookie and returns it to the server as part of each subsequent HTTPS request. As desired, either the Web servers 24, the cookie jar server 28 or the Dispatch Server 26, may maintain the "cookie jar" to map these keys to the associated session. A separate cookie jar server 28, as illustrated in FIG. 2 has been found desirable to minimize the load on the dispatch server 26. This form of session management also functions as an authentication of each HTTPS request, adding an additional level of security to the overall process.

As illustrated in FIG. 2, after one of the DMZ Web servers 24 decrypts and verifies the user session, it forwards the message through a firewall 25b over a TCP/IP connection 23 to the dispatch server 26 on a new TCP socket while the original socket 22 from the browser is blocking, waiting for a response. The dispatch server 26 unwraps an outer protocol layer of the message from the DMZ services cluster 24, and re-encrypts the message with symmetric encryption and forwards the message to an appropriate application proxy via a third TCP/IP socket 27. While waiting for the proxy response all three of the sockets 22, 23, 27 block on a receive. Specifically, once the message is decrypted, the wrappers are examined to reveal the user and the target middle-tier (Intranet application) service for the request. A first-level validation is performed, making sure that the user is entitled to communicate with the desired service. The user's entitlements in this regard are fetched by the dispatch server 26 from the Order Entry (OE) server 49, the server component of the present invention, at logon time and cached.

If the requestor is authorized to communicate with the target service, the message is forwarded to the desired service's proxy. Each application proxy is an application specific daemon which resides on a specific Intranet server, shown in FIG. 2 as a suite of mid-range servers 30. Each Intranet application server of suite 30 is generally responsible for providing a specific back-end service requested by the client, and, is additionally capable of requesting services from other Intranet application servers by communicating to the specific proxy associated with that other application server. Thus, an application server not only can offer its browser a client to server interface through the proxy, but also may offer all its services from its proxy to other application servers. In effect, the application servers requesting services are acting as clients to the application servers providing the services. Such mechanism increases the security of the overall system as well as reducing the number of interfaces.

The network architecture of FIG. 2 may also include a variety of application specific proxies having associated Intranet application servers including: a OE proxy for the OE application server 39 for handling authentication, order entry, and billing; an Inbox proxy for the Inbox application server 31, which functions as a container for completed reports, marketing news messages, and any other detail data which may be necessary for presentation to the customer; a Report Manager proxy capable of communicating with a system-specific Report Manager server 32 for generation, management and receipt notification of customized reports; a Report Scheduler proxy for performing the scheduling and requests of the customized reports.

As partially shown in FIG. 2, it is understood that each Intranet server of suite 30 communicates with one or several consolidated databases which include each customer's data management information. For example, the Services Inquiry server 36 includes communication with the enterprise's Customer Service Management legacy platform 40(a). Such network management and customer network data is additionally accessible by authorized management personnel. As shown in FIG. 2, other legacy platforms, e.g. 40(d), may also communicate individually with the Intranet servers for servicing specific transactions initiated at the client browser. The illustrated legacy platforms 40(a),(d) are illustrative only and it is understood other legacy platforms may be interpreted into the network architecture illustrated in FIG. 2 through an intermediate mid-range server 30.

Each of the individual proxies may be maintained on the dispatch server 26, the related application server, or a separate proxy server situated between the dispatch server 26 and the mid-range server 30. The relevant proxy waits for requests from an application client running on the customer's workstation 10 and then services the request, either by handling them internally or forwarding them to its associated Intranet application server 30. The proxies additionally receive appropriate responses back from an Intranet application server 30. Any data returned from the Intranet application server 30 is translated back to client format, and returned over the Internet to the client workstation 10 via the Dispatch Server 26 and at one of the Web servers in the DMZ Services cluster 24 and a secure sockets connection. When the resultant response header and trailing application specific data are sent back to the client browser from the proxy, the messages will cascade all the way back to the browser 14 in real time, limited only by the transmission latency speed of the network.

The middle tier software includes a communications component offering three (3) types of data transport mechanisms: 1) Synchronous; 2) Asynchronous; and 3) Bulk transfer. Synchronous transaction is used for situations in which data will be returned by the application server 40 quickly. Thus, a single TCP connection will be made and kept open until the full response has been retrieved.

Asynchronous transaction is supported generally for situations in which there may be a long delay in application server 40 response. Specifically, a proxy will accept a request from a customer or client 10 via an SSL connection and then respond to the client 10 with a unique identifier and close the socket connection. The client 10 may then poll repeatedly on a periodic basis until the response is ready. Each poll will occur on a new socket connection to the proxy, and the proxy will either respond with the resultant data or, respond that the request is still in progress. This will reduce the number of resource consuming TCP connections open at any time and permit a user to close their browser or disconnect a modem and return later to check for results.

Bulk transfer is generally intended for large data transfers and are unlimited in size. Bulk transfer permits cancellation during a transfer and allows the programmer to code resumption of a transfer at a later point in time.

The DMZ Web servers 24 are found in a special secure network area set aside from the Intranet to prevent potentially hostile customer access. All DMZ equipment is physically isolated and firewalled as illustrated at 25(a), 25(b) from the company Intranet. Similarly, the DMZ equipment is firewalled and obscured from hostile attacks from the public Internet, except for limited Web browser access to the Web servers which are located in the DMZ. The customer's Web browser connects to a Web server in the DMZ which in turn connects to the Dispatch server 26 which acts as a proxy to extract select information from the mid-range servers 30. A user may not directly connect to any enterprise server in the enterprise Intranet, thus ensuring internal company system security and integrity.

The DMZ also isolates the company Intranet from the public Internet because the Web servers 24 located in the DMZ never store or compute actual customer sensitive data. The Web servers only put the data into a form suitable for display by the customer's Web browser. Since the DMZ Web servers 24 do not store customer data, there is a much smaller chance of any customer information being jeopardized in case of a security breach.

Client Browser Application

Figure 3:
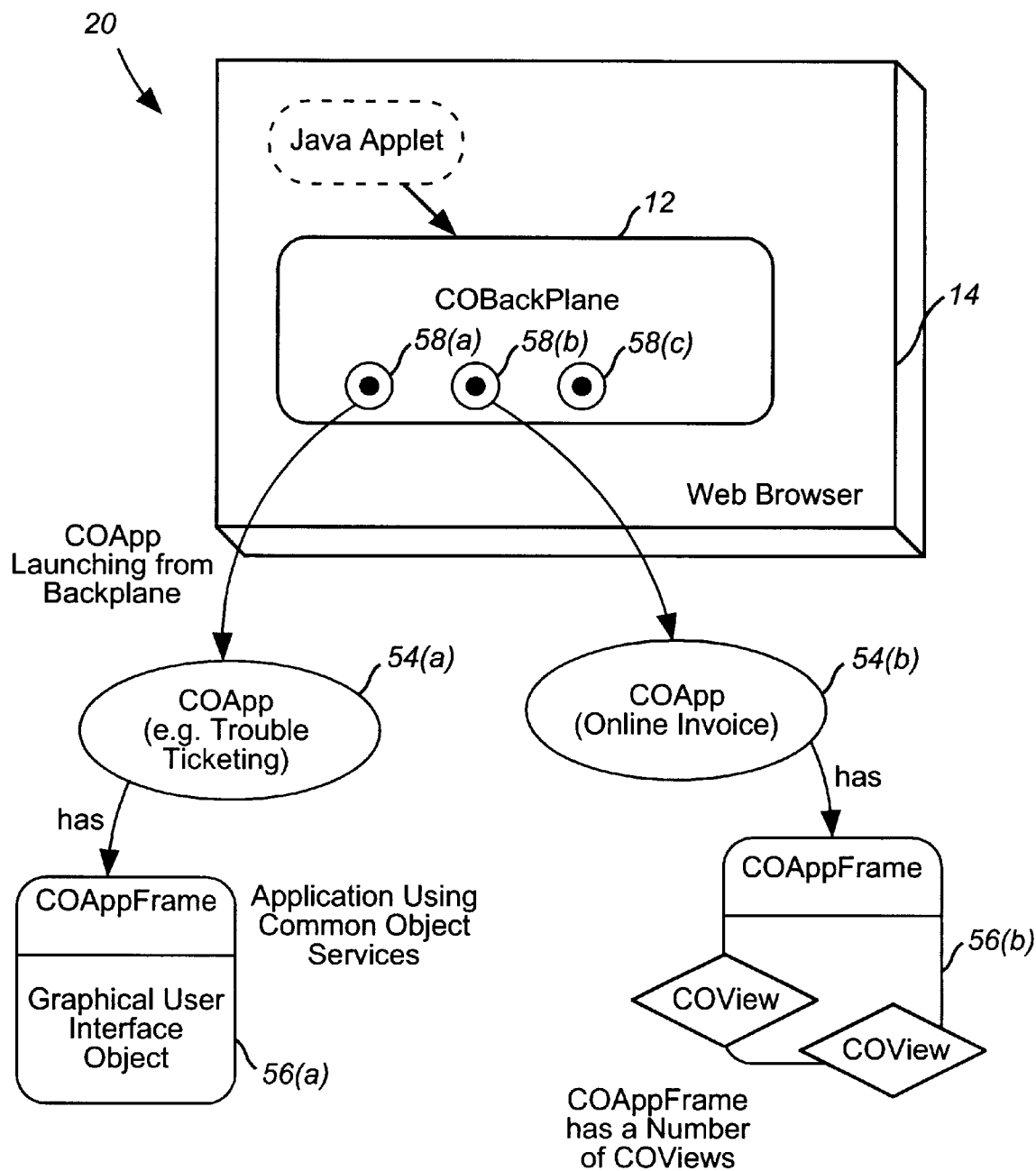
FIG. 3 is an illustrative example of a backplane architecture schematic.

As mentioned, one component of the system of the present invention is the client-tier software component which provides the integrated and unified interface to each of the data management services available to a user. As shown in FIG. 3, the system of the present invention implements an "application backplane" 12, a single object which keeps track of all the client applications implemented as deriving from the COApp or COApplet classes as will be described below, and which has capabilities to start, stop, and provide references to any one of these client applications. The application backplane 12 is typically implemented as a Java applet and is launched when a Web page is retrieved via URL pointing to the enterprise's Web site. The client applications typically comprise graphical user interface programs which enable a user to interact with one or more Web-enabled remote services.

The backplane 12 and the client applications use a browser 14 such as the Mcrosoft Internet Explorer versions 4.0.1 or higher for an access and distribution mechanism. Although the backplane is initiated with a browser 14, the client applications are generally isolated from the browser in that they typically present their user interfaces in a separate frame, rather than sitting inside a Web page.

The backplane architecture is implemented with several primary classes. These classes include COBackPlane, COApp, COAppImpl, COParm. and COAppFrame classes. COBackPlane 12 is an application backplane which launches the applications 54a, 54b, typically implemented as COApp. COBackPlane 12 is generally implemented as a Java applet and is launched by the Web browser 14. This backplane applet is responsible for launching and closing the COApps.

When the backplane is implemented as an applet, it overrides standard Applet methods init( ), start( ), stop( ) and run( ). In the init( ) method, the backplane applet obtains a COUser user context object. The COUser object holds information such as user profile, applications and their entitlements. The user's configuration and application entitlements provided in the COUser context are used to construct the application toolbar and Inbox applications. When an application toolbar icon is clicked, a particular COApp is launched by launchapp( ) method. The launched application then may use the backplane for inter-application communications, including retrieving Inbox data.

The COBackPlane 12 includes methods for providing a reference to a particular COApp, for interoperation. For example, the COBackPlane class provides a getApp( ) method which returns references to application objects by name. Once retrieved in this manner, the application object's public interface may be used directly.

COApp is the base interface for the applications. The applications, e.g., Trouble Ticketing 54a or Online Invoice 54b, generally have their startup code and inter-application interface in a class which implements COApp. Generally, two classes are available for the applications, COAppImpl or COApplet. Alternatively, they may provide their own implementation of the interface. In the preferred embodiment, applications typically extend COAppImpl.

COAppImpl is an "applet-like" class, but it does not derive from java.applet.Applet nor from java.awt.Panel. By not deriving from Applet, the applications may be launched at any time without browser having to be pointed to specific page, and frees the applications from running within the browser frame. Classes derived from COAppImpl are created, launched, stopped, and destroyed by the COBackPlane 12. This provides a tight and controlled integration by the system of the present invention.

The COApplet class, on the other hand, extends the Applet class and is intended to be launched by the browser from an HTML <Applet>tag. Extension from Applet is provided for applications needing more isolation from the present integrated system, or requiring a separate browser-based display space. The COApplet class implements most of the COApp interface by forwarding it to a contained COAppImpl object.

COAppFrame 56a, 56b is a desktop window created and used by a COApp to contain its user interface. The COAppFrame 56a, 56b is a separate window from the Web browser 50. Generally, the COAppFrame 56a, 56b has a menu, toolbar, and status bar. The COAppFrame's attachToViewArea( ) method may be used to paste a COView object 60a, 60b, 60c into a COAppFrame 56a, 56b. The COView class is an extension of java.awt.Panel. It provides a general purpose display space and container for an application's visual representation. Application classes typically extend the COView class to implement their presentation logic. COApp may use none, one, or many COAppFrames 56a, 56b.

COParm is a generic data class used to pass parameters between applications. COApp interface provides a public method for passing COParm message objects, for example, public void processMessage (COParm message), which may be used to pass messages between applications. The COParm class contains a set of name-value pairs which are used to present information or requests.

Logon

Figure 4:
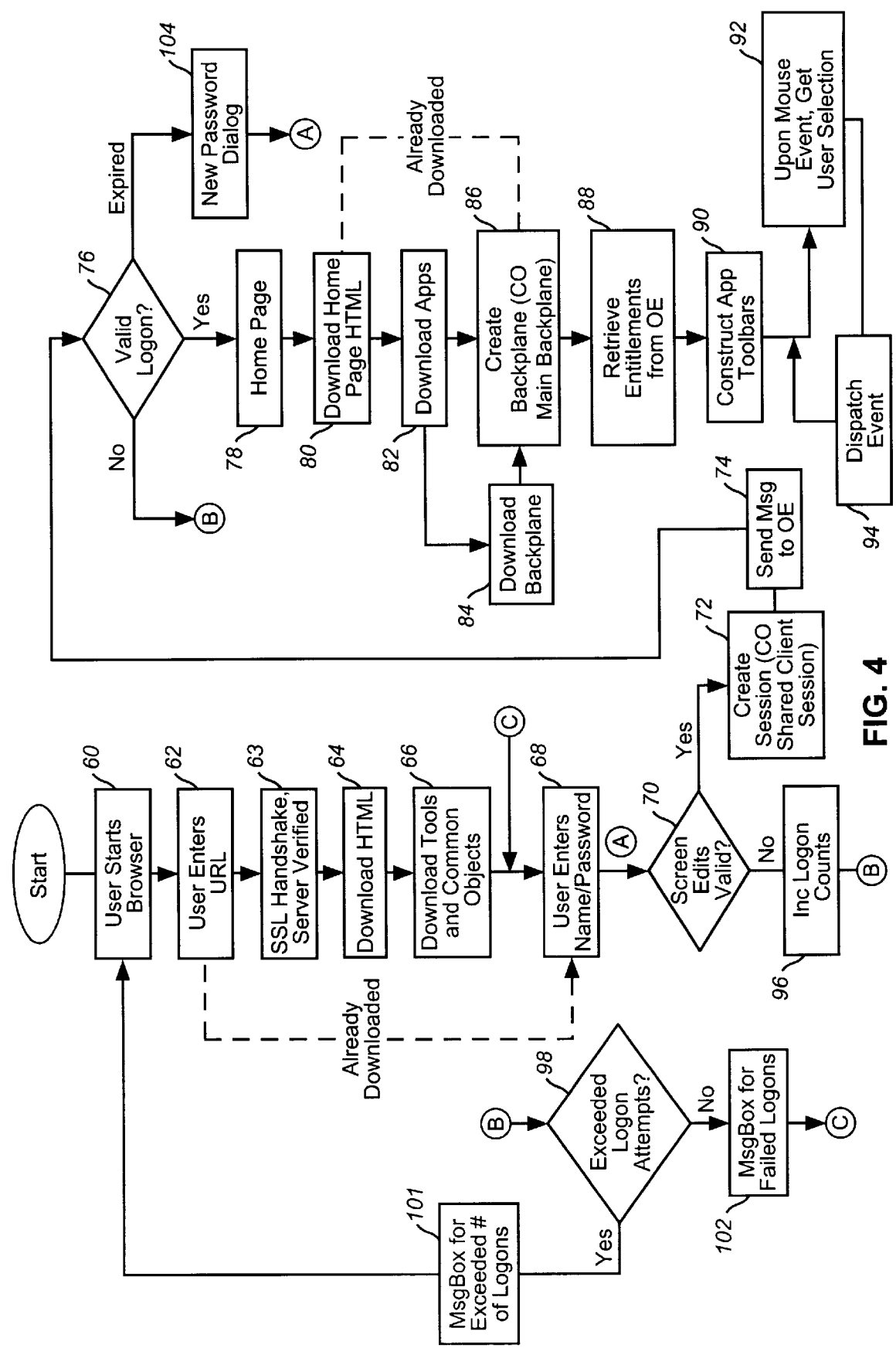
FIG. 4 depicts the logon process for the system of the present invention.

As illustrated in FIG. 4, a logon process for the integrated customer interface of the present invention starts with the browser launch as indicated at step 60, and the entry of the enterprise Uniform Resource Locator (URL), such as HTTPS://www.enterprise.com, as indicated at step 62. Following a successful connection, an SSL handshake protocol may be initiated at this point as indicated at step 63. As will be explained in greater detail herein, when a SSL client and server first start communicating, they agree on a protocol version, select cryptographic algorithms, authenticate the server (or optionally authenticate each other) and use public-key encryption techniques to generate shared secrets.

After successful SSL handshake at step 63, a Hypertext Markup Language (HTML) file invoking and an associated logon applet is downloaded with software tools and common objects in steps 64, 66, to present a Web page including name and password entry fields for user to enter. The user is then prompted to enter name and password on the Web page. If it is determined that the software files including classes for initiating a session, have been already downloaded, for example, from a previous session, the steps 62, 64, 66 are skipped.

The logon applet checks for the name/password entry and instantiates a session object in step 72, communicating the name/password pair. The session object sends a message containing the name/password to a remote server for user validation in step 74. When the user is properly authenticated by the server in step 76, another Web page having backplane object is downloaded in steps 78, 80, 84. This page is referred to as a home page. At the same time, all the application software objects are downloaded in step 82. If the system of the present invention determines that the backplane and application files have been already downloaded, the steps 80, 82, 84 are not performed. The backplane object is then instantiated in step 86.

As will be explained, the backplane communicates with a remote order entry server component ("OE") server 39 (FIG. 2) to retrieve the user's entitlements in step 88. The entitlements represent specific services the user has subscribed and has privilege to access. It also describes what entitlements the user may have within any single service. For example, from the COUser context, the backplane can obtain the list of applications that the user is entitled to access. In addition, each COApp holds set of entitlements within that application in COAppEntitlements object.

Using the information from the COUser context, the backplane knows which COApps to provide, e.g., which buttons to install in its toolbar. The backplane stores the user specific entitlements in memory for other processes to access. After determining the entitlements, the backplane initiates a new thread and starts an application toolbar in step 90. The application toolbar includes the remote services to which the user has subscribed and may select to run. From the application toolbar, a user is able to select a service to run. Upon user selection, the selection is communicated from the application toolbar to the backplane in steps 92, 94, which then launches the graphical user interface program associated with the selected service. The application toolbar remains on the user display, even after a particular service has been initiated. This is useful when a user desires to start up another remote service directly from having run a previous service because the user then need not retrieve the home page again.

If it is determined that the user entered password is not valid in step 70 or step 76, an attempted logon count is incremented in step 96. If the user's attempted logon count is greater than a predefined allowed number of tries as indicated in step 98, a message is conveyed to the user in step 101 and the user must restart the browser. If the user's attempted logon count is not greater than the predefined allowed number of tries, a "failed login" message is conveyed to the user in step 102, and the user is prompted to reenter name/password in step 68. If it is determined that the user password has expired, the user is prompted to change the password in step 104. For example, the user may be required to change the password every 30 days for security reasons. Whenever the user changes the password, the new password is transmitted in real time to a server responsible for updating and keeping the password entry for the user. The user than enters the new password in step 104 and continues with the processing described above in step 70.

An illustrative example of the logon Web page may be found co-pending U.S. patent application Ser. No. 09/159, 515 which typically includes a name field and a password field for the user to enter. After the user is properly authenticated via the logon page, the home page is retrieved.

Figure 5:
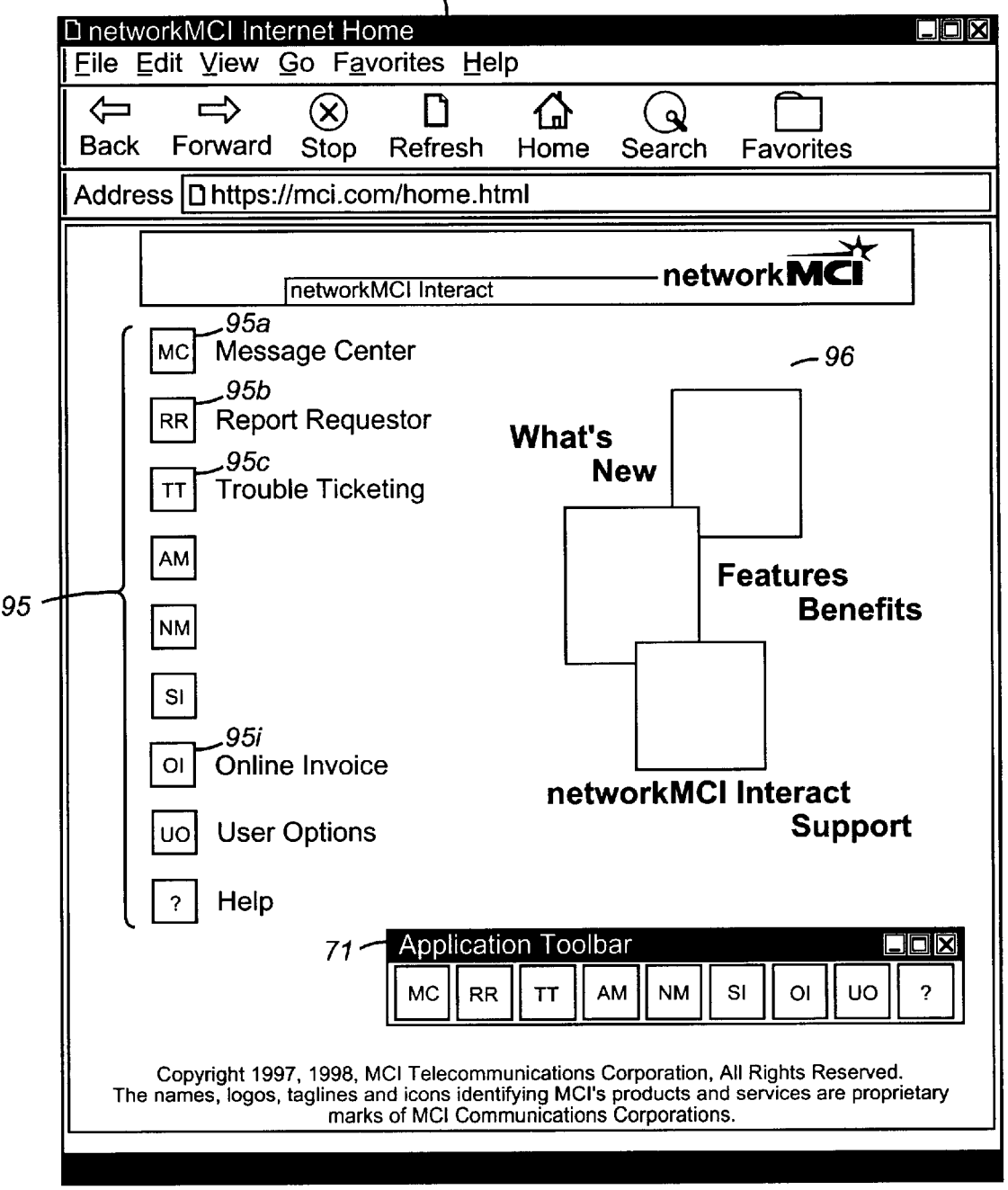
FIG. 5 illustrates an example of a Web home pages presenting customer-selectable data management services in which the client/customer is entitled.

FIG. 5 illustrates an example of a home page in the present invention, i.e., a Web page having the backplane object 12. The home page 79 is downloaded after the authentication via a logon page and provides, for example, a suite 95 of data management and reporting applications. Report Requester 95b provides a variety of detailed reports for the client/customer and a Message Center 95a provides for enhancements and functionality to traditional e-mail communications. An application toolbar 71 is also provided that is different from the icons 95 in that the application tool bar remains on a screen, even when the home page 79 is no longer displayed. The home page also typically comprises HTML links to other services 96. These services may be new information center, features benefits, or support center for the system of the present invention.

Backplane Logic

Figure 6:
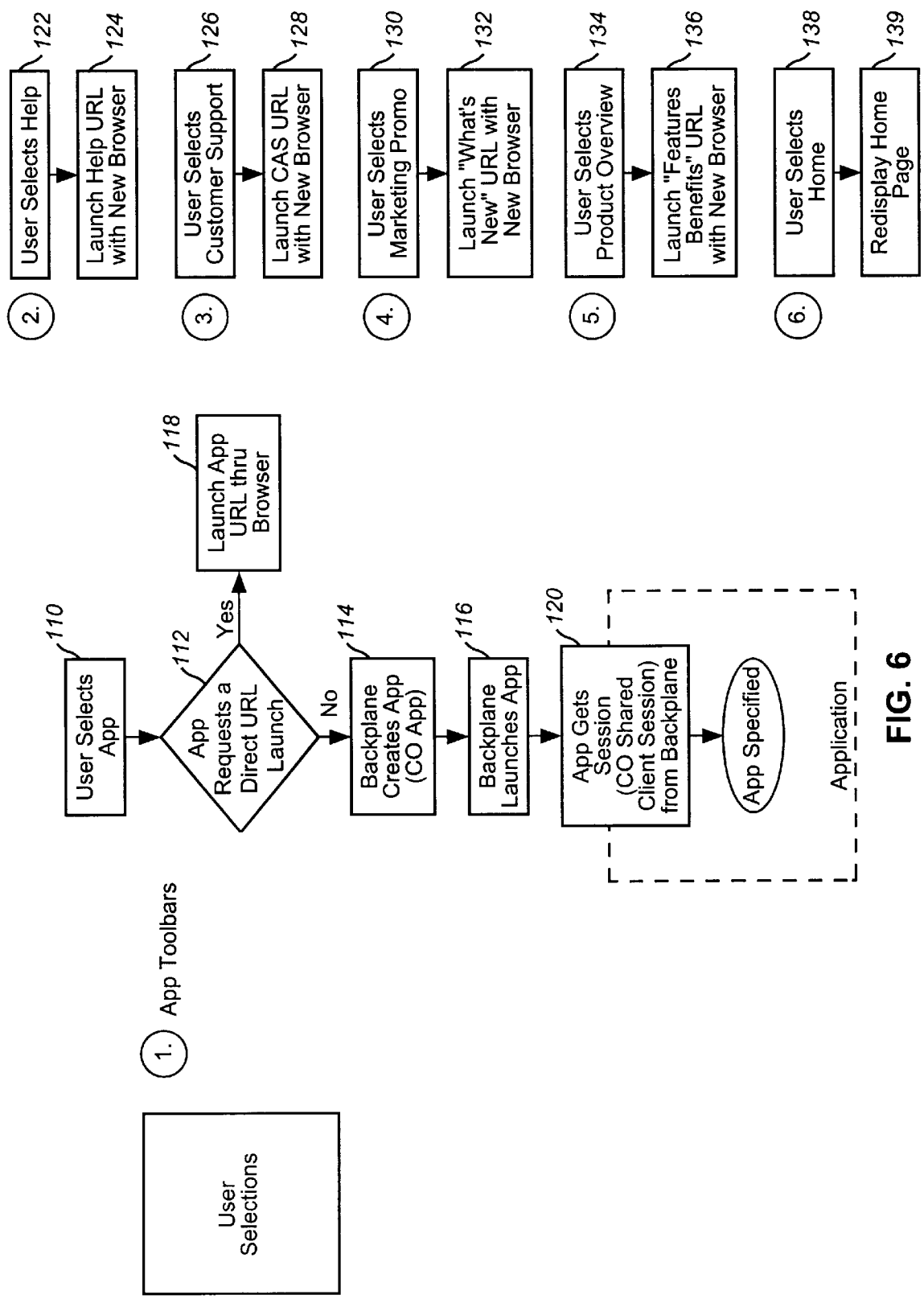
FIG. 6 is a flow diagram illustrating the backplane logic process when a user selects a service.

FIG. 6 is a flow diagram illustrating the backplane logic process when a user selects a service from a home page or the application toolbar. The user initially selects an application in step 110. If the selected application is derived from COAppImpl, the COBackPlane object 12 instantiates the desired application object by name. The COBackPlane 12 also creates a COAppStartThread object to manage the startup of the COAppImpl in step 116. Each COAppImpl is started in it's own thread. COAppStartThread calls the COAppImpl's init( ) method. Here the COAppImpl typically creates the application-specific classes it needs, including a COAppFrame (or a derived class thereof) if desired. COAppStartThread calls the COApp's start( ) method. Once the start( ) method has completed, the COAppStartThread ends.

If the desired application is derived from java.applet.Applet, a new browser window is created, and directed to the HTML page from which the applet to be loaded 338. This will cause the browser to load the applet, and call its init( ) and start( ) method. In its init( ) method, the applet obtains a reference to the backplane by calling the static method of the COBackPlane class getBackPlane( ). Also in its init( ) method, the applet notifies the backplane that it has been launched by calling the backplane's registerApp( ) method. Alternatively, if the desired application is an application requiring a direct URL launch from the home page, as shown at step 112, the desired application is invoked by retrieving a Web page having the application's URL as shown at step 118.

Each application gets a session identifier in step 120 upon its startup. Should the applications desire to perform some further authentication, they are free to retrieve the COUser object, and perform whatever special authentication they need, without troubling the user to re-enter his/her username and password. During the processing of functions specific to each application, the applications are able to communicate with one another as well as with the backplane by getting a reference to the applications or the backplane and invoking the public interfaces or methods with the reference.

After a user is finished with interacting with COApp, the user requests the selected COApp to exit via a menu selection, clicking on a close box button on a window frame, or a keyboard command, for example. The COApp then requests exit from the COBackPlane. If the selected application is derived from COAppImpl, the COBackPlane creates a COAppStopThread to manage the exit of the COApp. As with startup, each COApp is stopped in its own thread. COAppStopThread calls COApp's stop( ) method. Typically a COApp would not override this method. It is called for consistency with the applet interface of the COApp class. An applet's stop( ) method is called by the Web browser when the Web browser leaves the page from which the applet was loaded, in order to allow the applet to, for instance, stop an animation. For consistency with this model, COApps may use this method to stop long-running threads. COAppStartThread calls COApp's destroy( ) method. Here the COApp typically performs resource cleanup routines, including stopping any threads, and calling the dispose( ) method for any COAppFrame objects.

If the selected application is derived from java.applet.Applet, the Web browser window containing the page from which the applet was launched is closed. This will cause the applet's stop( ) method to be called by Web browser. In its stop( ) method, the applet notifies the backplane that it has been stopped by calling the backplane's deregisterApp( ) method.

Then a user typically requests logoff via menu, close box, etc. When such a request is received the backplane sends Logoff transaction to the Web Server. The backplane closes toolbar and directs the Web browser to logon URL. Then the backplane exits.

As further shown in FIG. 6, the home page provides links to other Web pages. For example, if help hypertext is selected in step 122 from the application toolbar, a help URL is launched in a new browser window in step 124. Similarly, if customer support hypertext is selected in step 126, a customer support URL is launched in a new browser window in step 128. If a user selects a marketing promotion hypertext in step 130, URL for new product information will be launched in a new browser window in step 132. If a product overview hypertext is selected in step 134, a URL pertaining to the product's features will be launched in a new browser window in step 136. If a user selects home in step 138, the home page will be redisplayed in step 139.

User

The present invention also includes a user unit for representing a user of a current session. The user unit is generally implemented as a COUser class extending java.lang.Object. The COUser class object holds information including a user profile, applications and their entitlements. In order to minimize network traffic, the amount of data carried by the COUser is minimal initially, and get populated as requests are processed. The requests are generally processed by retrieving information from the OE service. The profile information is then stored and populated in the COUser object should such information be requested again.

A COUser object is created when the user logs in, and holds the username and password of the user as an object in the COClientSession object. The session object is contained within the backplane, which manages the session throughout its lifetime. The code below illustrates how this occurs:

// Within the backplane
COClientSession session=new COClientSession( );
try {
   Session. logon ("username", "password");
} catch (COClientLogonException e) {. . .}; // Should the User object be required
COUser user=session.getuser( );

The logon method of the COClientSession object communicates with the OE server (FIG. 2), a back-end authentication mechanism, for authenticating the user.

The COUser that may be obtained from the COClientSession immediately after the login process is very sparse. It includes a limited set of information such as username, a list of applications that user is entitled to, for example. The details of each entitlement information are retrieved at the time of actual processing with those information.

Order Entry (OE)

As briefly mentioned, the order entry application of the system of the present invention (FIG. 2 at 39) is used to order, fulfill, and bill for, as well as administer, the suite of data management applications, providing a horizontal service for use by all applications. The applications communicate to the order entry application for all authentication, entitlement and system administration as well as order entry services. The order entry application centrally processes these service requests for the individual applications by providing all order entry and security information for the suite of applications.

The security information which the OE application maintains and provides describes identification, authentication and access control used in the suite of applications. All access to the suite of applications is controlled by user identifiers (userids) and passwords, as explained herein. In addition, individual users are specifically granted access to only the necessary system objects, i.e., file, programs, menus, reports, etc. Access to these individual objects are based upon the customer privilege models, i.e., entitlements, stored in a OE application database. Thus, all information regarding customers and their access levels for each product in the suite of network applications to which the customers have subscribed are stored in a customer security profile database local to the OE application. Accordingly, OE application provides the ability to prevent unauthorized, non-customer access to data and applications in the system of the present invention; the ability to allow customers to access multiple enterprises with one userid; the ability to restrict authorized users to specific Intranet applications and databases based on applications ordered by the customer; and the ability for users to restrict view and/or update capabilities within an application or data set, i.e., customers may provide or restrict views of their "enterprise" data to subgroups within their organization.

By utilizing the system of the present invention, customers no longer have to place manual calls to order entry hubs when requesting order transactions. For example, users may be added to the system without an enterprise's support team intervention. In sum, customers may manage their communications services in a secure environment and also, for example, monitor their network traffic via the Internet, as well as have a capability to add products and services to their account, in an automated fashion and all in one session without having to enter and exit the individual application services separately, and without having to contact a customer support representative.

Figure 7:
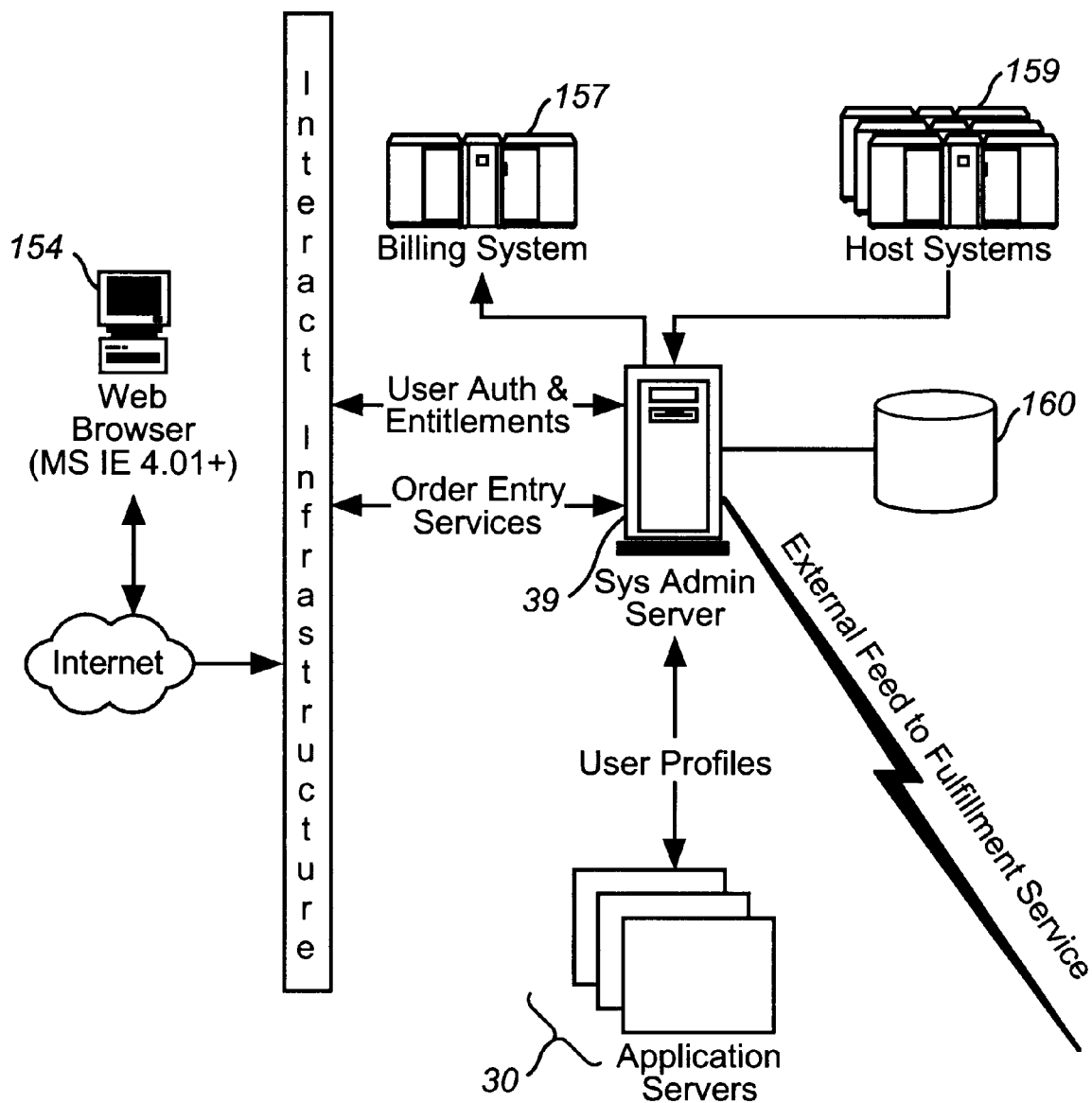
FIG. 7 illustrates an architectural overview of the order entry component of the system of the present invention.

FIG. 7 illustrates a general architectural overview of the OE application component which includes a OE server 39 resident in a mid-range computer, and an associated client application 154 running in a user platform having a Web browser, hereinafter referred to as a OE client application. The OE server 39 processes a number of transaction requests relating to authentication and entitlements, from other application services, both from the client and the application server 30 sides of the network. In addition, the OE server 39 receives transaction requests from the OE client application 154. The transactions are typically message driven and comprise requesting transactions and response transactions. The OE server 39 responds to the message requests by formulating transaction responses and transmitting them to the requesting servers and clients.

The OE Client Application

The OE client application 154 is one of the client browser applications running in the Web browser 14, and provides a Web-based GUI interface implemented accordingly and conforming to the GUI interface standard for the integrated suite of customer data management and report applications, as described herein. As described, the OE client application 154 is launched at the client A initiation by the backplane object and generally includes Java applications and applets for providing a common Web-based GUI for interacting with customers at the front-end side.

Figure 14:
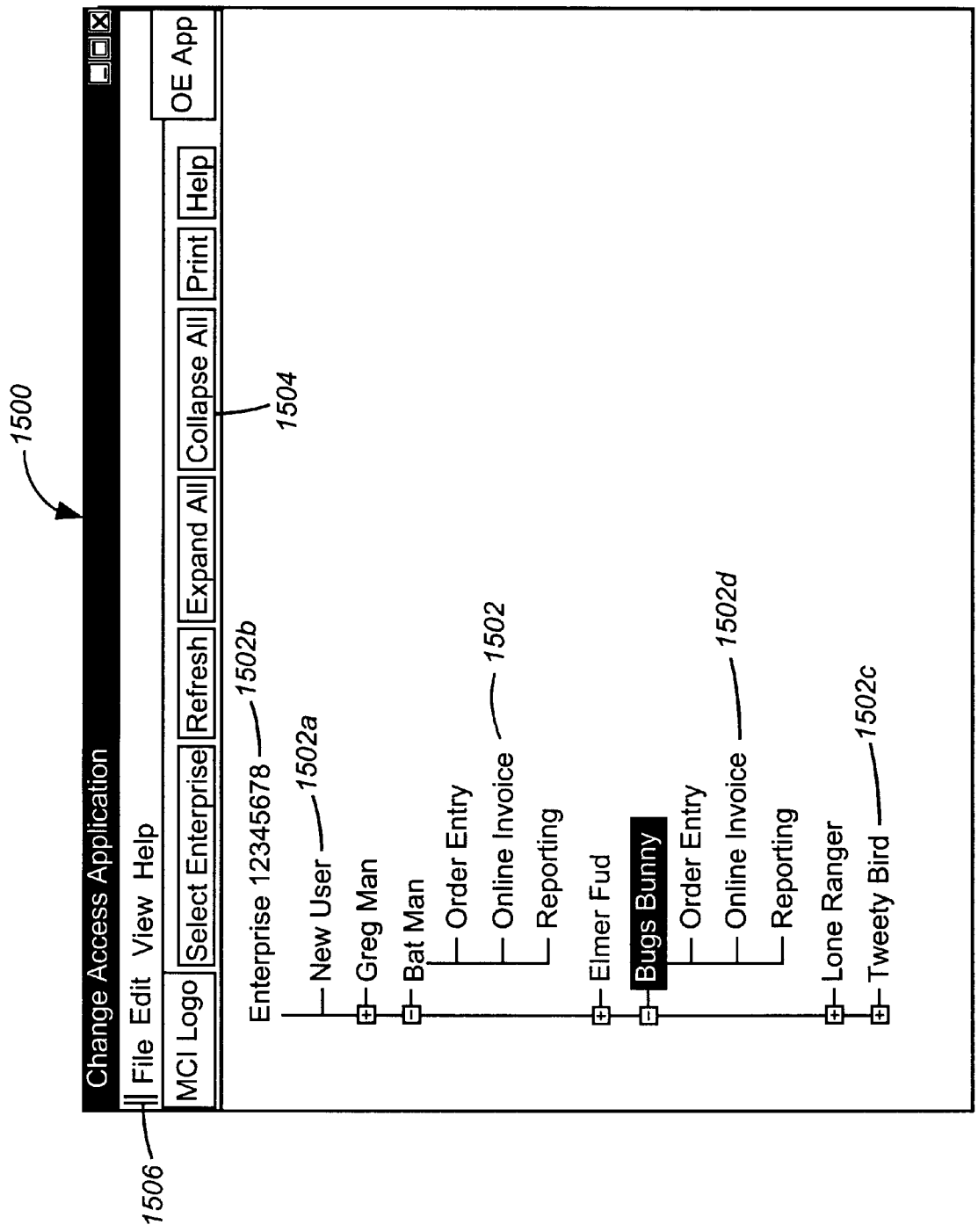
FIG. 14 illustrates an example screen display when the order entry application is launched.

When a customer launches the OE application from the home page, the main window as illustrated in FIG. 14, is presented. From this main window 1500, a customer may select to order and fulfill application services, request user identifiers (ids), and create user security profiles for the data management suite of applications. The main window 1500 includes a menu bar 1506 with options to perform various OE tasks. The main window also includes a toolbar 1504, common to all data management applications. The toolbar 1504 has buttons that also perform the various OE functions. Typically, the user list is presented, i.e., displayed as a tree 1502, within the main window 1500.

The menu options 1506 include: file menu options which includes a select enterprise option for allowing administrators to open a user list for a different enterprise, or add a new enterprise to their enterprise list, print option, and exit option which shuts down the OE application; edit menu option which includes add new application, modify, and delete options; options menu which enables a global security setup for various data management applications; view menu which includes options to refresh the screen by retrieving the latest user list for the opened enterprise from the OE server and displaying the list on the screen, to expand all nodes in the user list, and to collapse all nodes in the user list; and help menu option which launches the help engine with OE help text. The toolbar 1504 also includes the options for a select enterprise, refresh, expand all, collapse all, print and help options.

A typical process flow logic for OE client application starts with the home page launching the OE client and passing a reference to a common user information object. This object includes the user id, and the default enterprise for that user. The main window 1500 having the menu options 1506 and the toolbar 1504 is then presented. The OE client application then sends a transaction message "get OE security" including the user id, enterprise id, and the OE application code in the message. The OE server 39 returns racf id, an access level representing whether the user is an external admin, a member of an account team, an internal admin, or a customer support admin, for example. If the user that launches the OE application is an external admin, the user list is displayed immediately since external administrators may view only one enterprise. For external administrators, an enterprise name is retrieved from the OE server 39 by sending and receiving a "get user enterprise list" transaction request and response.

If the user is not an external administrator, then a dialog is presented for the user to select which enterprise to view. When user selects an enterprise to view, a "get user list" transaction message having enterprise id is sent to the OE server 39 to retrieve a list of user ids, a list of applications for each user, an access type for each application, and reporting types for WRS. The client application also sends a "get application list" transaction message to retrieve from the OE server 39 a list of application codes, description, and an application array position. The user list is then displayed within the main window as shown at 1502.

Every user list has a New User node 1502a as the first node under an enterprise 1502b. This node may be selected to order a new user. An existing user node 1502c may be selected to edit and add new applications for that user. When an existing user node 1502c is selected, the edit/add new application options on the menu 1506 is enabled and disabled according to what applications the user already has. An existing user application node 1502d may be selected to edit/modify/delete options within the application.

With regard to user selection of the select enterprise menu option or toolbar button in FIG. 14, the browser displays the Web page having a dialog box as shown in commonly owned, co-pending U.S patent application Ser. No. 09/159, 408 entitled AUTHENTICATION AND ENTITLEMENTS FOR USERS OF WEB BASED DATA MANAGEMENT PROGRAMS, the contents and disclosure of which are incorporated by reference as if fully set forth herein, which enables an administrator to work with a different enterprise, as well as add an enterprise to the their enterprise list and additional includes the ability to set up new users or modify various options available to existing users.

Figure 15:
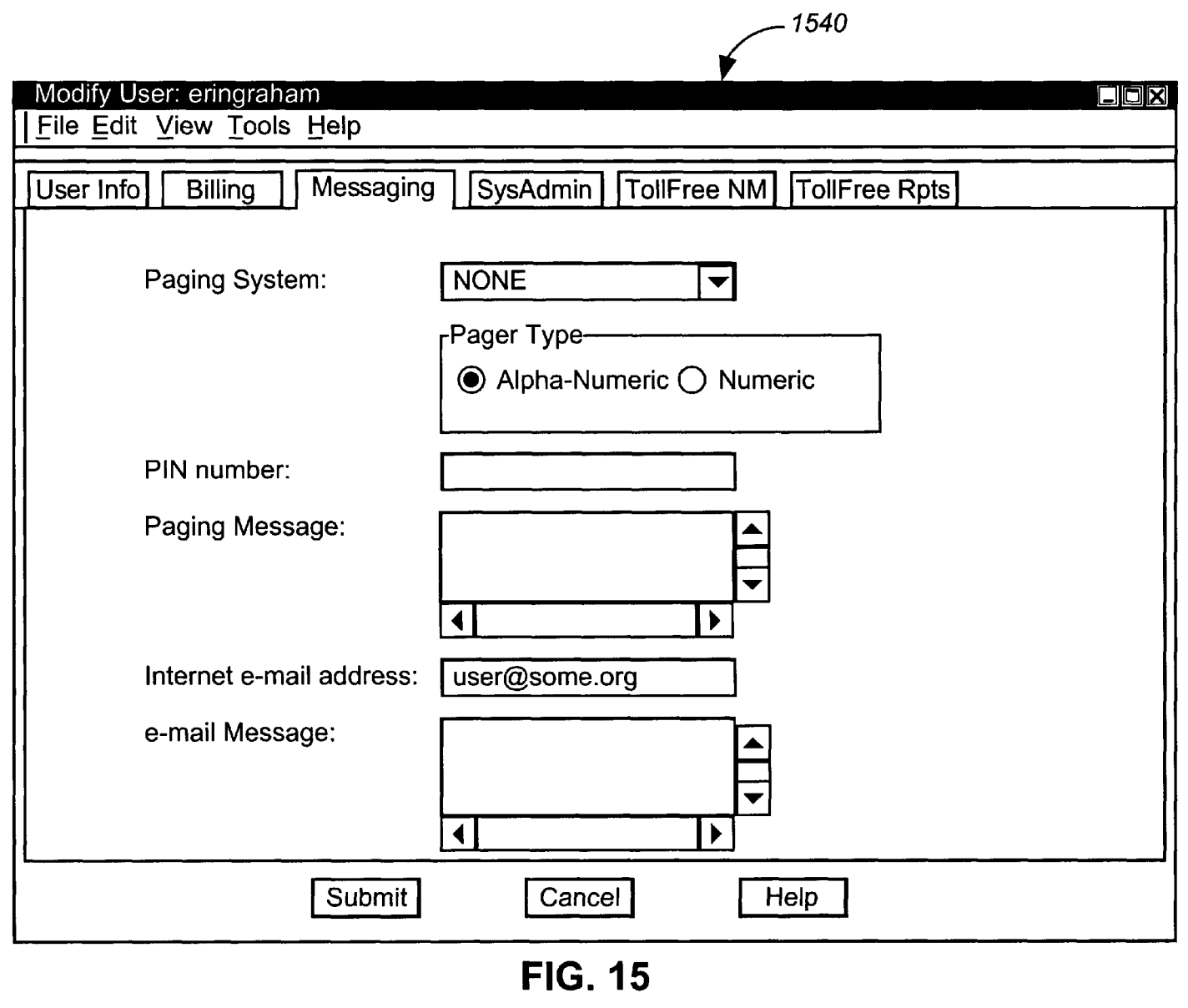

The OE client application also provides an interface for adding and editing data pertaining to a message notification feature of the system of the present invention. The message notification feature offered by the system of the present invention allows users to be notified of any report completion, relevant data acquisition completion, and/or occurrences of events. The users may select a notification medium, e.g., via page, e-mail, or fax. In addition, the users may select to have different notification medium for different types of messages. During an initial customer setup, paging and e-mail data is added for each user configured with the OE. This information may be modified after the initial setup. FIG. 15 illustrates an example of a screen for configuring/modifying data related to the message notification feature. An object derived from a public class is created to represent the message notification screen 1540. For modifying the existing data, the object retrieves existing information and populates the field. The users may then enter the appropriate fields desired for notification method.

The OE client application 154 particularly provides screen displays by invoking associated class objects launched by the backplane unit as described above. The OE client application 154 employs a Java application program and is implemented by extending the COApp class, one of common objects provided and utilized in the present invention. Because the client program 154 is not implemented as an applet, and also because the client program 154 employs the container Frame for customer display windowing purposes, the client program 154 runs, to a degree, independent of the browser within which the backplane is deployed.

Referring back to FIG. 7, the OE client application interacts with the OE server in providing various order entry functions for all applications as described above and, as described herein with reference to the back-end functionality of the system of the present invention. Communications between the OE client 154 and the server 39 typically use TCP/IP, running a UNIX process listening in on a known TCP port.

Figure 9:
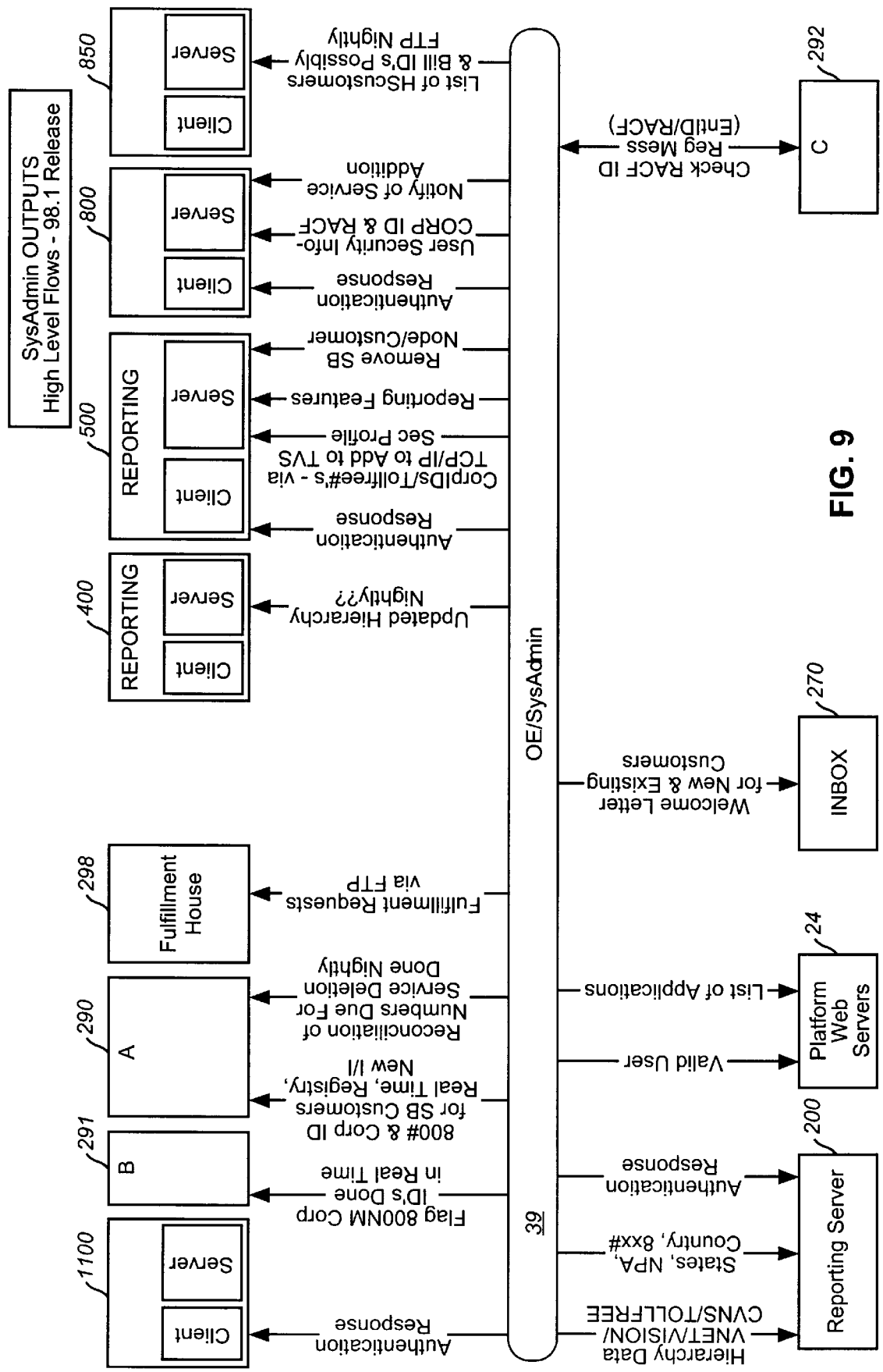
FIG. 9 is an output process flow diagram, illustrating outputs from the order entry component of the system of the present invention.

In the preferred embodiment, as shown in FIG. 7, the OE server 39 provides a number of processes for performing a number of specific functions. For example, a fulfillment process monitors new customers being added to the system and notifies a fulfillment house 298 accordingly (FIG. 9). The fulfillment house then may send appropriate subscription packages according to the information received from the fulfillment process to the new customer. Another process, a reconciliation process, may handle synchronization of data with a mainframe system database and also with databases associated with the individual fulfilling systems. Yet another process, a billing process, may handle directing billing information to different billing streams 157 (FIG. 7).

The OE server 39 further maintains a database 160 for storing all the users registered with the system of the present invention, and their security information such as passwords and application entitlements and hierarchies describing the user's access privileges to specific application services/sub-services which may be requested by other application servers and clients in the network. Generally, the hierarchies are customer-defined during the order entry process, and describe the subdivision of calls into nodes arranged in a n-way tree. The back-end servers in the system of the present invention apply the hierarchy definitions to their data at report time when generating reports, typically as queries on a node-by-node basis to the result data set which was extracted using any other criteria supplied. The trees of the hierarchies have essentially arbitrary complexity, i.e., the number of nodes is unlimited. Each node is assigned calls according to a template of conditions. Conditions may be defined as a combination of one or more factors such as account codes, and location/node identifiers, etc. These filters may be applied at any node in the tree. The hierarchies may be applied as both selection criteria (e.g., "report on all calls at these nodes or their descendants", in combination with other criteria) and roll-up targets (e.g., group the results in this report at this level in the tree). These entitlement and hierarchies may be modified via the OE client application 154 executed at the customer workstation 20.

Referring to FIG. 7, a process running in a OE client application process 154 sends transaction request messages via the infrastructure, comprising, e.g., the Web server cluster 24 and a dispatch server 26 (FIG. 2), to the OE server 39. The OE server 39 responds to requests by searching the security profile for the information requested, formulating appropriate transaction response messages and transmitting them back to the requesting process. As an example, during the login procedure, the client login process formulates a transaction message including a user name/password and a validation request for a given customer. The OE server 39 looks for the matching name/password pair in the security profile for the customer, and if the name/password pair is found, the server 39 formulates a valid user message response for the login process running in the client platform, including in the message the enterprise id, time zone, and user id information and transmits the response via TCP/IP back to the login process. When the OE server 39 detects that the password has expired, the server 39 notifies the customer, via the client application 154 to change the password. The changed password is sent to the OE server 39 formatted in a message interface, "change password request," for example. The server 39 upon receiving the message updates the password for the given user in its user profile stored in OE database 160, and responds with appropriate return codes to the OE client 154. The login process, upon receiving the response may then continue with its normal course of processing.

Another example of a service provided by the OE is retrieving an application entitlement list for a given customer. As described briefly above, an entitlement describes a privilege or authorization that a customer has. It describes what applications a customer may access and also describes what the customer can do within that application. In addition, it describes what back-end services that application and customer combination may access. For example, a customer may be entitled to use or access many applications and for each application, the customer can have a different set of entitlements. Thus, entitlements may come in two different sets: a first set specifying what the customer may do within the application, e.g., allow the customer to have update access to a particular view and only read-only access in a different view; and, a second set specifying what back-end services this particular application and customer may access.

As described previously, all the information relating to entitlements for a given customer is stored in customer profile database 160 located with the OE server. When the backplane requests via TCP/IP the entitlement transaction, for example, in a "get application list" request message, the security module retrieves and transmits back via TCP/IP to the backplane the list of authorized applications accessible by a given customer in a transaction response. The backplane uses the list to determine which buttons on the home page should be activated, thus controlling access to products. Similarly, individual back-end application servers 158 may make a request for entitlements within that application for a given customer. For example, the reporting component of the system of the present invention, herein referred to as "WRS" Web-based reporting system which provides a customer with their data management application reports generates a request for hierarchy data whenever reports need be generated. In response, the OE retrieves the corresponding hierarchy data and transmits them in real time to the WRS system as will be described.

In providing the authentication, entitlement, and hierarchy information, including those described above, the OE server database 160 stores user profiles locally. Additional data needed are typically accessed from the enterprise host systems 159. The OE server 39 may be implemented as a concurrent server allowing simultaneous multiple client connections. The server 39 listens on a known port, and when a client connects, the server 39 forks a new process to handle the client connection. The server 39 may also implement a thread to handle each client connection.

As further described in the herein incorporated, co-pending U.S. patent application Ser. No. 09/159,408, the OE server 39 is preferably implemented utilizing object oriented programming (OOP). As an example, when a "get hierarchy list" message is initiated at the client application to invoke retrieval of a corp id list from the server 39, a "Hierarchy" class may be instantiated which includes a Get( ) method to determine which Hierarchy product is to be retrieved and to return the appropriate information. Another object may be invoked to format the data into a response message and return the "get application list" request message is initiated at the client application, an "Application" class may be instantiated which encapsulates the interface into a database table (not shown having applications information. Particularly, the Get( ) method in this class accesses the Applications table in the database and return the list of application codes and their descriptions. The details of the message format, including request and response messages, are described in commonly owned, co-pending U.S. patent application Ser. No. 09/159,408.

Figure 8:
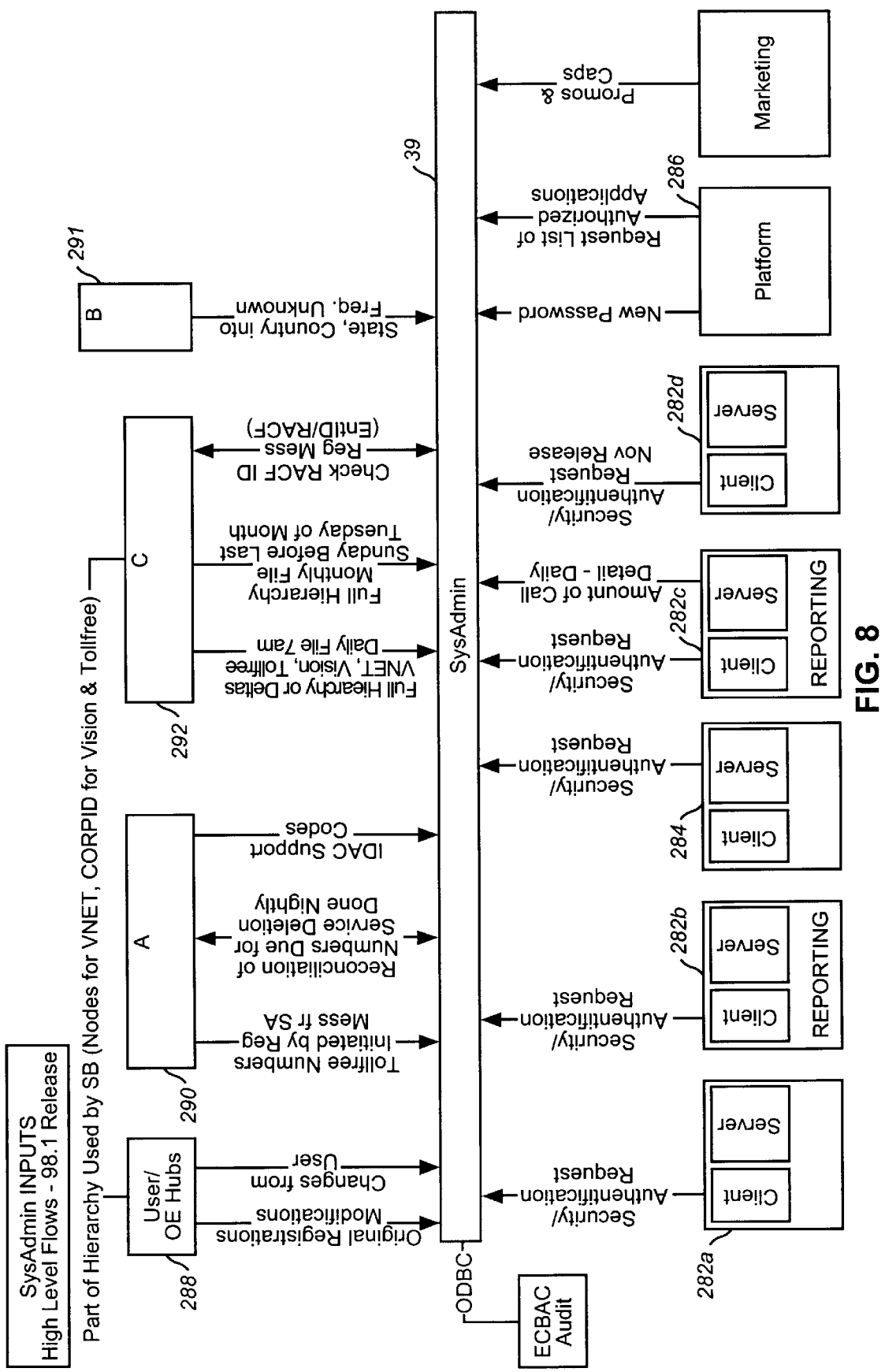
FIG. 8 is an input process flow diagram, illustrating inputs to the order entry component of the system of the present invention.

FIG. 8 is a high level input process flow diagram, illustrating inputs to the OE server 39 of the system of the present invention. Through the OE server, the integrated interface system of the invention handles a wide variety of key functions for the suite of network applications. Each application will, herein forth, be also referred to as a fulfilling system, having a fulfilling client and a fulfilling server. The system of the present invention handles security and authentication requests from both the client and server sides of each fulfilling system as shown in 282a–d and 284. These requests are automatically generated whenever the customer makes a request of the server. For example, they are generated when a customer clicks on the icon from the home page (FIG. 4) for a service such as Online Invoice.

In addition, as mentioned, when a customer first logs on, the customer is presented with a dialog box prompting for user ID and password. When the customer clicks a submit button, for example, the backplane (or platform) verifies the customer is valid by inquiring with the OE system as shown in 286. The return response is either "invalid user/password" or "valid user". When the customer has been authenticated, the customer is then presented with a list of authorized applications. This list determines which buttons, for example, representing each application are active, thus controlling customer access to products and services.

In addition, also shown in 286, the customer may be issued a temporary password with the customer's fulfillment package, which enables a user to log into the system the first time.

Information may also be entered and requested by a number of sites other than a user platform. For example, order entry "OE" Hubs 288 may enter information directly into the OE database 160 to register new customers to the integrated suite of network applications. They may also access the data in OE directly to modify customer information, and to add or remove subscribed services.

Other inputs to the OE server may include entitlement data from a legacy order entry system referred to a Network Capabilities System ("NetCap") 290 and from a circuit order management system ("COMS") 291. Additional authentication and entitlement data may be transmitted from a corporate order entry system ("CORE") 292 which generates two sets of hierarchy files on a daily basis. One set comprises deltas only; the other comprises a full hierarchy. Notification is made to the OE when these are available. As described in co-pending U.S. patent application Ser. No. 09/159,408, OE performs a reconciliation process to update the hierarchy files.

FIG. 9 is an output process flow diagram, illustrating outputs and responses from the OE server 39 to the requesting systems and processes. An example of an output is an authentication response to the client side of the individual applications, e.g., reporting system 400, etc., as well as the backplane. In addition, a list of accessible applications for a given customer, is output to the backplane platform via platform Web servers 24. The OE also outputs various updated data to database systems associated with specific individual applications in the suite of data management applications. In addition, the individual fulfilling systems receive messages from the OE regarding modifications effected by a customer interaction. For example, the customer hierarchy data is sent in real time by the OE for up-to-date report information.

WRS

As mentioned herein, and in greater detail in commonly owned, co-pending U.S. patent application Ser. No. 09/159, 409 entitled INTEGRATED PROXY INTERFACE FOR WEB BASED REPORT REQUESTOR TOOL SET, the contents and disclosure of which is incorporated by reference as if fully set forth herein, the data architecture component of the system of the present invention focuses on the presentation of real time data as well as historic data.

Figure 10:
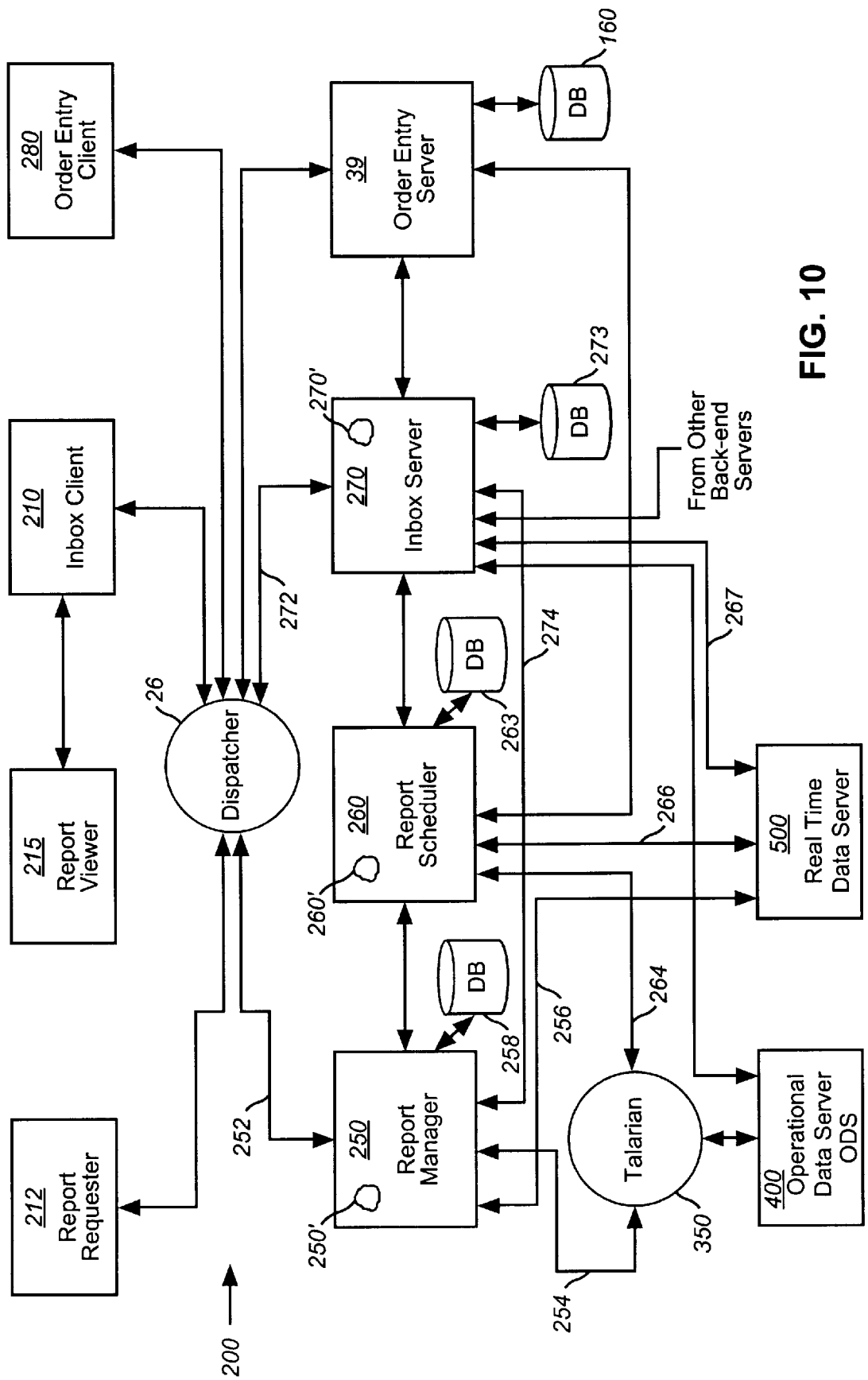
FIG. 10 is a block diagram depicting the physical architecture of the WRS component of Reporting system of the present invention.

Referred to as "WRS", the WWW/Internet Reporting System 200, as shown in FIG. 10, provides a client, middle-tier service and application proxy components enabling customers to request, specify, customize, schedule and receive their data and account information in the form of reports that are generated by the various back-end application servers. As will now be described in detail, the WRS reporting system 200 comprises the following components and messaging interfaces:

1) those components associated with the Client GUI application front end including a report requester client application 212, a report viewer client application 215 and, an Inbox client application 210 which implement the logical processes associated with a "Java Client", i.e., employs Java applets launched from the backplane (FIG. 3) that enable the display and creation of reports and graphs based on the fields of the displayed reports, and, allows selection of different reporting criteria and options for a given report; and, 2) those middle-tier server components enabling the above-mentioned reporting functionality including: a Report Manager server 250, a Report scheduler server 260, and an Inbox Server 270. Supporting the WRS reporting functionality as will be described are the OE client and corresponding OE server 39 applications.

The Report Manager ("RM") server 250 is an application responsible for the synchronization of report inventory with the back-end "Fulfilling" data servers 400, 500; retrieval of entitlements, i.e., a user's security problems, and report pick list information, i.e., data for user report customization options, from the OE server 39; the transmission of report responses or messages to the Dispatch server 26; the maintenance of the reporting databases; and the management of metadata used for displaying reports. In the preferred embodiment, the RM server 250 employs a Unix daemon that passively listens for connect requests from the GUI client applications and other back-end servers and employs the TCP/IP protocol to receive and route requests and their responses. Particularly, Unix stream'sockets using the TCP/IP protocol suite are deployed to listen for client connections on a well-known port number on the designated host machine. Client application processes, e.g., report requestor 212, desiring to submit requests connect to RM 250 via the dispatcher 26 by providing the port number and host name associated with RM 350 in a request message. Request messages received by the RM server are translated into a "metadata" format and validated by a parser object built into a report manager proxy 250' that services requests that arrive from the GUI front-end. If the errors are found in the metadata input, the RM 250 will return an error message to the requesting client. If the metadata passes the validation tests, the request type will be determined and data will be retrieved in accordance with the metadata request after which a standard response will be sent back to the requesting client. As shown in FIG. 10, interface sockets 252 are shown connection the Dispatch server 26 and the RM server 250 and other socket connections 254, 256 are shown interfacing with respective back-end servers 400 and 500. In one embodiment, as described in commonly owned, co-pending U.S. patent application Ser. No. 09/159,684 entitled INTEGRATED PROXY INTERFACE FOR WEB BASED DATA MANAGEMENT REPORTS, the contents and disclosure of which is incorporated by reference as if fully set forth herein, a back-end mainframe application known as the ODS server supporting enterprise's detailed operational decisions provides current data through a Talarian smart socket messaging interface 254 to the Report Manager. Additionally, as shown in FIG. 10, highly current data is FTD'd directly to the Inbox Server and a message is sent to the report manager server 250 from the real time data server 500. Although not shown in FIG. 10, it should be understood that the RM 250 server may manage reporting data for customer presentation from other back-end and legacy servers including, e.g., Online Invoice Server, etc., in order present to a customer these types of data management and reporting data.

The report manager server additionally utilizes a database 258, such as provided by Informix, to provide accounting of metadata and user report inventory. Preferably, an SQL interface is utilized to access stored procedures used in processing requests and tracking customer reports. A variety of C++ tools and other tools such as Rogue Wavers tools.h++ are additionally implemented to perform metadata message parsing validation and translation functions.

The Report Manager server 250 additionally includes the scheduling information, and a report scheduler server component passes the report request to the back-end fulfilling servers 400, 500 at the scheduled times. As shown in FIG. 10, the Report Scheduler ("RS") server component 260 interfaces directly with the Report Manager server 250 to coordinate report request scheduling and processing. It should be understood that the respective report management and scheduling functions could be performed in a single server. Particularly, the RS 260 is a Unix program deploying Unix stream sockets using the TCP/IP protocol suite to send requests to the back-end fulfilling servers 400, 500, at pre-specified times, and receives their responses. As shown in FIG. 10, RS interface socket connections 264, 266 are shown interfacing with respective back end servers 400 and 500. In the case of operational data from ODS 400, report requests are published by the RS server 260 to a pre-defined subject on the Talarian Server. When handling other incoming messages published by back end servers using Talarian SmartSockets 4.0, another daemon process is necessary that uses Talarian C++ objects to connect their message queue and extract all messages for a given subject for storage in a database table contained in database 263. Each message includes the track number of the report that was requested from the fulfilling server.

From the report requestor interface, the user may specify the type of reporting, including an indication of the scheduling for the report, e.g., hourly, daily, weekly or monthly. The report scheduler interface additionally enables a user to specify a pager or E-mail account so that an e-mail or pager message may be sent to indicate when a requested report is in the Inbox server 270.

The Inbox Server component 270 serves as the repository where completed report data and event notification data are stored, maintained, and eventually deleted and is the source of data that is downloaded to the client user via the dispatcher (FIG. 2) over a secure socket connection 272. It is also a Unix program that is designed to handle and process user requests submitted in metadata format using an Informix™ database. Once report results are received from the data servers 400, 500 and any other back-end or fulfilling servers (not shown), the Report Manager server 250 communicates the corresponding report metadata to the Inbox server 270 over socket connection 274 as shown in FIG. 10. The metadata will be stored in the Inbox server database 273 along with the report results. Thus, if the metadata is required to be changed, it will not interfere with the information needed to display the reports contained in the Inbox. Additionally, as shown in FIG. 10, the Inbox server interfaces with the report scheduler to coordinate execution and presentation of reports.

As described above, the OE server 39 and database 160 is the repository of user pick lists and user reporting entitlements. Particularly, it is shown interfacing with the Inbox server 270 and report scheduler servers 260. The Report Manager does not interface with or contain metadata for OE. It will, however, include information in the report metadata that will tell the Report Requestor client application it needs to get information (e.g., Pick Lists) from the OE server 39.

With regard to the front-end client GUI components, the above-mentioned Inbox client application 210 functions as an interface between the client software and the Inbox server 270 for presenting to the customer the various type of reports and messages received at the Inbox including all completed reports, data detail, and news. Preferably, the messages for the user in the inbox are sorted by type (report, data detail, alarms) and then by report type, report name, date, and time.

Particularly, the Inbox client application uses the services of the backplane (FIG. 3) to launch other applications as needed to process report messages. The inbox will also use the services of the data export objects to provide a save/load feature for inbox messages.

In a preferred embodiment, the inbox client includes a thread that polls periodically, e.g., every five minutes, for a list of reports. The polling thread typically looks for new additions to the list of messages currently displayed on the screen. If the polling thread finds a new addition, the screen display is updated accordingly.

The Report Requestor application 212 is a client application enabling user interaction for managing reports and particularly includes processes supporting: the creation, deletion, and editing of the user's reports; the retrieval and display of reports based on selected criteria; the display of selected option data; and the determination of entitlements which is the logical process defining what functionality a user can perform within the WRS application. In the preferred embodiment, a report request may be executed immediately, periodically, or as "one-shots" to be performed at a later time. As described herein, the report scheduler service maintains a list of requested reports for a given user, and forwards actual report requests to the appropriate middle-tier servers at the appropriate time. Additional functionality is provided to enable customers to manage their inventory, e.g., reschedule, change, or cancel (delete) report requests.

The Report Viewer application 215 is a GUI Applet enabling a user to analyze and display the data and reports supplied from the fulfilling servers such as ODS 400, or real-time data server 500, and other systems. Particularly, all reporting is provided through the Report Viewer client application 215 which supports text displays, a spreadsheet, a variety of graphic and chart types, or both spreadsheet/graph simultaneously, and, is launched from the inbox client 210 when a report is selected. The Report Manager 250 includes and provides access to the metadata which is used to tell the Report Requestor what a standard report should look like and the "pick-list" options the user has in order for them to customize the standard report. It is used to tell the Report Viewer client how to display the report, what calculations or translations need to be performed at the time of display, and what further customization options the user has while viewing the report. It additionally includes a common report view by executing a GUI applet that is used for the display and graphing of report data and particularly, is provided with spreadsheet management functionality that defines what operations can be performed on the spreadsheet including the moving of columns, column suppression, column and row single and multiple selection, import and export of spreadsheet data, printing of spreadsheet, etc. It is also provided with report data management functionality by defining what operations can be performed on the data displayed in a spreadsheet including such dynamic operations as sorting of report data, sub-totaling of report data, etc. Furthermore, the report viewer 215 is provided with functionality enabling the interpretation of Meta Data; and, functionality enabling communication with the Backplane (FIG. 3). The report viewer application 215 will also be able to accept messages telling it to display an image or text that may be passed by one of the applications in lieu of report data (e.g., Invoice, etc.)

By associating each set of report data which is downloaded via the Inbox server 270 with a "metadata" report description object, reports can be presented without report-specific presentation code. At one level, these metadata descriptions function like the catalog in a relational database, describing each row of a result set returned from the middle tier as an ordered collection of columns. Each column has a data type, a name, and a desired display format, etc. Column descriptive information will be stored in an object, and the entire result set will be described by a list of these objects, one for each column, to allow for a standard viewer to present the result set, with labeled columns. Nesting these descriptions within one another allows for breaks and subtotaling at an arbitrary number of levels.

The same metadata descriptions may be used to provide common data export and report printing services. When extended to describe aggregation levels of data within reporting dimensions, it can even be used for generic rollup/drilldown spreadsheets with "just-in-time" data access.

The metadata data type may include geographic or telecommunications-specific information, e.g., states or NPAs. The report viewer may detect these data types and provide a geographic view as one of the graph/chart types.

An overview of the report request/scheduling process 600 implemented by WRS Report Manager and Report Requestor tools will now be described.

After preliminary logon, authentication and verification of WRS Web based reporting entitlements, as described above with respect to FIGS. 4–6, the user may select the Report Requestor icon 95*b* from the home page screen display 79 of FIG. 5, which initiates display of a WRS report requester Web page.

Figure 11A:
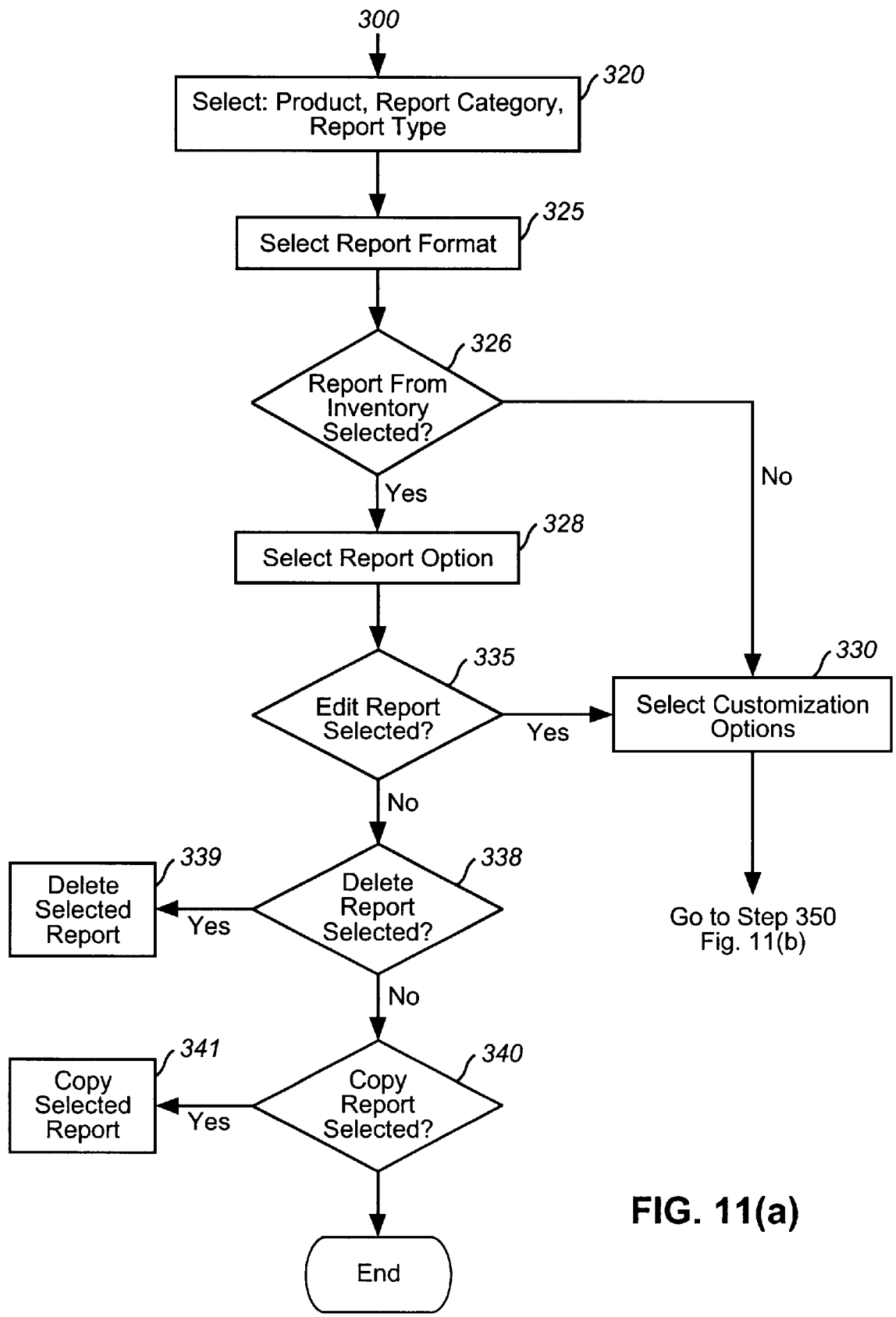

Referring to the flow chart of FIG. 11(a) depicting the WRS reporting options, user selection of the report product, report category, and report type, is indicated at step 320. Additionally, at step 325, the user may select the report format associated with a reporting category. In accordance with the user report selections, if a report had already been created and maintained in the report manager database, it will be displayed in the report inventory field on an appropriate screen. At step 326, a determination is made as to whether an existing report from inventory is selected. If an existing report is not selected then the user is prompted to generate a new report according to customization options that the user is entitled for the selected report product, category, type, etc., as indicated at step 330. If an existing report is selected at step 326 based on the report product, category, type, etc., then the user is prompted at step 328 to select from among the following options: a report edit option, as shown at step 335; a report delete option, in which case the selected report will be deleted at steps 338 and 339; and, a report copy option, in which case an existing report will be copied, e.g., for subsequent editing, as shown at steps 340 and 341.

Whether creating a new report or editing an existing report, the user is enabled to select customization options as indicated at step 330, FIG. 11(a). All of the initial values for retrieving the metadata, customization options and GUI builder options from the report manager server 250 necessary to build (edit) a report are provided in accordance with the user's entitlements.

The user is also enabled to specify report notification by paging, and report notification by e-mail. Upon selection of the paging notification option, the user is presented with a Web page having a customization screen (not shown) presenting the user to select or enter that user's page number, PIN number and a paging message description. Upon selection of the e-mail notification option, the user is presented with a Web page having a customization screen (not shown) presenting the user to select or enter that user's e-mail address.

As mentioned above with respect to FIG. 10, the Report Requestor client application 212 gains access to the metadata stored at the Report Manager server 250 through messaging. Particularly, as hereinafter described, a message generated by the Report Requestor in accordance with the user request is first received by the report manager proxy 250'. In the preferred embodiment, the report manager proxy comprises a set of tools in the form of reusable objects, preferably written in C++ code, or the like. For example, a parser object tool is employed to decompose the Metadata messages sent by the report requestor 212 to validate the message. If errors are found in the Metadata input, the RM will return an error message to the requesting client. If the Metadata passes the validation tests, the request type is then determined and the appropriate service will be invoked after which a standard response is sent back to the requesting client.

The Report Manager 250 implements stored procedures to translate the message, perform the request, and send the information back to the Report Requestor 212 which uses the metadata to determine what a standard report should look like, the customization options the user has, and the types of screens that should be used for the various options (i.e., single selection, multiple selections, etc.). It is understood that the selection of available standard template reports is based on the user's entitlements.

As described in above-referenced, co-pending U.S. patent application Ser. No. 09/159,409, and particularly Appendices A-G provided therein, the following types of metadata requests and responses that may be generated by the WRS Report Requestor 212 and Report Manager 250 components include: 1) Get/Send report template list (GRTL/SRTL)-which request enables retrieval of the list of all standard report templates for all products and is used only to obtain general report information, e.g., report title, description, etc.; 2) Get/Send report template detail (GRTD/SRTD)-which request retrieves the details of a specific standard report template; 3) Get/Send user report list (GURL/SURL)-which request retrieves the list of all user reports for the report format selected from a user report table and is used only for as a request for general report information, e.g., report title, status, etc.; 4) Get/Send user report detail (GURD/SURD)-which request retrieves the details of a specific user's report; 5) Add report definition/Acknowledgrnent (ARD/ARDA) which requests addition of a user-created report to a user report table. If the report is a scheduled report is also communicated to the fulfilling server at the time the report is due; 6) Delete report definition/Acknowledgment (DRD/DRDA)which request deletes a user-created report from the user table; 7) (Copy report definition/Acknowledgment (CRD/CRDA)-which request creates a duplication of the report the user is editing (other than the report title) and creates a new report ID for it; 8) Update Reporting Schedule/Acknowledgment (URD/URDA)-which request updates the scheduling information on a report without having to send a Delete or Add request; and 9) Get Pick List/Acknowledgment (GPL)-which request enables the Report Requestor 212 to get a pick list provided by OE server.

The aforementioned Appendices A-G provides a series of tables containing the content for each metadata message request that can be sent by the report requestor 212 for each of the enumerated user requests, in addition to the format of the corresponding metadata message responses by the RM server 250.

Having described the functionality of selecting and/or generating a report and customizing it, reference is now had to FIG. 11(b) which describes the next step 350 of presenting the user with report run and save options. Particularly, in the preferred embodiment, the user may select a save and exit option, or a save and run option. In either scenario, an WRSEdit object enables a WRSScnMgr object to save the report to the RM server. The WRSScnMgr object launches each screens save method which communicates with the DataManager object to place the screens data in its corresponding WRSNode. Once all of the WRSNode objects have been updated, the WRSScnMgr object calls the DataManager object's SaveReport method to build a hash table to contain all of the report's data. The CommunicationManager utilizes the RptManagerMsg object to create the ARD metadata message from the hash table, the WRSCommWrapper for direct communication with the backend, and the WRSReportManagerUtilParser to handle any errors thrown by the server. The Report Manager creates the Dispatcher object, and utilizes the services of the RMParser class and validation objects. Upon determining that the client has sent a valid message, the appropriate member function is invoked to service the request. The response is built inside the esql wrapper function after obtaining the necessary information through the stored procedure from the RM database. The Report Manager creates the RMServerSocket object and sends the ARDA message back to the client. When a report is submitted the selected report type and reporting criteria are sent to the Report Manager.

As illustrated in FIG. 11(b), at step 355, in reference to user selection of a Save and Run report option, the report is marked as scheduled and saved in the Report Scheduler server 260 via the report Manager. Subsequently, as indicated at step 360, the Report Scheduler server 260 sends the ARD message to the fulfilling server which queues the report and runs the report at the specified time(s), as indicated at step 365.

The process for generating a report of ODS data is described in detail in aforementioned co-pending U.S. patent application Ser. No. 09/159,684. Generally, whether the report is to be currently run for immediate ad hoc reporting or is scheduled for normal scheduled reporting, the following sequence of operations, as indicated at steps 370–395, FIGS. 11(b)–11(c), are performed: First, in response to receipt of the ARD message, e.g., submitted to the fulfilling server by the Report Schedule, the fulfilling server completes the report and compresses the report/data, as indicated at step 370. Then, the report/data is "pushed", implementing FTP, to the fulfilling server's directory on the Inbox server 270, as indicated at step 373. Each application server is responsible for generating unique file names within their directory on the Inbox server 270. The fulfilling server then verifies that the FTP process was successful, as indicated at step 376, and, at step 379, a notification is send by the fulfilling server to the Report Manager to notify the Report Manager server 250 of the location of a scheduled report. This is accomplished by using a "NRL" metadata message.

Aforementioned Appendix B of co-pending U.S. patent application Ser. No. 09/159,409 provides a table comprising the Notify Report Location parameters used for the NRL Metadata messaging sent by a fulfilling server to the RM Server 250 when a requested report is complete. Also provided in the above referenced Appendix B is the acknowledgment table sent back to the fulfilling server in response.

In the preferred embodiment, the NRL message received by the RM server 250 includes parameters verifying whether or not the FTP process was successful. If it was successful, then the fulfilling server messages the Inbox that the file has been transmitted successfully by transmitting the report name (filename) and location. When the fulfilling server encounters a problem executing a report, a notification is sent to the Report Manager. Particularly, an error flag is placed in the status field of the User_report by the Report Manager which is displayed to the user during Report Request. The error message description will be placed in a text file and FTP'd to the fulfilling server's report location on the Inbox server by the fulfilling server.

Referring to FIG. 11(b), step 379, once the RM server 250 has received the NRL message from the fulfilling server, it verifies the file's presence, as indicated at step 382. The RM server 250 then builds a metadata file, e.g., by compressing the appropriate metadata (for displaying the report) into a .MTD file, as indicated at step 385. This .MTD file is utilized by the Report Viewer to know how to display the report. The Report Manager server creates a file including the metadata using the same file name as the report/data file, but having the following suffix: *.mtd or *.mtd_zip indicating a metadata or compressed metadata file, respectively.

Above referenced Appendix F of co-pending U.S. patent application Ser. No. 09/159,409 details the parameters that are passed in the GET METADATA messaging for indicating to the Report Viewer how to display a requested report. An example message in metadata format to initiate the generation of a .MTD file corresponding to a user-created report for ODS data may be found in co-pending U.S. patent application Ser. No. 09/159,409.

Once the metadata file corresponding to the requested report is built by the Report Manager, the RM ftp's the .MTD file to the Inbox server, as indicated at step 388, FIG. 11(c). The RM server additionally updates the User_report table status field with a status "C" indicating completion, as indicated at step 391.

Once the Report Manager has updated the status field, the RM server 250 then adds the report to the Inbox server, as indicated at step 393.

Above referenced Appendix C of co-pending U.S. patent application Ser. No. 09/159,409 provides a table showing the fields for the metadata messaging between the RM server 250 and the Inbox server 270 for adding an item into the WRS system Inbox server 270, and the respective acknowledgment message format back from the Inbox server. In the add "A" message found in Appendix C, the "LOC" field includes information about where the data is located. Particularly, the RM server supplies a metadata "A" message to the Inbox indicating the FTP file location. Via the report viewer, the report is now available for viewing, downloading, saving, or printing by the user, as indicated at step 395, and as described in further detail in co-pending U.S. patent application Ser. No. 09/159,408.

Particularly, as shown in the exemplary home page in FIG. 5, the "Message Center" icon 95a may be selected which will cause the display of a Web page including the message center dialog box. From the dialog box, a user may select from among three tabs, a news tab, a reports tab and a data tab. Selection of the reports tab enables the retrieval of both a data file and a metadata file from the Inbox Server corresponding to those reports that have been run and available for customer viewing. Information provided for display by the message center display is provided by the User_table which keeps track of the status of all reports for a particular user. Particularly, by double-clicking a chosen report, a report viewer application is enabled to display the chosen report on a Web page.

Referring back to FIG. 10, the Report Viewer 215 interfaces with the user's Inbox 210 for presenting to the customer the various type of reports received at the Inbox. Preferably, all Report Requestor and Report Viewer applications conmunicate with the RM server 250 through the use of the common object communication classes, as described in greater detail in commonly-owned, co-pending U.S. patent application Ser. No. 09/152,512 entitled MULTI-THREADED WEB-BASED USER INBOX FOR REPORT MANAGEMENT, the contents and disclosure of which is incorporated by reference as if fully described herein.

It should be understood that fulfilling servers and the Report Scheduler server, send report results and event notifications to the inbox server 270. The fulfilling servers, and Report Manager server may communicate to the inbox server 270 by making requests to the inbox proxy 270'. The proxy, generally waits for a request from an application and then services the request.

The inbox proxy's main responsibility is to process requests by either handling them internally within the inbox proxy 270' or forwarding them to the inbox server 270, and then responding back to the client (i.e., the fulfilling servers in this case). In order to maintain secure connectivity throughout the system, the inbox proxy 270' uses the application program interfaces (APIs), supporting different types of data transport mechanisms: synchronous transaction; asynchronous transaction; and, synchronous bulk transfer. The transport mechanisms are implemented as sockets message protocol, and the proxy handles its conversation processing on a thread or process per conversation basis for servicing multiple simultaneous clients.

As an alternative to the transports above, the inbox server 270 offers direct File Transport Protocol (FTP) "put" for very large transfers in order to alleviate some of the network server loads. The fulfilling servers 400, 500 with large data transfers typically use the common shareware compression format ZIP which is also PKZIP compatible. Alternately, the fulfilling servers 400, 500 distributing information via the inbox may "put" the data to the inbox and defer zipping until after the inbox receives the data.

As described, the fulfilling servers, when placing the data in the inbox, notify the report manager server 250 they are adding new data in the inbox. The report manager 250 then retrieves and FTPs the appropriate metadata associated with the new data in the inbox, notifying the inbox of the new additions to the inbox, i.e., the new data and the associated metadata. The metadata is then stored in the inbox server database 273 along with the report results. Thus, if the metadata is required to be changed, it does not interfere with the information needed to display the reports included in the inbox.

Particularly, as shown in FIG. 10, the Inbox server 270 interface with the Inbox Client 210 supports messaging that enables the User to remove an item from the Inbox, e.g., for a particular Enterprise and User ID as well as other associated reports. Above referenced Appendix G of co-pending U.S. patent application Ser. No. 09/159,409 illustrates the parameters used in the metadata messaging between the Inbox client and the Inbox server. Particularly, the List "L" message is a synchronous request for a list of all Inbox items for a specific user. In the Inbox fetch "F" function is a bulk transfer request enables bulk transfer of the requested file to the Inbox client.

After editing or modifying an existing report, the user may simply select to save the report and exit. In this case, the ARD message is sent from the Report Requestor client to the RM server and is saved in the RM inventory database for subsequent execution. Consequently, the report is flagged as incomplete in the User_table and may not be run until a run option for that report is chosen. Otherwise, the report may be immediately scheduled if the user selects the save and run button.

As described, metadata messaging is used throughout the various components of the WRS system 200. The format of an interface message that is sent to the Report Scheduler server is identical to the format as the interface messaging format returned by the RS server 260. Thus, in the case of automatic recurring reports, a variation of the process outlined in FIG. 11(b) occurs at step 360, whereby the ARD request is instead sent from the report scheduler to the fulfilling server at the programmed frequency. Particularly, when a report is required to be run, the Report scheduler server 260 (FIG. 10) sends an ARD request to the fulfilling server in a metadata message format having parameters as included in the Add Report Definition table provided in above-referenced Appendix D. Upon processing of the metadata message, the fulfilling server will respond to the report Scheduler with an acknowledgment of the command, and the process outlined in FIGS. 11(b) and 11(c) is executed.

As described in greater detail in co-pending U.S. patent application Ser. No. 09/159,409 the Report Scheduler server 260 is additionally capable of updating the User report status table and, preferably, is provided with a tracking mechanism for tracking the scheduling of user reports. If the report is an Ad hoc report, it is marked as inactive in the user report table once the status is complete.

ODS

Figure 12:
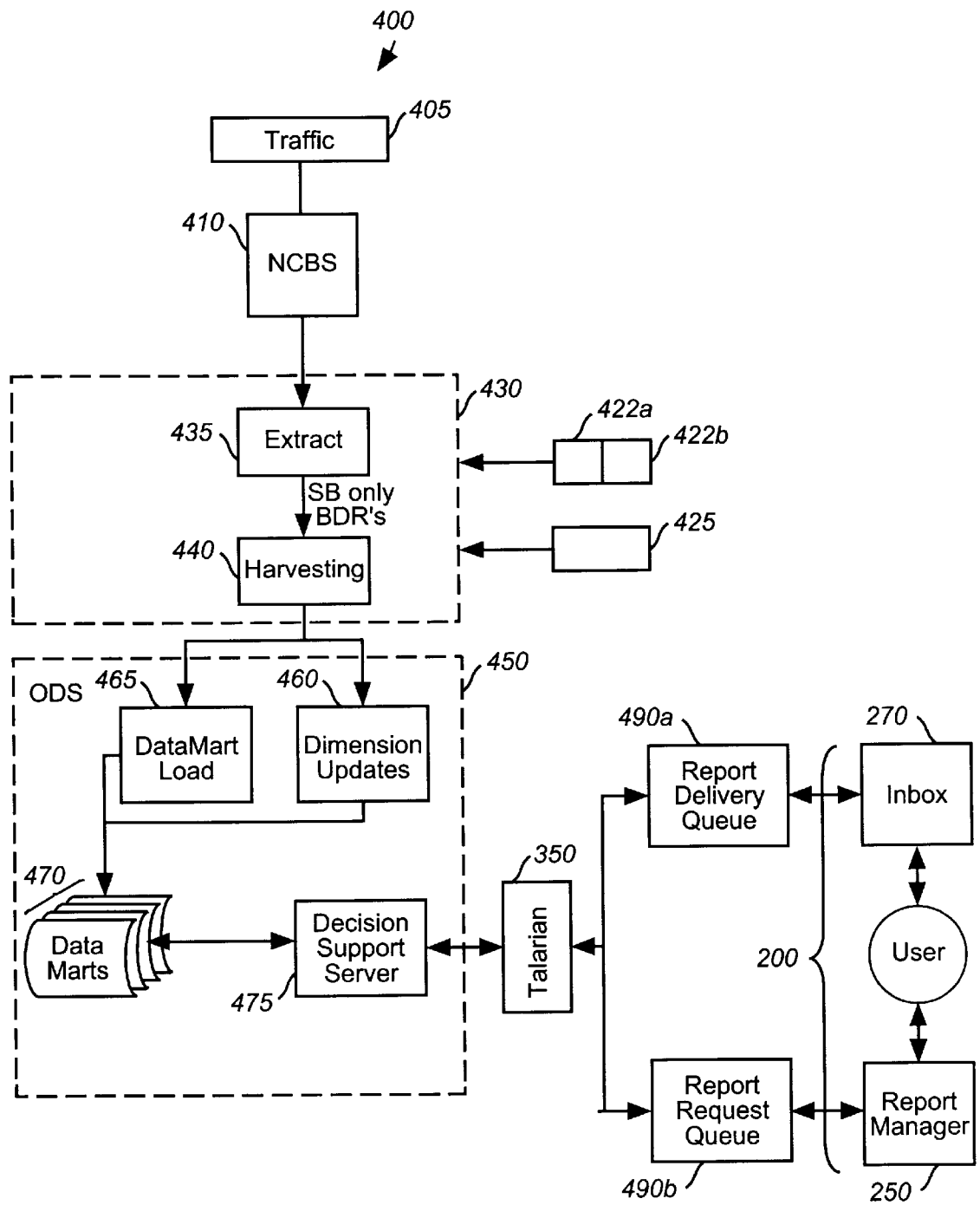
FIG. 12 illustrates the primary components implemented in the Operational Data Server (ODS) reporting component 400 of the present invention.

As mentioned, the ODS data management tool of the present invention comprises a back-end architecture providing customers with data pertaining to their data management systems. FIG. 12 depicts the high level logical approach of the OBS data management system 400 integrated within the overall WRS Web reporting system architecture 200. As will be described, the ODS system provided reporting and customization of reporting data and implements a data mart approach for maintaining the data used customer reporting. ODS stores and incrementally processes customer's data, and loads this processed data in data marts in a manner such as described in commonly owned, co-pending U.S. patent application Ser. Nos. 09/159,684 entitled PROXY INTERFACE FOR WEB BASED DATA MANAGEMENT TOOL and 09/159,402 entitled DATA WAREHOUSING INFRASTRUCTURE FOR WEB-BASED DATA REPORTING TOOL, the contents and disclosure of both references being incorporated by reference as if fully set forth herein. From these data marts, customer's reporting data can be provided to customers on a daily basis via the WRS reporting system.

A common database such as provided by OE server 39 is maintained to hold the common configuration data which can be used by the GUI applications and by the mid-range servers. Such common data will include but not be limited to: customer security profiles, and billing hierarchies for each customer.

As shown in FIG. 12, a first data feed 405 may be provided as raw data from external source, which translates and sorts the data into billable records for input into a system such as a Commercial Billing system ("NCBS") mainframe server process 410 for pricing the records at tariff for customers subscribing to, e.g., enterprise's products. A common data gateway component 430 including a mainframe extract process 435 and a data harvesting process 440 receives these inputs on both a daily and monthly basis for processing as described in detail in co-pending U.S. patent application Ser. No. 09/159,402 entitled DATA WAREHOUSING INFRASTRUCTURE, the contents and disclosure of which is incorporated by reference as if fully set forth herein. Particularly, the mainframe extract process 435 creates a selection table including all subscribing customers, compresses files for transmissions and extracts reporting records from the runstreams. The harvesting process 440 is responsible for performing data validations, filtering, data translations, data grouping, data routing, and data logging functions. According to a dimension table based on data within selected BDRs, the harvesting process applies business rules to the data, cleanses the data, transforms the data, creates load files for data marts and compresses files for storage in the data marts. The harvesting component 440 may additionally perform an aggregation function for supporting long term storage and rapid access of data for customer reporting, and performs trigger actions/events based on predefined criteria.

Additionally, as shown in the FIG. 12, other external systems and applications may interface with the common data gateway component 430 including: Cyclone Billing system 422a which provides additional billing detail records; and, an area database 425 which provides geographical reference information, i.e., identify city, state and country information.

After the data has been processed in the Harvesting component 440 it is input to an operational data store component ("ODS") 450 that stores the billing detail records and dimension tables as a data model. In the preferred embodiment, the data model of ODS is a dimensional or "star schema" model, including a central fact table multiply joined to a number of attendant tables known as dimensions. The relationships between the fact table and the dimensional tables are either enforced through keys, which may be generated, or as lookup codes. The ODS layer 450 is thus comprised of all data harvested from all applications in the data harvesting layer 430, and feeds report-supporting Data-Marts 470 in a manner which supports customized data access. The Datamarts may be engineered to pre-process data, create aggregates, and otherwise perform transformations on the data prior to DataMart loading 465 in order to implement a defined data model, e.g., star schema key structures, fact and dimension tables depicted as block 460. In the preferred embodiment, as shown in FIG. 12, the Operational Data Store 450 includes multiple datamarts 470 each for storing and retrieving daily and monthly data on a periodic basis. It primarily is responsible for hosting highly current data, e.g., at least 72 hours old. In accordance with customer-reporting needs, data marts 470 are partitioned in accordance with partitioning schemes which, for example, may be based on customer-ID. Particularly, each DataMart is engineered for servicing specific customers or specific product sets, as well as engineered for the specific requirements of the customer/product such as high insert activity, heavy reporting requirements, etc. As data is volatile and changing and may not produce consistent results for the same query launched at multiple times, ODS is engineered for high performance through appropriate storage technologies and parallel processing. Although not shown, a Common Data Warehouse is provided in this ODS layer that is responsible for performing storage, retrieval and archiving of data, typically of relaxed currency (e.g., more than 24 hours) and is targeted at trend analysis and detection. In the preferred embodiment, the datamarts utilize an Informix™ database in a star topology.

From the data included in these data marts, one-time or recurring data reports for the above-identified reporting categories are available for reporting through the WRS system 200.

Additionally, referring to FIG. 12, there is provided a decision support server ("DSS") reporting engine component 475 that performs the following functions: 1) receives data access requests from various users in the form of a report request from the WRS GUI Report Requestor component; 2) routes the query to the appropriate data marts 470, data warehouse or operational data store; and, 3) responds to the requester with the result set. The DSS server 475 may also perform cost estimation, agent scheduling, workflow broadcasting interface, and transaction logging functions. In the preferred embodiment, the DSS 475 is a cluster of DEC (Digital Equipment Corp.) UNIX 8400 servers running Information Advantage® software accessing an Informix™ database distributed across multiple Data Marts.

As shown in FIGS. 10 and 14, the ODS component 400 interfaces with WRS Web reporting tool 200 for specific customer reporting requirements. As described, the Report Requester 260 communicates with the user client 201 and controls navigation and requests for customization criteria via the Web browser. The Report Requester receives from OE any billing hierarchies and static pick lists needed by the client to customize report requests. Report request customizations are then passed to the Report Manager, which acts as repository of report requests, both adhoc and recurring, that are submitted for processing by the client. Along with the necessary customization criteria selected for report customization, the Report Manager 250 stores metadata about the report request, including report format information, sort, and display specifics. The Report Manager is responsible for passing report requests to the back end DSS and DataMarts for processing, and provides the entity against which the list of report requests known to the datamarts are validated.

The Inbox server component 270 is the store and forward repository of all completed reporting requests, requests for call detail data, and any communications to the customer. It is the responsibility of the Decision Support Server 475 to ship formatted data in a compressed comma delimited format ("CDF") to the Inbox. Customers are then responsible for retrieving their report data held in the Inbox, in the manner described herein.

In accordance with the invention, the primary function of the DSS 475 is to generate billing report data in accordance with the customer's request. To accomplish this, the DSS interfaces with two WRS systems: Report Manager 250, and Inbox 270, as shown in FIG. 12. The Report Manager formats the customer's request in accordance with a defined set of rules and sends the request to the DSS. The DSS 475 reads customer's requests which are metadata descriptions of the type of data report requested by a customer, translates the metadata into database queries, and implements commercial off-the-shelf ("COTS") tools to run the queries against the data in the DataMarts, format the query results into a form readable by WRS report viewing components, and transmits the completed reports to the directory of the customer's Inbox, e.g., via FTP. In the preferred embodiment, Talarian SmartSockets™ messaging middleware is used to coordinate report requests transmitted from the WRS report Manager to DSS, and report completion notification from DSS to the WRS Report Manager. The Report Manager formats the customer's request in accordance to a defined set of rules and sends the request to the DSS as a Talarian message with the Report Manager 250 maintaining the Talarian Sender program, and the Decision Support Server 475 maintaining the Talarian Receiver program. Messages are sent with guaranteed message delivery ("GMD"), thus assuring all request data sent by RM is received by the DSS.

Aforementioned U.S. patent application Ser. No. 09/159,648 describes in greater detail the Report Manager/DSS application programming interface "API" whereby the RM server 250 publishes the message to the Decision Support Server in response to its receipt of a report request. In the preferred embodiment, as described, all return messages are persistent. Thus, as shown in FIG. 12 the DSS incorporates a Talarian message queue 490*a* operating on a First-In-First-Out (FIFO) basis. If the DSS is unable to establish the connection with Talarian, or there is an error in transmission, the DSS queues all messages, and continues to retry until a successful send is executed.

Aforementioned U.S. patent application Ser. No. 09/159,648 additionally describes in greater detail implementation of a report scheduler process that allows users to generate reports based on scheduled events. Once the report is defined, the user may request the generation of immediate, daily, weekly, and monthly reports.

In the preferred embodiment, the DSS architecture is transparent to the Report Manager, which publishes Telarian messages to which the DSS will subscribe. In addition to the tokenized character string request message which specifies report type, filters, and any request-specific information, RM server provides additional fields as part of the Talarian request message including: a Corp_ID, Priority, and RequestID. Corp_ID allows the DSS to route the request to the appropriate data store without invoking the parser. Data are partitioned on Corp_ID in the ODS database warehouse. Request_id is used to send back an ARDA failure message, in the event of an invalid message. The Priority field allows DSS to pickup the next high priority request from a queue of non-processes requests, without invoking the parser. Details regarding the use of Talarian interface in the context of the ODS system component 400 is described in greater detail in above-referenced U.S. patent application Ser. No. 09/159,684.

For data reporting, the WRS report requester functionality is invoked as described herein. Particularly, the end-to-end process 600 from a data report request to report delivery is shown in FIGS. 13(*a*)–13(*c*).

Figure 13A:
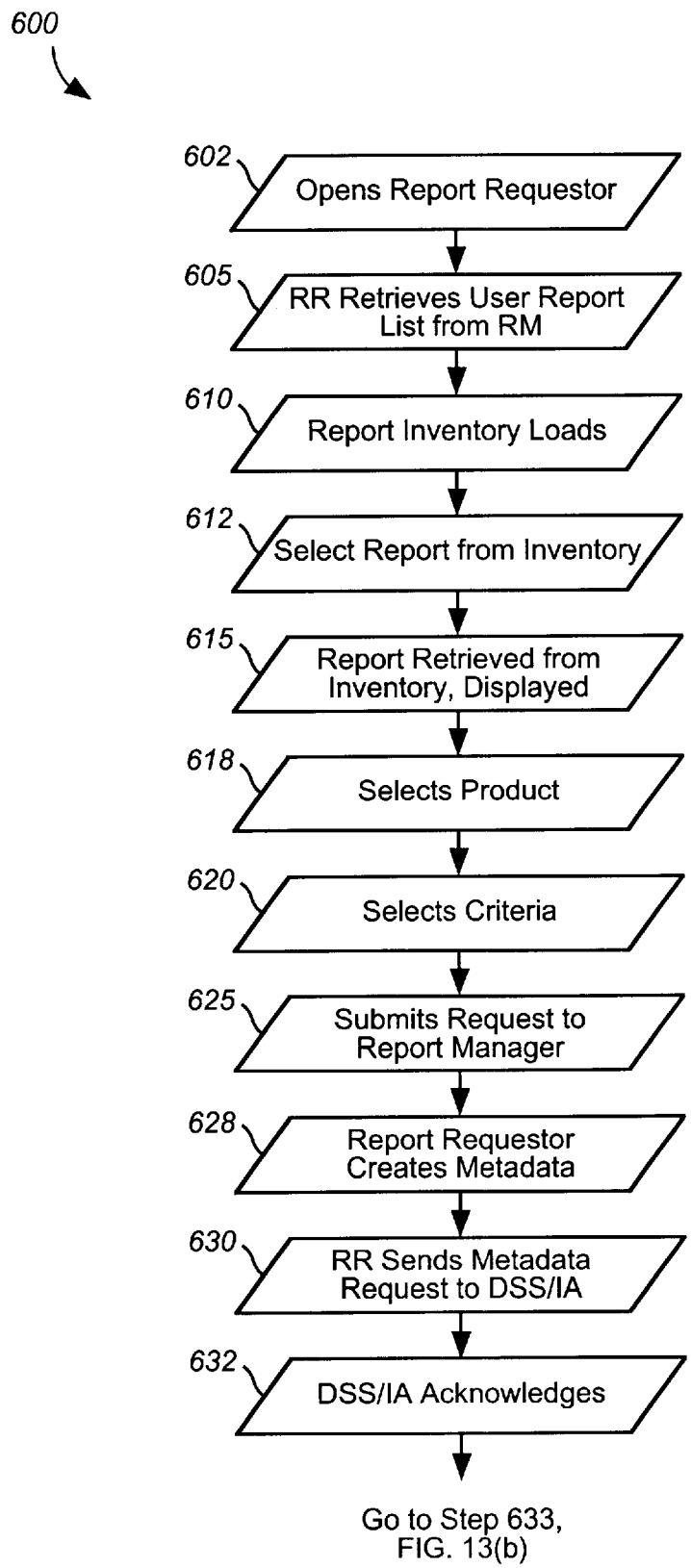
FIGS. 13(a)–13(c) illustrate the end-to-end process 600 for fulfilling priced call detail data report request.
Figures 13B, 13C:
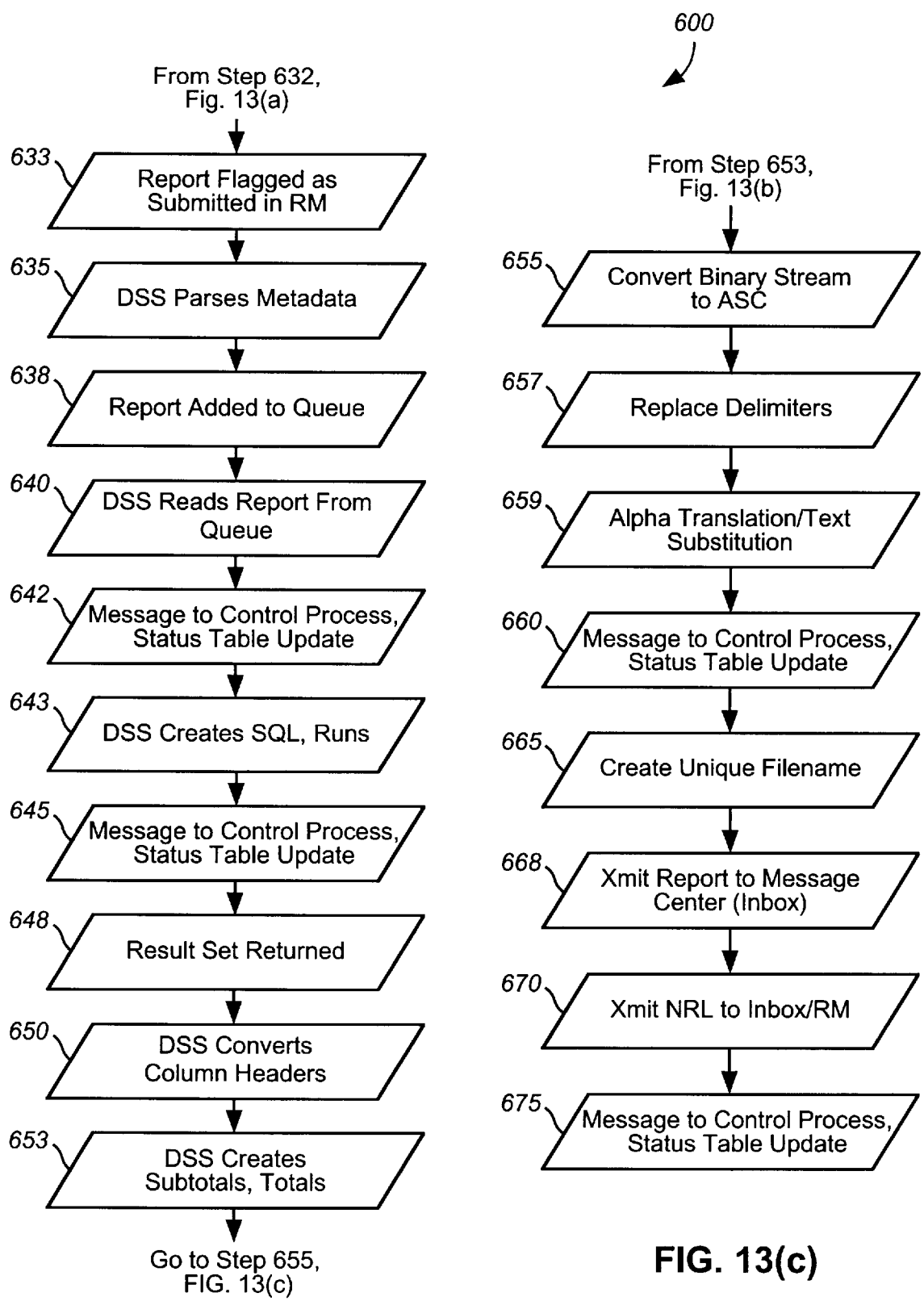

Assuming successful user logon and authentication, as described herein, the first step 602 of FIG. 13(*a*), indicates that a user has opened the report requester dialog box from the home page (FIG. 5(*a*)) by selecting the Report Requestor icon 83.

Using metadata messaging, the WRS Report Requester retrieves an available report list (including user defined list) from WRS Report Manager, as indicated at step 605. This process entails invoking a Communication Manager object to communicate with the RM server in order to obtain a SURL metadata message, as described.

Next, as indicated at step 610, the Report inventory for the specific user is loaded and displayed for the user on the user report request display screen, enabling the user to select a report, as indicated at step 612. Then, at step 615, the selected report is retrieved from WRS Report Manager and displayed in the manner as described.

Then, as indicated at steps 618 and 620, the user selects a product, including phone numbers and geographic locations, etc. and enters criteria, i.e., reporting interval and frequency, if a new report is desired. Specifically, when the user selects a report from the Inventory List or a new report, an WRSEdit Screen is launched to provide the editing capabilities which are available for the Report format, as described. Once a report is created the user may save the report request, e.g., by clicking a "Save and Exit" button, or submit the request, as indicated at step 625, e.g., by clicking a "Save and Run" button. When a report is submitted the selected report type and reporting criteria are sent to the Report Manager. As indicated at step 628, the RM creates the metadata request for which the DSS has a predefined interface. The metadata request is submitted by WRS Report Requester to a COTS software module, e.g., such as provided by Information Advantage® which module is used for the generation and execution of SQL queries and retrieval and formatting of the results. Particularly, the metadata requests are transmitted via an interface with the Talarian Smart Sockets product and a header is built for each report request including the CorpID and Enterprise information which is used by the IAIO to select the proper DataMart as the target for the query. At this time, the report requester additionally creates an entry in a RM table to track the progress of the request. RM communicates with the ODS using Talarian Smart Sockets® which creates a header comprising the product and other information, and controls the delivery of the report request. Smart Sockets guaranteed messaging feature automatically routes the call and repeatedly tries until the delivery is successful.

Next, as indicated at steps 630 and 632, the DSS receives the request and acknowledges receipt. Specifically, when the request is received it is first validated with OE to ensure that the user is entitled to receive information about the selected product corp and number(s). Once the request passes validation, the DSS IAIO reads the header to determine which Data Mart will ultimately be queried. It then parses the metadata into a format which the COTS software can readily convert into a SQL query, as indicated at step 635, FIG. 13(*b*), and adds the report to the DSS report queue based upon type (Daily, Weekly, Monthly, Adhoc) and associated DataMart, as indicated at step 638. It should be understood that at this point, the request has been flagged as submitted in the RM database, as indicated at step 633.

From this point forward, DSS activity is controlled by a control process and progress or errors are logged internally in the DSS system. This control process includes logic enabling the prioritization of report requests and application of rules defining the order in which they should be executed. Thus, at the appropriate time, depending on the type or report, reporting period and other parameters, the Information Advantage® query engine selects the report from the queue, as indicated at step 640, which action is logged in the report status table as indicated at step 642. The SQL query is then built and executed. Particularly, the COTS module, i.e., Information Advantage®, first reads the report header to determine which data mart includes the information needed to complete the request. A request is sent to WRS Report Manager for the appropriate report template. When the report template metadata is returned, the SQL query is built and the request is routed to the appropriate data mart for execution, as indicated at step 643. The query engine generates the SQL query from the metadata and executes the report which action is logged in the report status table as indicated at step 645. Next, as indicated at step 648, the query results are returned, and, as indicated at steps 650 and 653, the Information Advantage® software respectively converts the column headers and creates subtotal and total entries. Particularly, the result set is delivered by Information Advantage® in a proprietary binary data stream file format which requires translations in order to be viewable using WRS viewers. As shown in FIG. 13(*c*), first the output is converted to a (ASC) text file as indicated at step 655. Then, the text file is formatted for placing the report in the proper format for subsequent interpretation by the WRS report viewer and presentation to the user. This formatting includes the steps of: replacing existing delimiters, e.g., tabs to commas, as indicated at step 657; and, executing alpha-numeric text substations , if necessary, for the code values used in the database, as indicated at step 659. At this point, a message is sent to the control process to update the status table, as indicated at step 660. Then, as indicated at step 665, the formatter gives the result set a unique name and saves the file.

Finally, as indicated at step 668, DSS transmits the report to the WRS inbox server using FTP. Once the file has been successfully transferred to the Data reporting directory on the Inbox server, an NRL message is sent to the RM Server 250 notifying it of the report file name, requestor information and successful transfer, as indicated at step 670. An NRLA is sent back to the DSS. Report Manager is subsequently notified of the successful completion of the report and the report request is marked as completed in the RM database, as indicated at step 675. If the report is a recurring report, it is not marked as complete. After the control process updates the report status table, the WRS Report Manager is notified that the report is complete and the Inbox server notifies the user that report is ready.

A user may subsequently retrieve the report by clicking on the message center icon 81 from the home page of FIG. 5 which will present to the customer a list of all the available reports. To view a report the user selects the report and, the report metadata and the appropriate viewer are downloaded to the user (client) workstation.

Trouble Ticketing

Another application of the suite of data management applications is the Trouble Ticketing application which is a Web-based data management product that enables customers to create, status, and display service requests, i.e., trouble tickets, to the enterprise service provider. Particularly, through a client application GUI, customers have the ability to create and query trouble tickets ("tickets").

FIG. 2 illustrates the Trouble Ticketing application server 36 interfacing with a back-end Customer Service Management" ("CSM") legacy host system 40(a). The Trouble Ticketing application server component 36 includes processes for handling all requests made of Trouble Ticketing by the customer (as relayed via the Dispatcher 26). Specifically, requests are handed off to Trouble Ticketing back-end processes and responses are received from the Trouble Ticketing back-end processes to be routed back through the Dispatcher to the client workstation Web browser 20.

As in any of the above-described suite of data management applications, the Trouble Ticketing application utilizes the Common Objects application framework (COF) to inter-operate with the backplane and integrate with the other elements of the architecture provided in the system of the present invention. The Common Objects framework is utilized to leverage existing infrastructure services such as logon and authentication, transaction management, and security. Particularly, the Trouble Ticketing application extends the COAppImpl class in order to inter-operate with the backplane and other applications (as required), and, includes one or more screens derived from the COAppFrame class. Most of the high level classes dealing with the initiation of transactions are utilized by Trouble Ticketing. The COClientSession class is available to the Trouble Ticketing application upon successful login to the system of the present invention and is utilized for session management (e.g., connect, disconnect, and logoff). The family of COTransaction classes is used to send and receive messages to the back-end Trouble Ticketing service. These classes include CONonblockTransaction, COSynchTransaction, and COAsynchTransaction and, a COBulkTransaction may also be used if necessary. Additionally, the Trouble Ticketing utilizes all of the COCommunications classes with the exception of the COBulkTransaction. However, as development and testing continues, the COBulkTransactions class may be utilized.

Figure 16A:
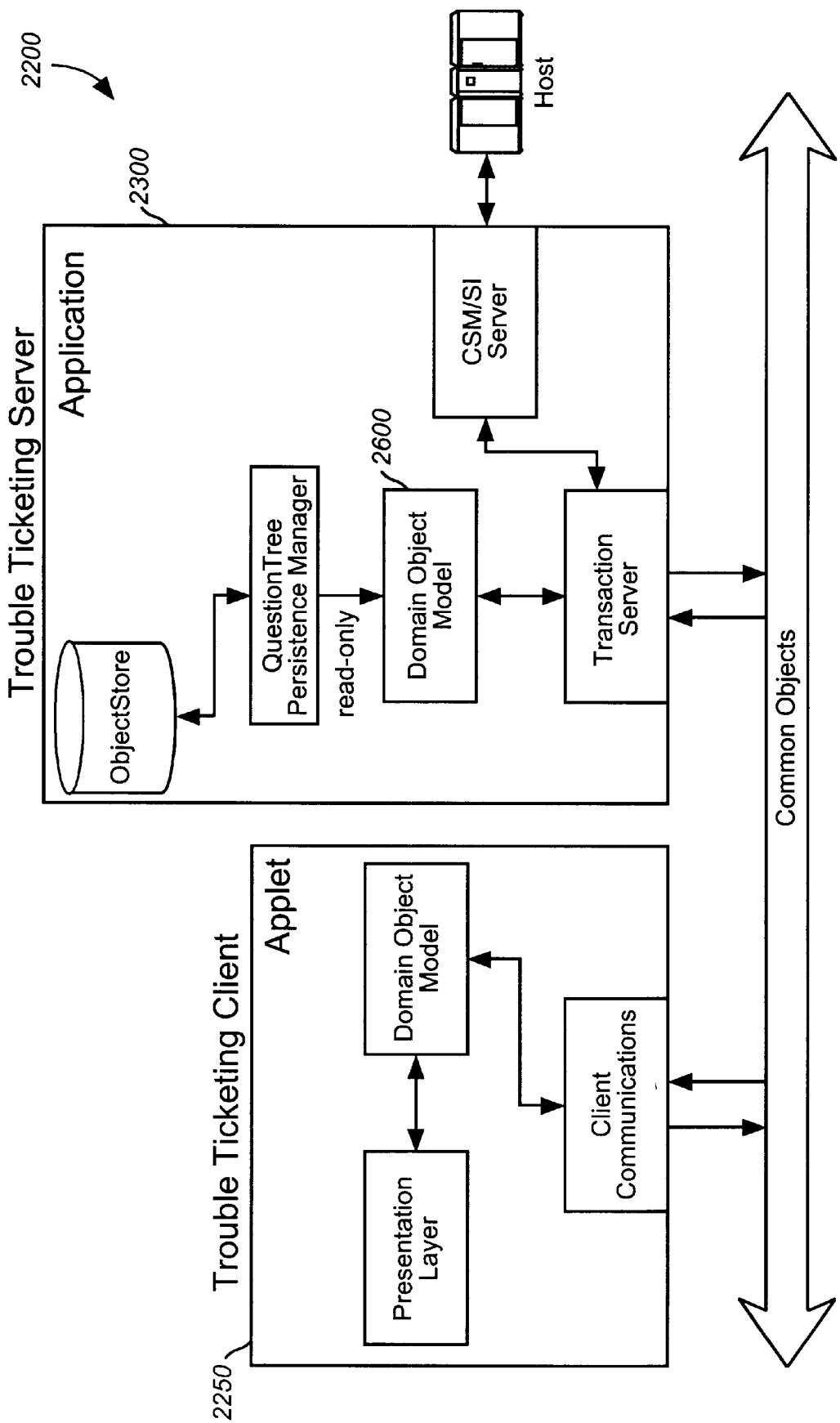
FIG. 16(a) illustrates the high-level design of the Trouble Ticketing application 2200.

FIG. 16(a) illustrates the high-level design of the Trouble Ticketing application 2200 including the client application 2250 and server 2300 components. As shown, Trouble Ticketing requires integration with a number of external systems and utilizes the Common Objects Framework for inter-application communications. Interfacing with the Trouble Ticketing application server 36 via the common objects framework are the OE server, e.g., for user profile information, as well as other Trouble Ticketing specific data, and, the CSM legacy host that provides the ability to query, status, and take action on service inquiries. Communication between the Trouble Ticketing application server 36 and CSM 40(a) is via Registry middleware, such as described in commonly owned, co-pending U.S. patent application Ser. No. 08/560,550 incorporated by reference herein. FIG. 3 shows COF-based inter-application communication between Trouble Ticketing and OE. It should be understood that if an external system does not use the COF, Trouble Ticketing may utilize that system's API set and communication mechanism for inter-application communication. The above-referenced Registry system has a number of options for inter-application communication, including both Java and CORBA interfaces.

The Trouble Ticketing communications and application server packages provide the framework for transporting client messages to the mid-tier application server for invocation of domain objects. The domain objects encapsulate the logic to translate the actual client messages and deliver the request to the backend services. The response from the backend service is then received by the application server and returned to the originating client. The framework is designed to allow the user to develop the business logic independent of the underlying transport layer and negate the need to modify the transport layer whenever a new domain model is introduced into the framework. The separation of the framework from the domain is accomplished through the use of reflection by dynamically loading and executing the business logic at the application server once the client request specification is received.

Figure 16B:
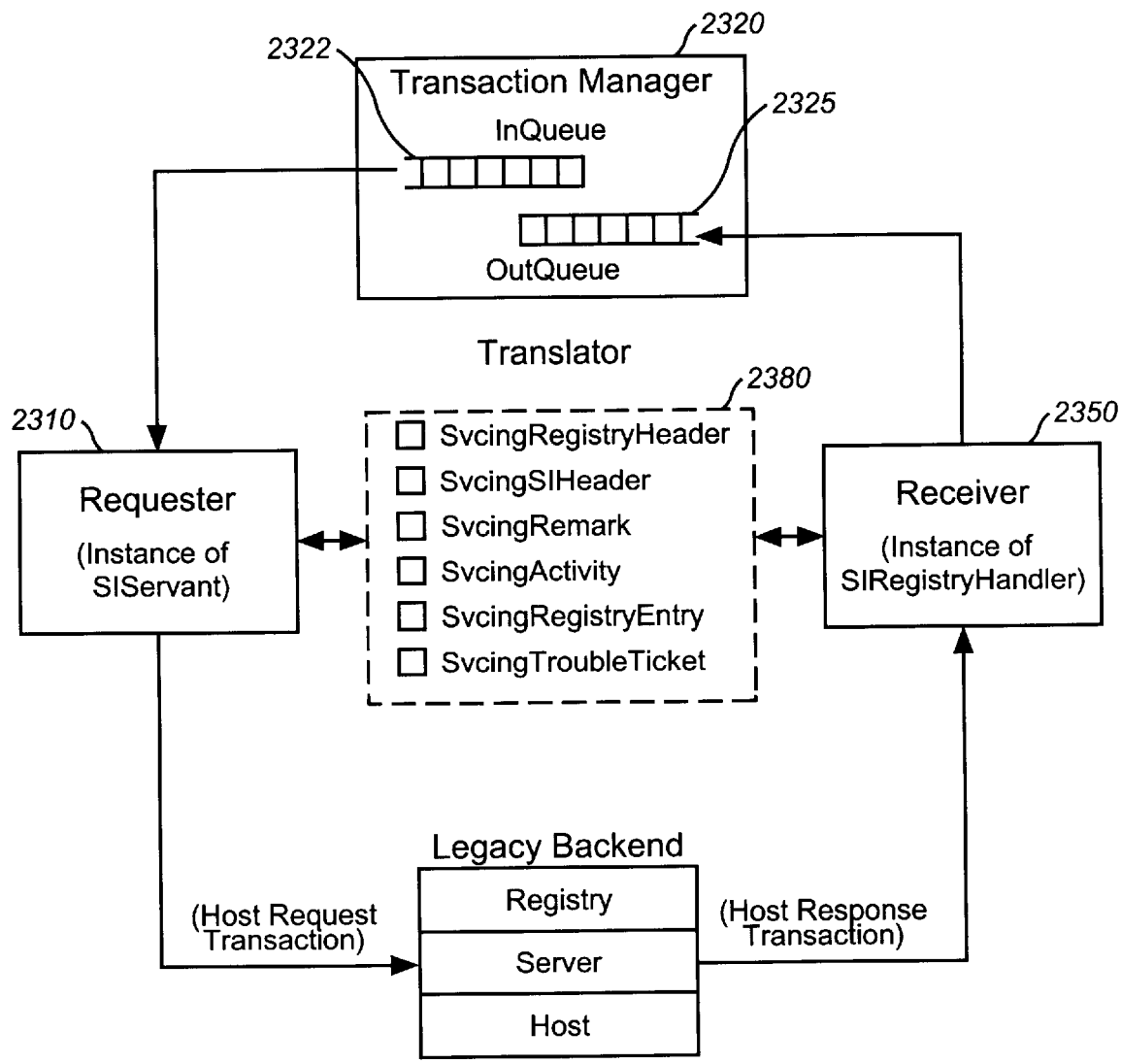
FIG. 16(b) illustrates the Trouble Ticketing application Server 2300 interfacing with the Legacy Backend 40(a), CSM through Requester and Receiver objects.
Figure 16C:
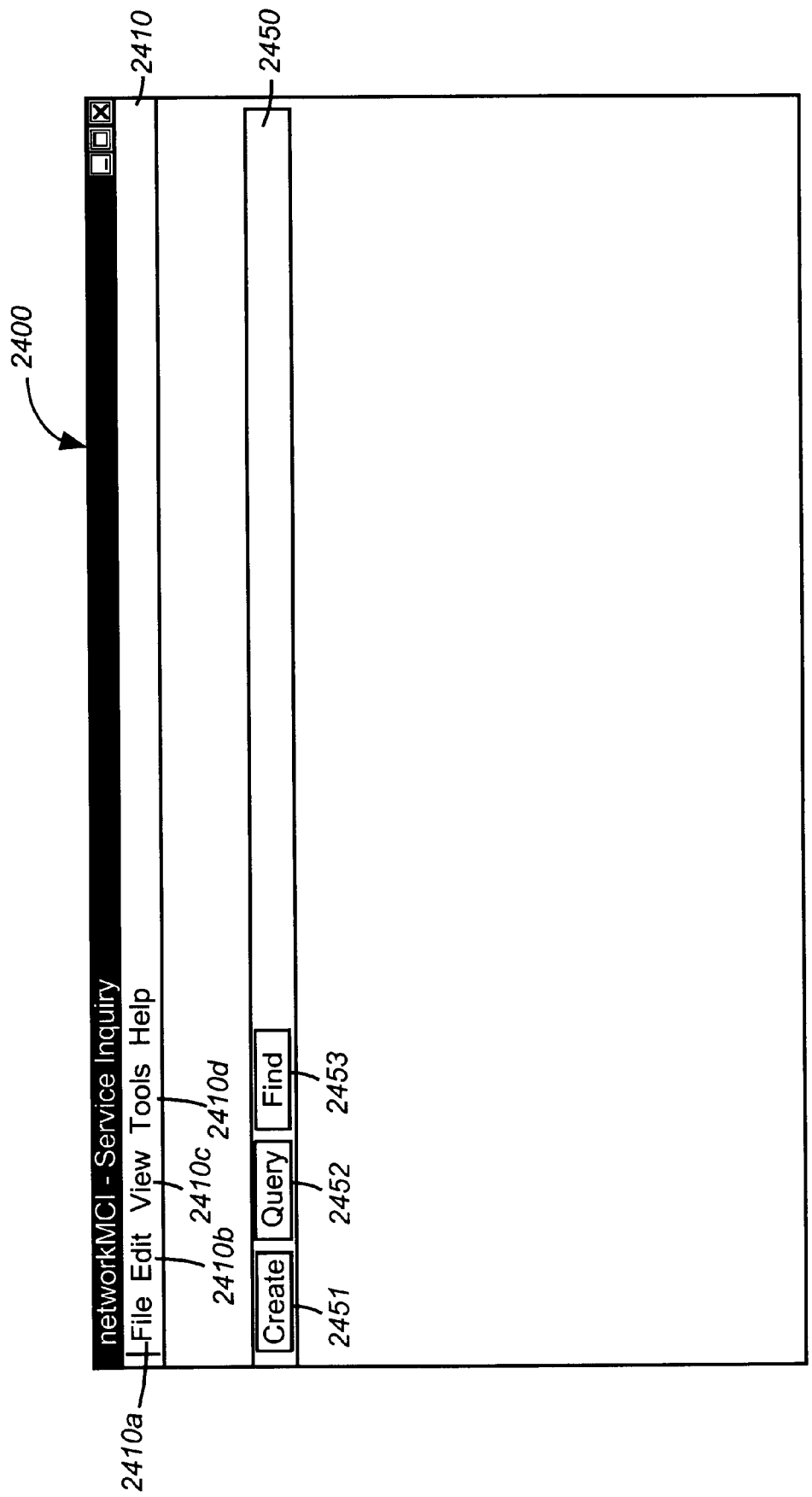
Figure 16D:
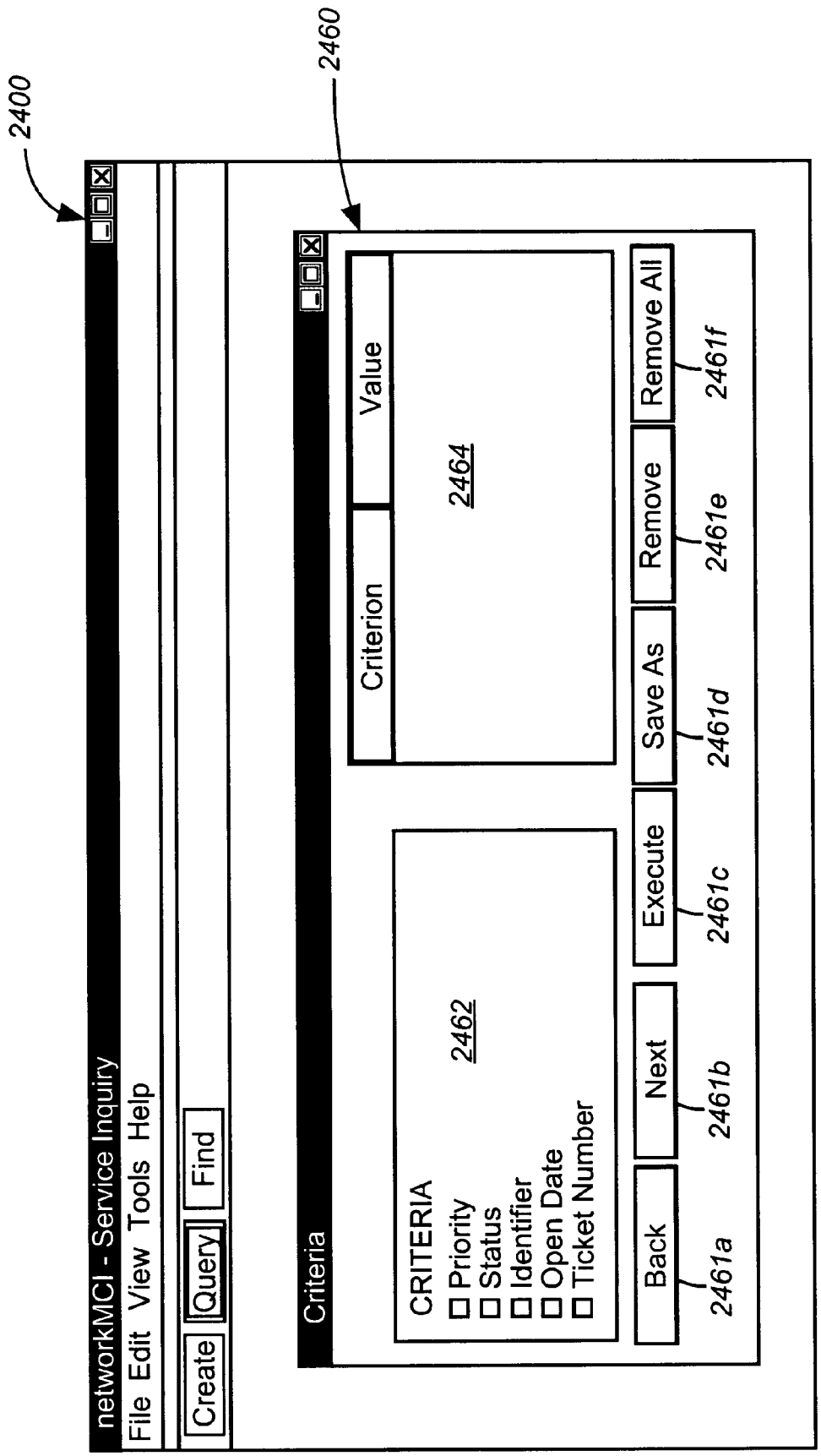
Figure 16E:
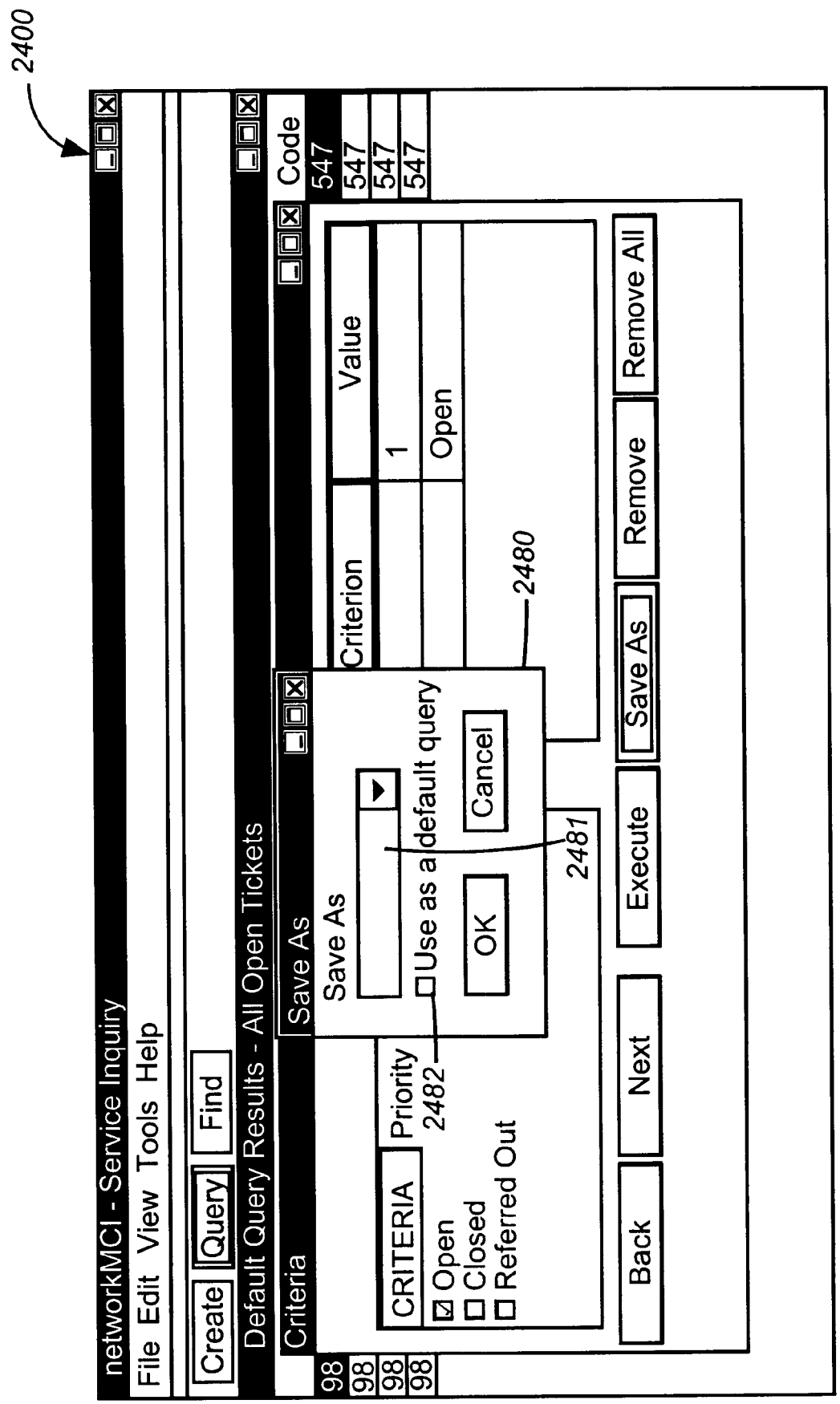
Figure 16F:
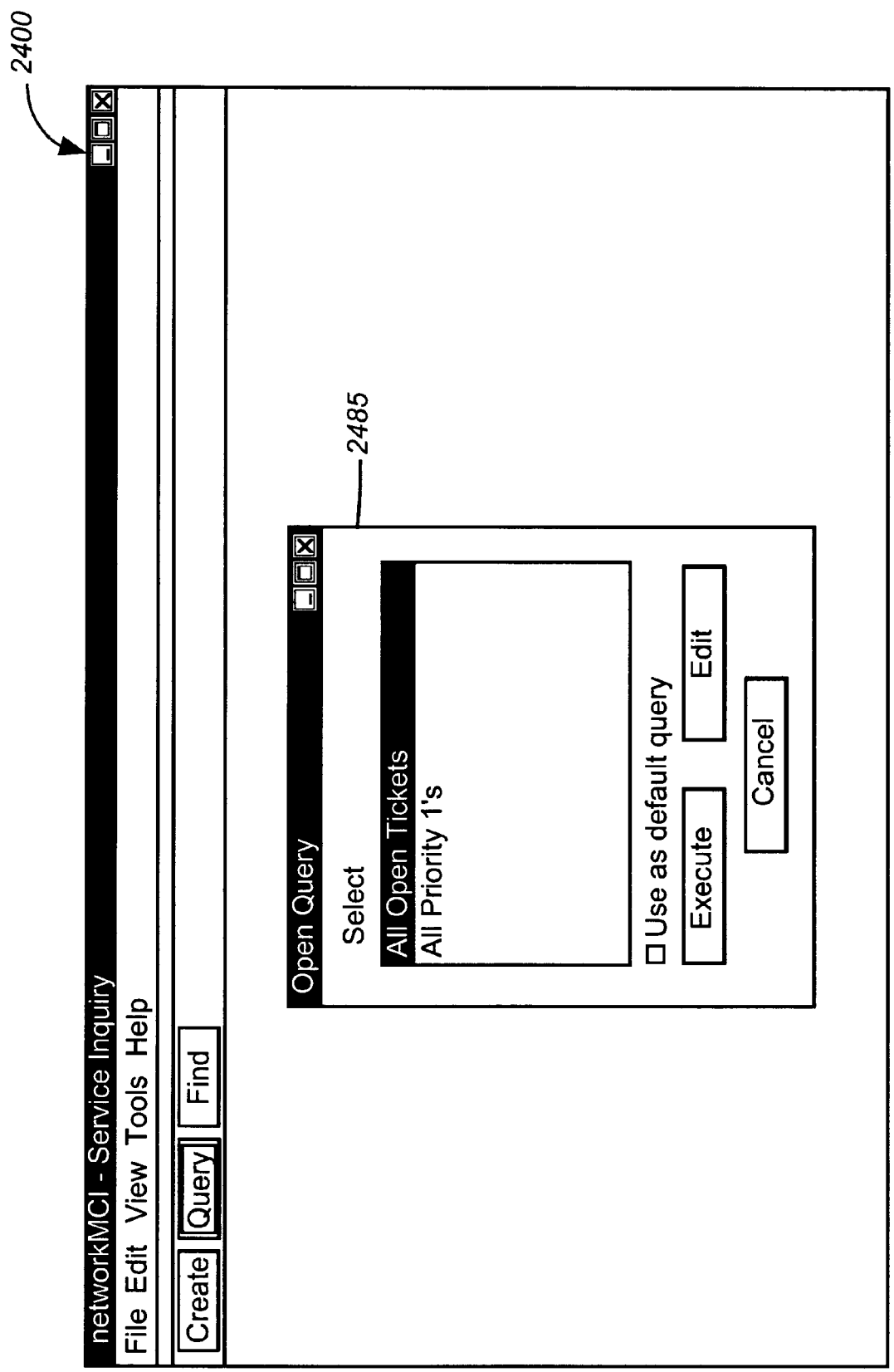
Figure 16G:
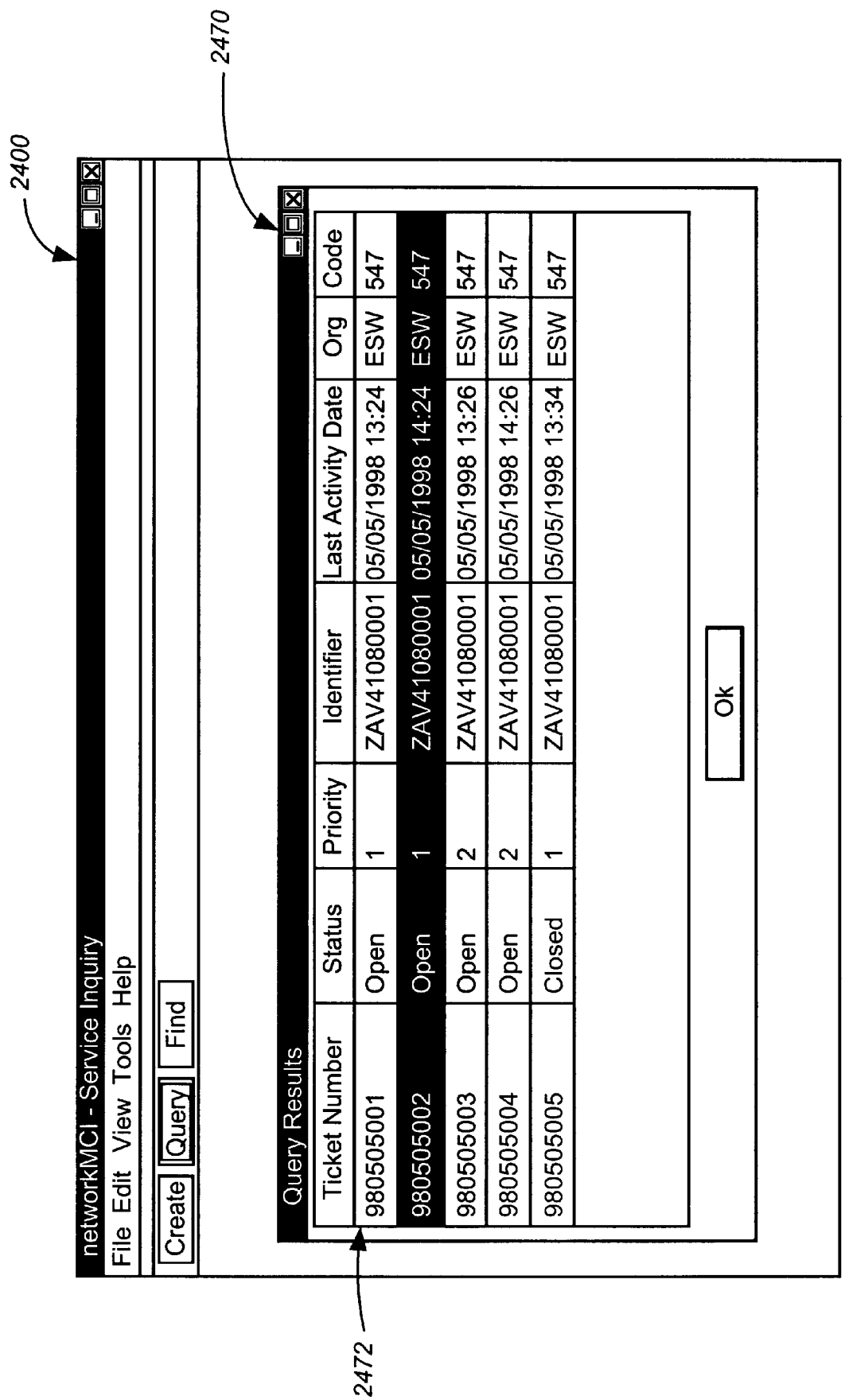
Figure 16H:
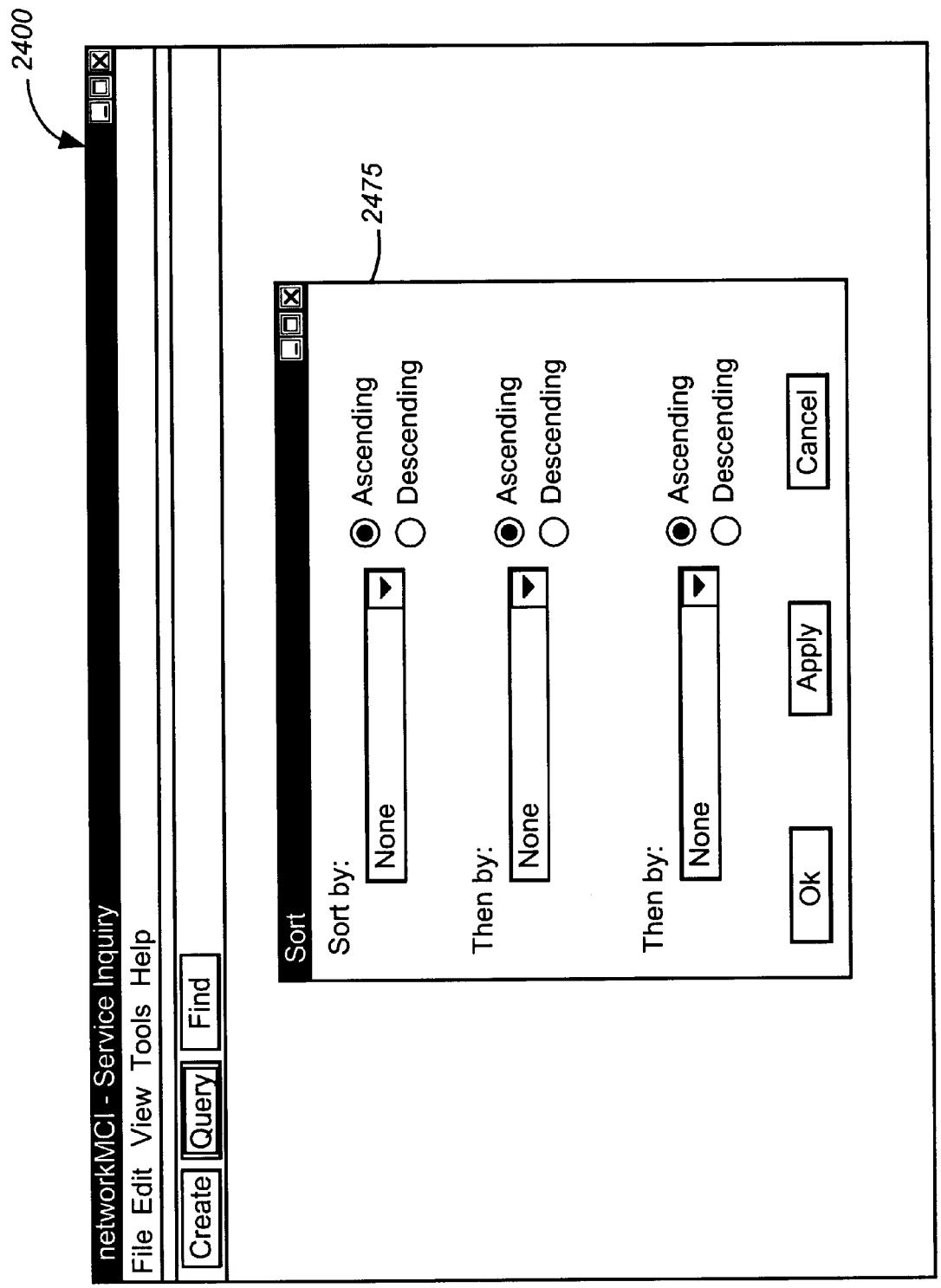
Figure 16I:
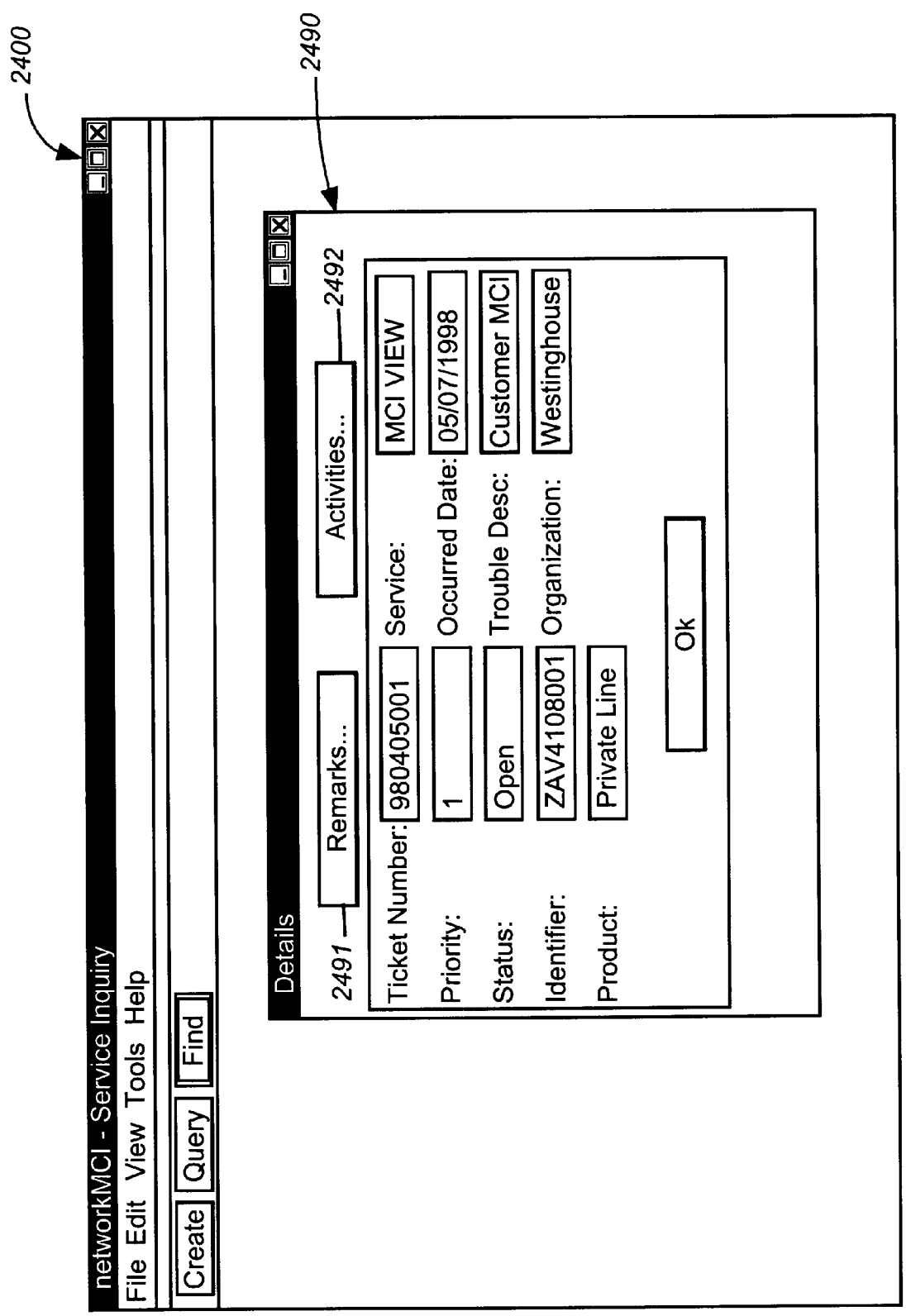
Figure 16J:
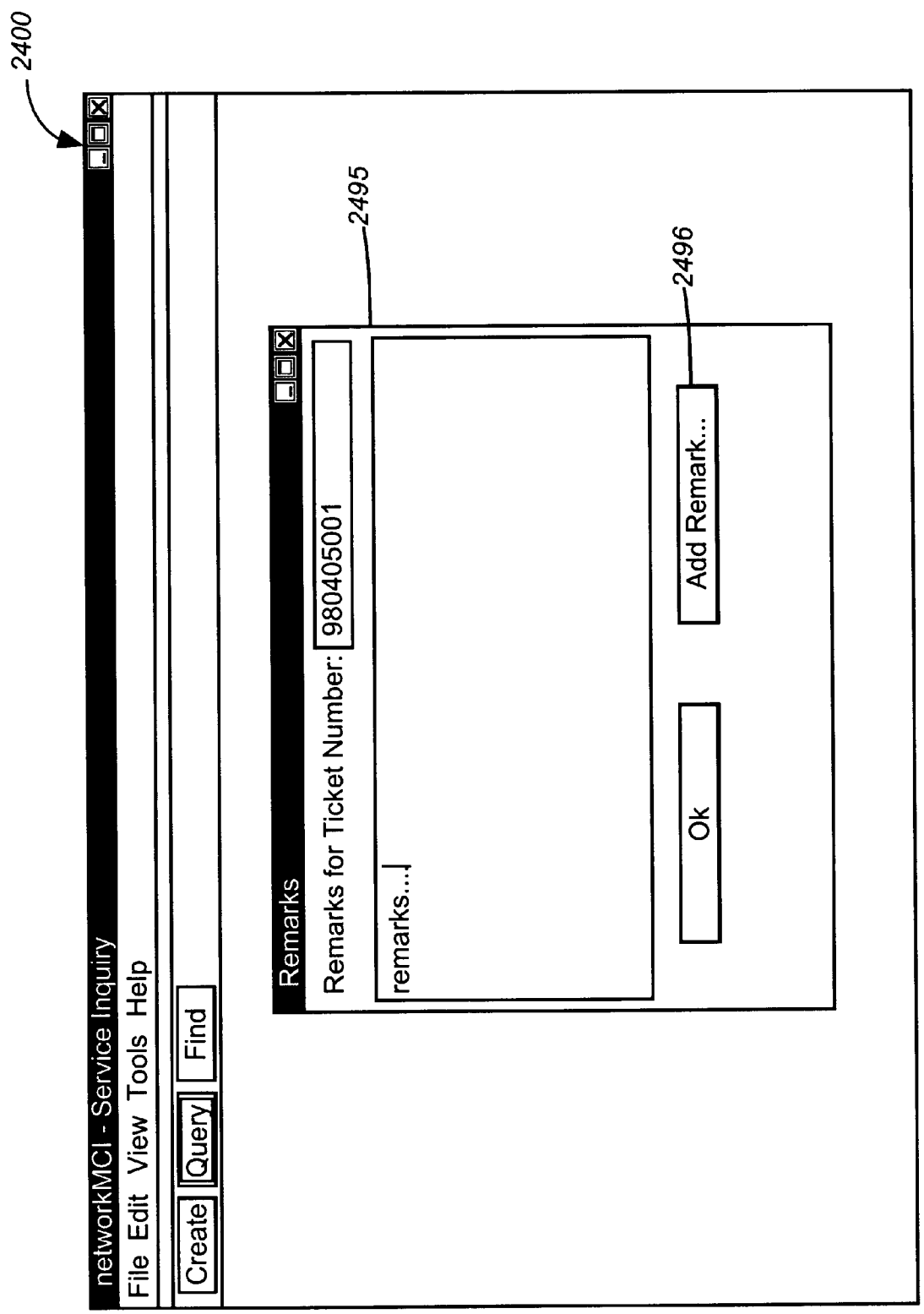
Figure 16K:
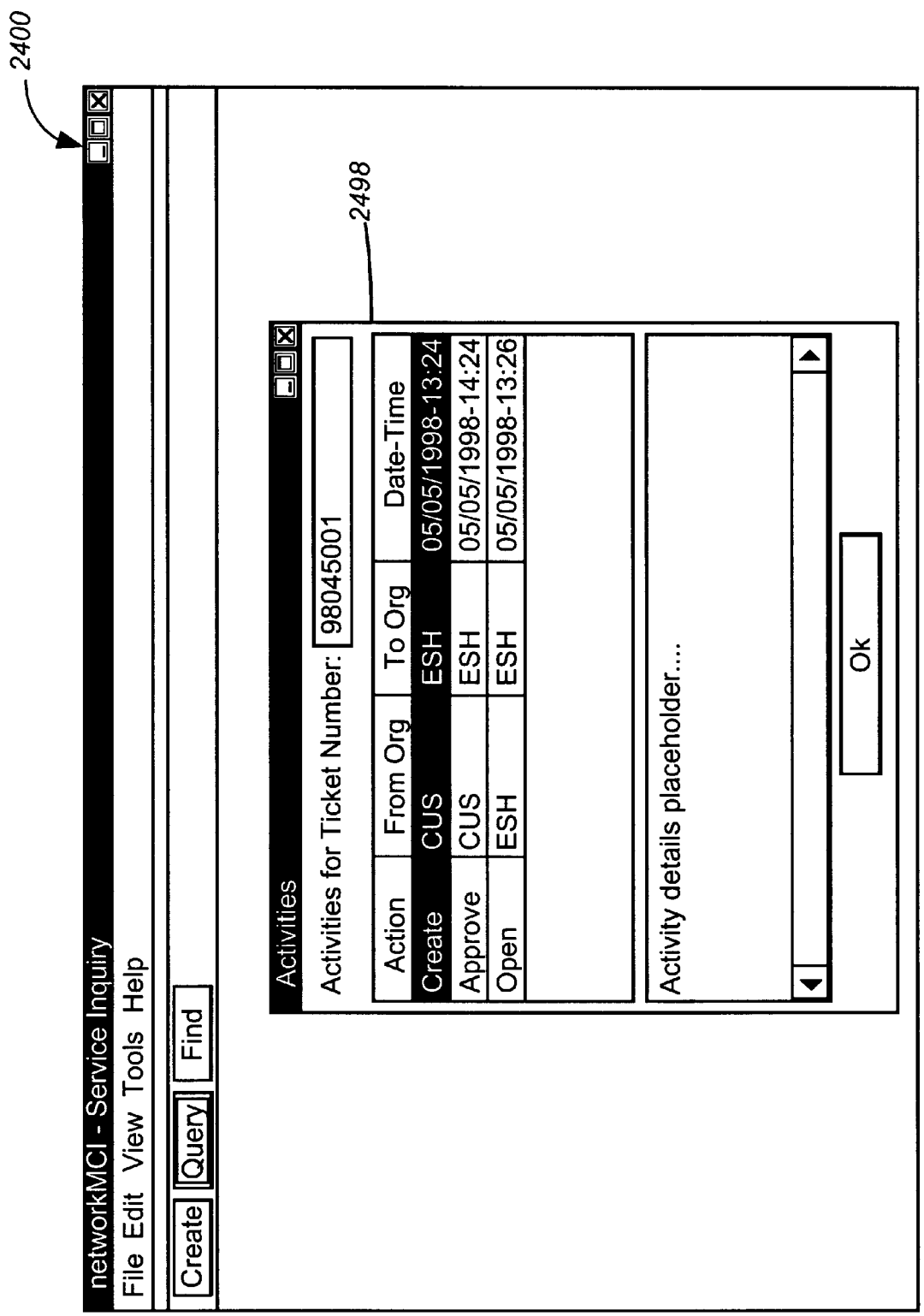
Figure 16I:
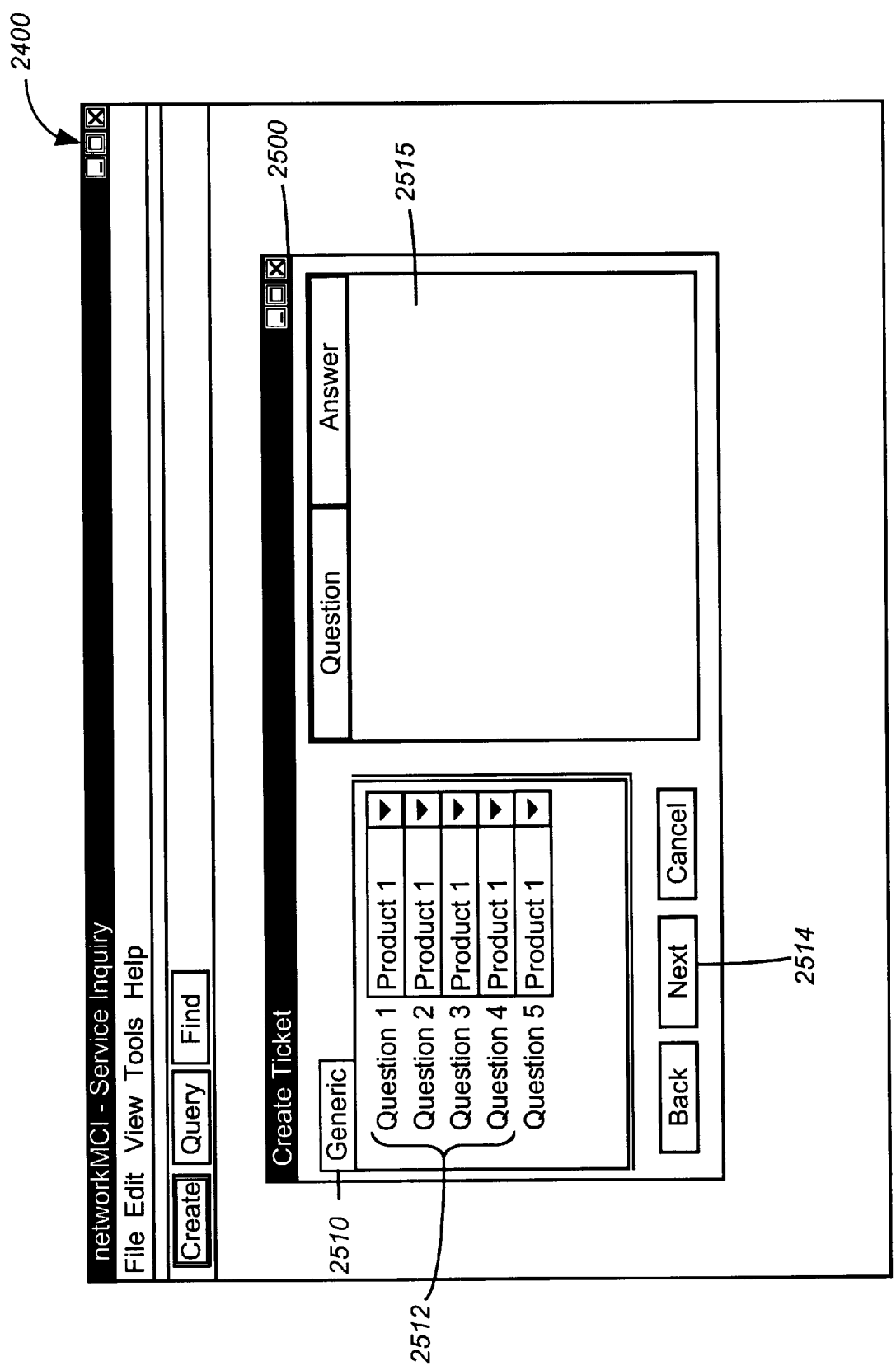

The Trouble Ticketing application Server 2300 interfaces with the Legacy Backend 40(a), CSM through a Requester object 2310 and Receiver object 2350 as shown in FIG. 16(b). Particularly, the SvcInqCSMRequester object 2310 is the class that represents the requester which takes the request data that comes from the Front-End/Client application through the Transaction Manager 2320, builds the CSM request transactions by interacting with the Translator classes 2380 and ships off the requests to CSM. The request data that comes from the Front End/Client is an array of strings that are required from the customer for the request to be made. Minimal information is passed from the client to reduce the communication overhead from the client to the Trouble Ticketing application server. All other information is packaged in the Requester. Particularly, the Requester object 2310 uses the SvcInqRegistryHeader and SvcInqSIHeader classes in the Translator 2380 to build the "Registry Header" and "Trouble Ticketing Header" strings that are required for the CSM request transactions. It also talks to the SvcInqActivity or the SvcInqRemarks classes to build the data portion of the CSM requests. Once the CSM Transaction String is formatted the actual request to CSM is made. Sending the transaction to CSM's Standard Interface (SI) via Registry classes does this.

The receiver object is an instance of the SIRegistryHandler class whose responsibility is to obtain the responses from CSM, parse the response, strip off the headers and build objects from the response data, by interacting with the Translator classes 2380. Particularly, it uses the SvcInqRemark, the SvcInqActivity, the SvcInqTroubleTicket or the SvcInqRegistryEntry class in the Translator to build the remark, activity, detail or list of Ticket object from the response string that is received from CSM. The built object is then sent back to the Transaction Manager 2380 who passes it back to the Front-End/Client.

The mainframe legacy backend 40 (a) "Registry" is the cross-platform communication mechanism that is used by Trouble Ticketing to send messages to and receive messages from the CSM host. It shields applications from network protocols. CSM is provided with a mainframe database (not shown) that provides a set of Transactions to request CSM information through its Standard Interface (SI) which uses Registry as the messaging system. The Trouble Ticketing Application Server 2300 is configured to communicate asynchronously with CSM using Registry's RQS as the Inter-Process Communication (IPC) mechanism. Since CSM supports only one-way messaging, the communication between Trouble Ticketing and CSM is asynchronous. When CSM 40(*a*) receives a request from the Requester, it does not send any acknowledgment back to the requester. The requester only receives a confirmation from Registry that the request was successfully sent. When CSM finishes processing the request, it sends the response to the Receiver.

Registry configuration consists of configuring the Registry client which sends request messages to CSM from the Trouble Ticketing Requester and Registry server that receives responses from CSM and passes it to the Trouble Ticketing Receiver. As shown in FIG. 16(*b*) the Registry Queuing system, RQS is an asynchronous mode of inter process communication where there is one queue on the client and one on the server and there is only one TCP/IP connection always open between the client and the server. The client puts its requests on its own local queue 2322 and it is then forwarded to the queue on the server. The server takes the request off the queue, processes the request and the response messages are put in the client's queue 2325. Since there is only one TCP/IP connection at any given time between the client and the server this mode is very efficient in terms of both network and system resources.

As in the other application of the data management suite, the Trouble Ticketing client application is written as a Java application to be executed at the client Web browser running, for example, Microsoft Internet Explorer 4.01. The Trouble Ticketing client may be started from the home page upon selection of the Trouble Ticketing icon 95*c* shown in the home page 79 of FIG. 5.

FIG. 16(*c*) illustrates an example Trouble Ticketing main screen 2400 presented upon entry into the Trouble Ticketing system selection. As shown in FIG. 16(*c*), the Trouble Ticketing display 2400 presents a title bar, menu bar, tool bar, work area, and message window to provide the user alternative ways to manage different components of Trouble Ticketing product. It should be understood that any action available from the tool bar will also be available within the menu bar. Preferably, there are two permission levels that a user can have: 1) a View permission allowing a user to view the Trouble Ticketing application desktop (Default Query), define Trouble Ticketingt queries, view the details, remarks and activities, print, and report; and, 2) an edit permission allowing a user to create trouble tickets, refer out trouble tickets, close trouble tickets, add remarks to trouble tickets, and, update trouble tickets.

With more particularity, the menu bar 2410 includes the following items that correspond to the associated functionality: a File option 2410*a* including selections for creating a new ticket or new query, opening an existing query, saving a query being edited; printing and exiting the Trouble Ticketing service; an Edit option 2410*b* including selections for querying on a specific ticket number, closing a currently selected ticket, or referring back to a currently selected ticket; a View option 2410*c* including selections for showing details of a currently selected ticket, and refreshing current query results; a Tools option 2410*d* including selections for sorting tickets in the active window; and, a Help option. The tool bar 2450 provides a Create button 2451 for creating a new ticket, a Query button 2452 for generating a new query, and, a find button 2453 enabling queries on a specific ticket number.

The Query component of the Trouble Ticketing application enables Trouble Ticketing users to query trouble ticket information within the system, i.e., the listing or viewing of tickets based on, e.g., different selection criteria. This component also allows provides users with the ability to add remarks to tickets. A Default Query functionality is provided that allows users to keep a dedicated query available at all times. This query enables users to monitor the subset of tickets that are of most interest to them. A refresh mechanism is additionally provided so that the user may keep up with as current a status of these tickets as needed. The Default Query may be executed and displayed immediately on startup of the Trouble Ticketing application and is available throughout the Trouble Ticketing session. Preferably, the Trouble Ticketing application includes a set of predefined queries, one of which is preset as the Default Query and which may be redefined at any time. The user may set their Default Query from a saved query.

To create a new query, e.g., upon selection of the "Query" button 2452 from the tool bar 2450, a "Criteria" window is displayed such as the example window display 2460 shown in FIG. 16(*d*) which enables the customer to select from among the following criteria to be used in the query: priority, status, identifier, open date, and ticket number. As criteria are selected from the "CRITERIA" tab 2462, new tabs (not shown) appear that are associated with the selected criteria. It is from these tabs that the actual parameters are specified for which the query is executed against. As the query is built, the parameters that are selected will populate themselves in the table 2464 to the right of the tabbed panel. At any point in this selection process, the user may perform the following: move back and forth to any criteria tab by selecting the "Back" and "Next" buttons 2461*a*, 2461*b* respectively, or selecting the desired tab directly; add or remove criteria tabs by selecting or deselecting the associated checkbox from the "CRITERIA" tab 2462; execute the query by selecting the "Execute" button 2461*c*; save the query by selecting the "Save As" button 2461*d*; remove highlighted parametersx in the table by selecting the "Remove" button 2461*e*; or, remove all parameters in the table by selecting the "Remove All" button 2461*f*.

As an example, a "List Tickets by Status Request" transaction will provide all the tickets for a given organization (ORG) code with the requested status and created after a specified date. The ORG code to be passed in this transaction is one of the selection criteria representing the originating organization or the organization where the ticket was created. The customer may choose from a list of ORGs that the customer has authority over and a primary ORG is obtained from every customer and is stored locally in the user profile. The resulting information from all of the tickets will be cached for future processing. Generally, only one type of status may be specified in a single request: Open, Closed, Referred or Canceled status. If a customer has authority over more than one organization that customer is able to view tickets for any organization he/she has authority over. If a customer has access to a primary organization, then he/she has implied access to all the subordinate organizations meaning that the request will apply to the subordinate organizations as well. Furthermore, this transaction may only display some of the details/fields of the tickets which means that the data cached from this request may only be used to process the Queries on tickets. It cannot be used to view all the details of the tickets for which further CSM transactions will have to be made as will be herein described.

Once the query is specified and executed, the "Query Results" window such as provided in the example window 2470 of FIG. 16(*e*) is displayed to present the results of the query in a table 2472. Preferably, these results may be sorted by column by either clicking on the column in the table to sort by or by selecting "Tools/Sort" from the menu bar 2410. Selecting "Tools/Sort" from the menu bar will initiate display of a "Sort" window such as the example display 2475 shown in FIG. 16(*f*) which is capable of a three level sort by column in the table. The table columns can also be reordered by dragging and dropping them to their desired locations. Details of a particular ticket may also be viewed.

The ability to save and retrieve queries allows a user to persist queries not only for the current session but for future sessions as well. This gives the user the ability to define a query once, then save it such that there will be no need to define it again, i.e., all the user needs do is retrieve and execute it. To save a query, the user must first create the query and then select the "Save As" button which enables display of the "Save As" window such as the example window 2480 shown in FIG. 16(*g*). This window enables a user to select from the list of existing saved queries or type a new name in entry field 2481. If an existing saved query is selected its query will be copied over and its name will refer to this new query. A check box 2482 is available to designate this new query as the Default Query. To retrieve a saved query, e.g., upon selection of the "File/Open/Query" from the menu bar 2410, an "Open Query" window such as the example window 2485 shown in FIG. 16(*h*) is displayed which provides a list of all saved queries. Once the desired query is selected the user may perform the following: execute the query, i.e., run the query and display the results in the "Query Results" window or the "Default Query" window if the user selects it as their default query; or, edit the query by bringing up the "Criteria" window 2460 (FIG. 16(*d*)) with the appropriate parameters already in the table.

The customer may then view the results of a query, i.e., the details, remarks or activities of a Ticket chosen from a list of Tickets. To view the details of a ticket, the user may either select it from the query results and select "View/Details" from the menu bar or double click the ticket in the query results. Particularly, a "Display Ticket Request Transaction" (CSM transaction) may be used to obtain the details, activities and remarks of a ticket. This transaction allows several display requests to be made, e.g., by setting corresponding flags to 'Y'. Whenever the customer wishes to view details, remarks or activities of a particular ticket, this request will be made with all the three flags set and the ticket number stuck into the Trouble Ticketing header which will generate three or more responses. The "Display Detail Response Transaction" is a response that returns all the data elements corresponding to a given ticket in a "Details" window such as the example window 2490 shown in the FIG. 16(*i*). This window 2490 provides information about the selected ticket including: ticket number, ticket priority, ticket status, ticket identifier, ticket product, ticket service, date occurred, trouble description, and organization (ORG). It should be understood that the number of data elements may be different for different types of tickets.

Alternately, to find a ticket, e.g., upon selection of the "Find" button 2453 from the tool bar 2450, the CSM Transaction, "Display Ticket Request Transaction" is invoked, where the ticket number is passed on the request for handling as described above. It should be understood that, in the preferred embodiment, a "Change Ticket Request Transaction" may be implemented allowing the customer to change some of the fields of a ticket that is already created. This restriction is enforced by the GUI as this CSM transaction does not impose any such conditions on the field being modified.

Remarks are comments added to a ticket for historical purposes and may aid in the resolution of the problem. A customer views the particular ticket's details that include the remarks desired. The "Display Remarks Response Transaction" is a response that shows all the comments added on the ticket either by the customer or by the enterprise. The CSM legacy system supports "public" and "private" remark types. Thus, from the "Details" window 2490 shown in FIG. 16(*i*), the user may click on the "Remarks" button 2491 which will bring up the "Remarks" window such as the example window 2495 shown in FIG. 16(*j*). From the remarks window, the remarks for that ticket are displayed. It should be understood that remarks may be added to a ticket for historical purposes, e.g., to aid in the resolution of the problem. From the "Remarks" window the customer may click on the "Add Remarks" button 2496 which enables display of the "Add Remarks" window (not shown) which allows the customer to add remarks to that Ticket. Thus, by implementing an "Add Remarks Request Transaction," the customer may add remarks on a ticket that is in an open status at any time. This may be used as a final step, just after creating a ticket, for example, to enable the customer to describe the trouble in his/her own words or add any comments. This transaction returns a success or failure response.

Activities are events that occur to a ticket throughout its life cycle. These events include changing status, changing priority, and reassignment of the person working the ticket. The customer must be viewing the particular ticket's details that contain the activities desired. The "Display Activity Response Transaction" is a response that provides all the activities, i.e., actions that have been taken on the ticket. Specifically, from the "Details" window 2490 (FIG. 16(*i*)), the customer may click on the "Activities" button 2492 which brings up the "Activities" window 2498 such as shown in the example screen display of FIG. 16(*k*). From the activities window, the activities for that ticket are displayed. This is a useful transaction in checking the status of a ticket and, it aids in tracking a ticket as it shows which organization the ticket is currently in.

The create component of Trouble Ticketing application provides Trouble Ticketing customers with the ability to create a ticket within the system. The first step in the creation of a trouble ticket is to identify the Type of the problem which is basically the way CSM handles different problem types and is required for most CSM transactions. To do that the client front end asks the customer the problem/identifier type and then narrow down the problem by having the customer choose from a list of Product types, Service types and Trouble Descriptions as described herein with respect to FIG. 16(*l*). Based on these choices the system maps it to the correct Type which mapping is done using database tables stored locally on the client. Once the Type is determined, the data fields that correspond to that Type is obtained from the database tables. The information required for all these fields is then gathered from the customer by presenting appropriate questions. Once all the required information is available, the system performs an "Open Ticket Request Transaction" and passes all of the data fields. The CSM legacy system then attempts to open a Trouble Ticket based on the data passed, and performs an "Open Ticket Response Transaction" to indicate if the ticket was created successfully along with the ticket number. Based on this response a confirmation message along with the ticket number is displayed to the customer.

As an example, to create a service request from scratch, the customer may select, for example, the "Create" button 2451 from the tool bar 2450 of FIG. 16(*c*). This will initiate display of a "Create" window such as the example window 2500 shown in FIG. 16(*l*). From this window, the customer provides answers to the questions for each tab 2510 shown as questions 2512, and clicks the "Next" button 2514 when ready to go to the next set of questions. As the next tab appears, the answers from the previ6us tab populate the table 2515. The user may navigate via the "Back" and "Next" buttons or by using the tabs. In the preferred embodiment, the questions are dynamic depending on previous answers. Thus, if the user goes back and changes the answer to a question that later questions depend on, then those questions will be overwritten by the new set of questions. The user is warned if this is the case.

Once the ticket is opened, it has to be referred out to a "Customer Facing Organization" to initiate the problem resolution process. To do this, the CSM system refers the ticket out to an organization obtained from the user up front and stored in the User Profile. This is done using an "Enter Activity Request Transaction" which allows the customer to enter different activities like 'Refer Out', 'Close', 'Refer Back' and 'Open' on a ticket by passing the appropriate activity code.

Finally, the Trouble Ticketing application allows the customer to close the ticket by using an "Enter Activity Request Transaction" described with respect to ticket creation. When a customer wishes to close a ticket, the system will make this transaction on behalf of the customer by passing the activity code for 'Close'. A customer is allowed to close a ticket only if it were created by that organization and if the ticket is currently in that organization, i.e., it has been referred out to that organization. Since only the organization that opened the ticket has authority to close it, once a ticket has been resolved the ticket is referred out to the customer's organization. If the customer is not satisfied with the problem resolution, that customer may refer the ticket back to the enterprise (MCI). This is also accomplished using the Enter Activity Request Transaction. Again, the system will make this transaction and pass the activity code for 'Refer Back'.

The creation of trouble tickets through Trouble Ticketing will now be described in greater detail in view of FIG. 16(m). In the preferred embodiment, the Trouble Ticketing application implements a domain object model (DOM) 2600 that allows the collection of information regarding a problem with a product offered by an enterprise. The questions that need to be asked to open a ticket vary by product and problem type. In addition to specifying a problem with a particular product, Trouble Ticketing provides the user with the functionality to perform queries for Trouble Tickets and to view the details of Trouble Tickets. The DOM's responsibility is the creation and query of Trouble tickets and it accomplishes its tasks via interaction with the client presentation layer and interaction with the back-end systems. Information that is gathered via the presentation layer is used to construct backend transactions. The information returned from these backend transactions is formatted to DOM classes, which are forwarded to the presentation layer.

Figure 16M:
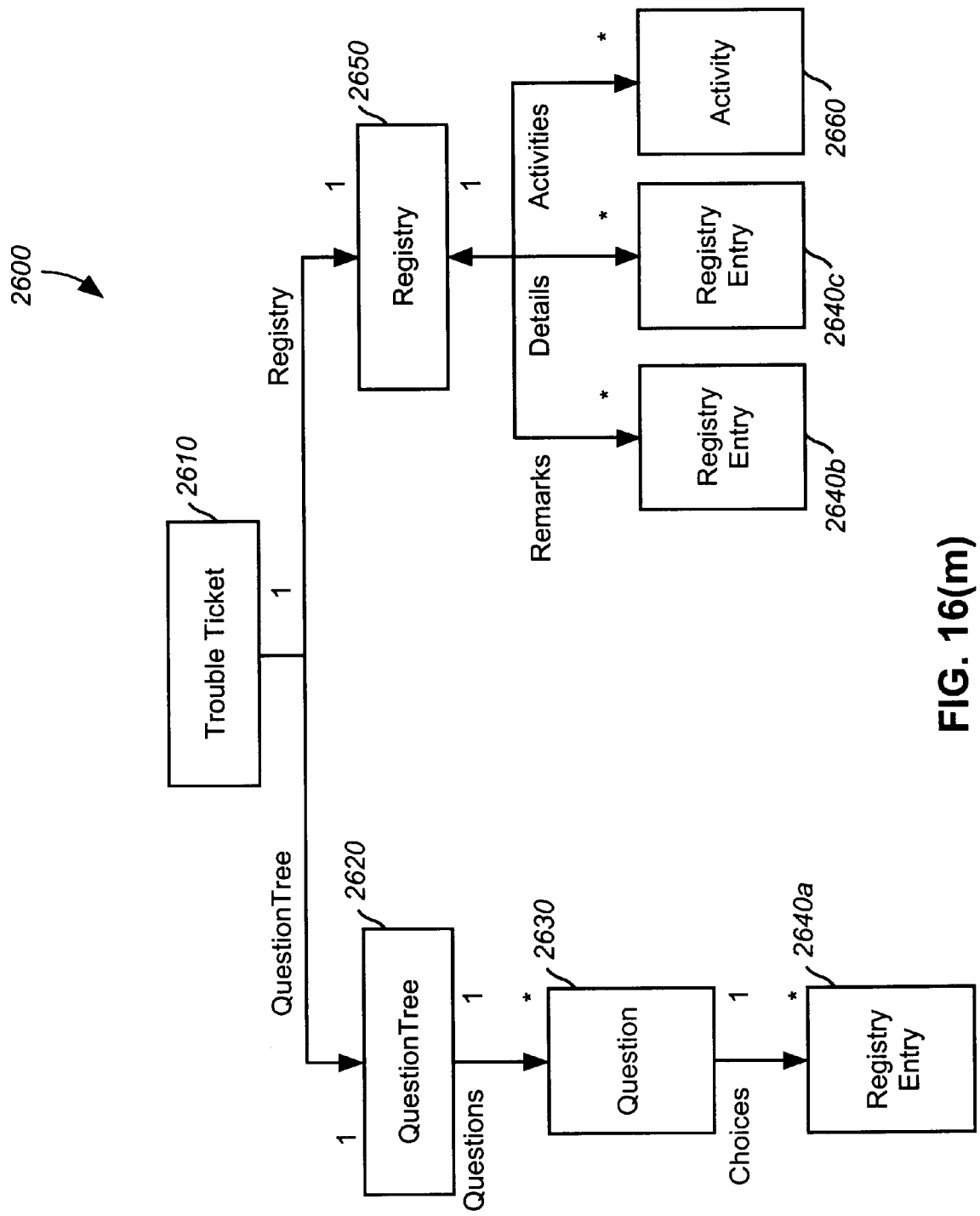
FIG. 16(m) illustrates domain object model (DOM) 2600 implemented in Trouble Ticketing.

As shown in FIG. 16(m), the TroubleTicket 2610 is the root of the Trouble Ticketing DOM. TroubleTicket instances contain identifying information that is used by the presentation layer to sort and filter a collection of TroubleTickets. The TroubleTicket class is responsible for accepting requests from the presentation layer, forwarding the requests to the backend and returning results to the presentation layer. In addition to maintaining identifying information, a Trouble Ticket also contains references to a QuestionTree 2620 and a Registry 2650.

Specifically, a Question Tree 2600 is comprised of three Domain Classes: QuestionTree 2620, Question 2630 and RegistryEntry 2640. QuestionTrees 2620 are essentially a set of questions for a particular product and problem type. The QuestionTree is responsible for the grouping of questions and the navigation between the groups. In addition, a QuestionTree knows if it has been completely specified, i.e., all of its required Questions have been answered. Within a QuestionTree, the group or category is designated by a unique name String). Preferably, questions are stored in a hashtable (not shown). A group name is the key and a vector of Questions is the value for each entry in the hashtable. The order of the groups is significant and since hashtables do not maintain order, a vector of Group names is required. This Vector of names is used for some of the navigational behaviors of a QuestionTree.

The Registry 2650 is responsible for maintaining collections of objects that represent information retrieved from CSM via the client interface. The collections of objects represent Remarks, Details and Activities in CSM. Remarks and Details are also represented by vectors of instances of a "RegistryEntry" class. Activities are represented by a vector of instances of the Activity class 2660 which is an information holder having instance variables containing information that corresponds to fields in the CSM Activity Record.

The RegistryEntry class is a class in the ServiceInquiry DOM comprising instances 2640a that are used by Question instances 2630 and instances 2640b,c used by Registry instances 2650. When used by a Question, RegistryEntry instances 2640 represent the possible choices for answers to the Question. Once the user selects a RegistryEntry "choice", this RegistryEntry instance becomes the answer to the question. When used by a Registry, the RegistryEntry instances 2640b,c represent remark or detail information respectively, that is retrieved from CSM. Specifically, RegistryEntry 2640a,b,c comprise the following instance variables: 1) a Text instance variable which is an optional variable used to specify text that will be presented to the user as a choice for an answer to a Question if the value is different than that specified by the registryvalue; 2) registryKey instance variable which maps to a key in CSM; 3) a registryvalue instance variable which maps to the value in CSM specified by the key in registryKey; .4) a nextGroupID instance variable which is an optional field used by the Question to assist the QuestionTree in some navigational tasks; and 5) a question instance variable which is a reference to the Question instance to which this RegistryEntry belongs. A RegistryEntry is included by its Question; this instance variable is a back-pointer.

The Registry Classes, i.e., classes that represent CSM Registry records, have two additional responsibilities that are variations of a single behavior. The Registry Classes (RegistryEntry and Activity) are used for communication between Trouble Ticketing and CSM. CSM requires Remark, Detail and Activity information in fixed-length field record format; Trouble Ticketing requires Remark, Detail and Activity information in Java object format (instances of RegistryEntry or Activity). To provide these two formats, the Registry Classes include behavior to convert instances to fixed-length field record format and to instantiate themselves from fixed-length field record format.

Questions are the main component in a QuestionTree. A Question has a vector of group identifiers that indicate the groups to which it belongs. A Question has a vector of RegistryEntry instances 2640a called choices. When the user "answers" the Question, the answer is set to the selected choice; i.e., the selected RegistryEntry. Short answer or text answer questions are a specialization of this behavior. Within each group of Questions, there is one question that is designated as the decision point which is used to determine the next group of Questions that need to be presented to the user. As a Registry Entry may contain a nextGroupID, the nextGroupID of the RegistryEntry instance selected as an answer to a decision point Question is used to derive the next group of Questions. Occasionally, the only difference between two groups of Questions is the inclusion or exclusion of a particular Question. One solution is to create two identical groups, one with the optional question and one without and rely on the decision point mechanism. In the preferred embodiment, an optional parent-child relationship between Questions is created. The inclusion/exclusion of a Question (child) in a group is based on the answer to a previous Question (parent). A child Question maintains a reference to one of the possible choices (RegistryEntry) of the parent Question. If the parent Question's answer is the same as the child Question's parentAnswer, the child Question is included in the group; otherwise, it is excluded from the group.

Online Invoicing

Figure 17:
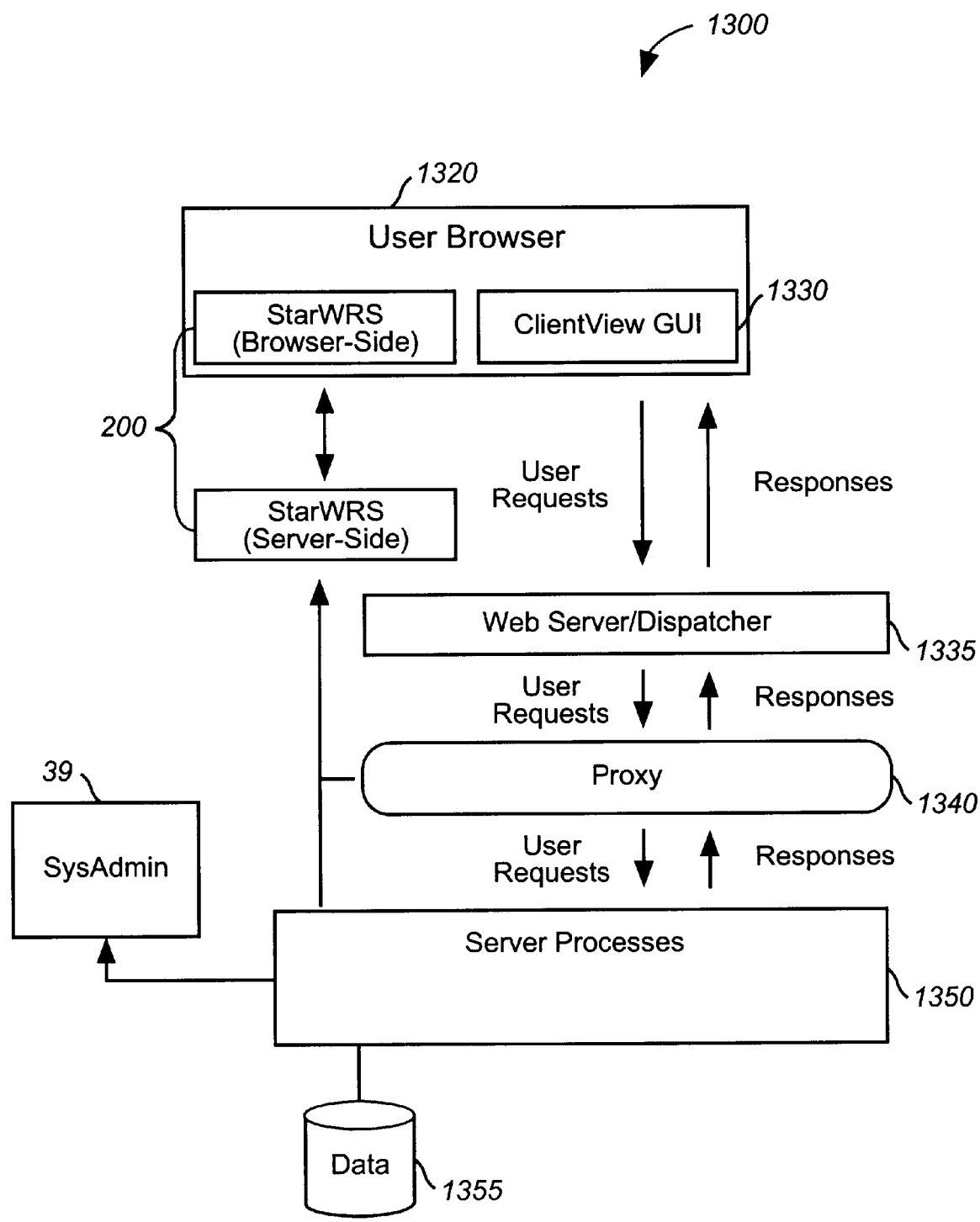
FIG. 17 illustrates an architectural schematic of the online invoicing system 1300 component of system of the present invention.

Another application of the suite of data management applications is an online invoicing system, herein referred to as "ClientView," which provides customers with the ability to view invoices and reports online, and offers a facility for printing and faxing documents. The online invoicing system takes information available from different billing systems and incorporates that information into its database for subsequent retrieval and presentation to a user according to user-specified requests. A general block diagram illustrating the online invoicing system architecture 1300, integrated with the system of the present invention, is shown in FIG. 17. Generally, as shown in FIG. 17, the ClientView system 1300 is integrated within the system comprising: the user Web browser which employs a ClientView GUI 1130 for providing an interface to which a customer may request and view various billing invoices associated with the application services subscribed by the customer and provided by the system of the present invention via a secure socket connection for presentation of invoice reports. For example, using the GUI client application 20, customers may drill down on their applicable invoices, typically accessing them via the given customer identifiers such as the corp id, bill payer, or mega account numbers. The invoice reports may also be available for various application services. WRS client-side report viewer and requestor processes 200 which provide the support for generating and presenting reports relating to the products offered to the customers; a corresponding server side reporting component having the above described inbox, report scheduler and report manager components, in addition to alarm and report viewer and requestor components implementing Java applets having viewer classes that enable the downloading and display of reports generated from ClientView server processes 1350.

Also shown as part of the online invoicing invoice viewing system architecture 1300 of FIG. 17 is the Web server/dispatcher component 1335 which provides for the transport between the Web browser and an online invoicing proxy interface 1140 including all secure communications and encryption. Thus, customer requests and server responses may be communicated from the user browser 1120 to the online invoicing server 1150 in a secure manner. Specifically, the dispatcher 1335 forwards user requests, such as "get index" message for retrieving a list of documents available for viewing by a customer, to the online invoicing server 1150 process that employs an integrated proxy application 1140 for receiving and interpreting the user messages and performing the online invoicing functionality. This proxy capability includes a multithreaded engine enabling multiple, simultaneously executing sessions supporting anticipated user load. The interface between the dispatch server 1335 and the online invoicing server 1150 is also message-based, employing, e.g., TCP/IP socket transport, and, as will be described, a messaging protocol that is defined and which includes a generic message header followed by proxy-specific data. The same process of messaging scheme is employed in the other direction. That is, the online invoicing proxy 1140 sends the generic header, followed by the proxy-specific response back to the dispatch server 1335 for communications over the firewall and back to the user browser 20.

The online invoicing proxy 1340 uses a "template proxy" as an implementation of the listener/slave portion of the proxy. The proxy 1340 passively listens on a previously defined port number and forks a process on an interrupt basis, after which the parent proxy continues to listen for other request. The forked process is generally dedicated to handling the detected requests. The forked process detects a transaction type from the proxy protocol header. The transaction types generally include synchronous, asynchronous, and bulk transfer, as described above. The proxy 1340 then calls a "back-end" function whose function is dependent on the transaction type detected. The back-end functions typically provide individual services for which the application is responsible.

For example, if the transaction type for a detected request is of "synch" type, the forked process executes the synch back-end function and passes the request as an argument. The synch back-end function generally passes the request to a CICS task on the online invoicing server and waits for a response. More specifically, the synch function first establishes a CICS task via a direct TCP/IP socket connection to the CICS TCP/IP interface service. The synch function then waits for a response indicating whether a connection was successfully established or an error occurred. If an error is occurred, an error response from the CICS task is returned to the synch function, which then terminates appropriately.

If a connection to the CICS task is successfully established, the request is sent to the task and the synch function waits on a response. The response is generally preceded with a preamble block, indicating the status of request and the number of bytes to follow. The preamble block may include an error code, indicating error conditions that may have occurred during the CICS task processing. Certain error indications may prompt the synch function to terminate the CICS task connection, and also to exit the synch function.

If the preamble block indicates that the request was successfully processed, the preamble block is returned, and the byte count specified in the preamble block is piped from the CICS task, to the requesting process, and typically all the way back to the client GUI application. Upon completion of piping the data, the synch function disconnects the CICS task and exits. The forked process which called the synch function also terminates itself by exiting.

In the preferred embodiment, the online invoicing server 1350 stores documents from various billing systems and performs the various database queries and function calls in response to requests received from the customer via the online invoicing proxy 1340. Particularly, the online invoicing server 1350 is responsible for tasks including data collection, calculation, storage, and report generation. A more detailed description of the server 1350 is provided with reference to FIGS. 56 and 57.

During its operation, the online invoicing server 1350 supports communications with the OE server 39 which provides for authentication of users, supplying of entitlement information, and enabling order entry for the various online invoicing invoice viewing services order entry functions including functionality necessary to manage (create, update, delete) online invoicing users, and feed the appropriate order entry information to the online invoicing server 1350 in order to properly associate the appropriate online invoicing functionality and data to the right customer once given admission to the online invoicing invoice viewing service.

As described previously, order entry for the browser and all applications on the system of the present invention may be made through the OE order entry system. The online invoicing application service may be ordered for all business markets customers.

In the preferred embodiment, a messaging interface is utilized between the OE 39 and the online invoicing server 1350 for communications mechanism. The online invoicing server 1350, typically functions as a client and receives authentication information, billing identifiers, and level of service information, which may also be supplied in response to the launch of the online invoicing GUI client application 1330. For example, when online invoicing client application 1330 is launched from the home page (FIG. 5), a customer identifier such as the userid and the applicable corporate account numbers may be retrieved by the order entry system administration server, OE 39, and passed to the online invoicing server. The online invoicing server then makes the necessary association to individual bill payers that the user is authorized to view. The view of invoices may include a particular portion of the invoice as well as the entire invoice.

The online invoicing server 1350 also may interact with the inbox server component of the reporting system, WRS 270, by storing the news information regarding the online invoicing service, in addition to the event notifications, and report data from the application services.

In addition, the invoice files saved on the inbox may be retrieved and viewed using the report requestor 212 and the report viewer 215 components of WRS 200 (FIG. 10) residing in the user browser 20. Via the report requester, the customer may request tailored reports regarding the invoice files and view or print the customized invoice reports displayed by the report viewer as described herein.

Figure 18:
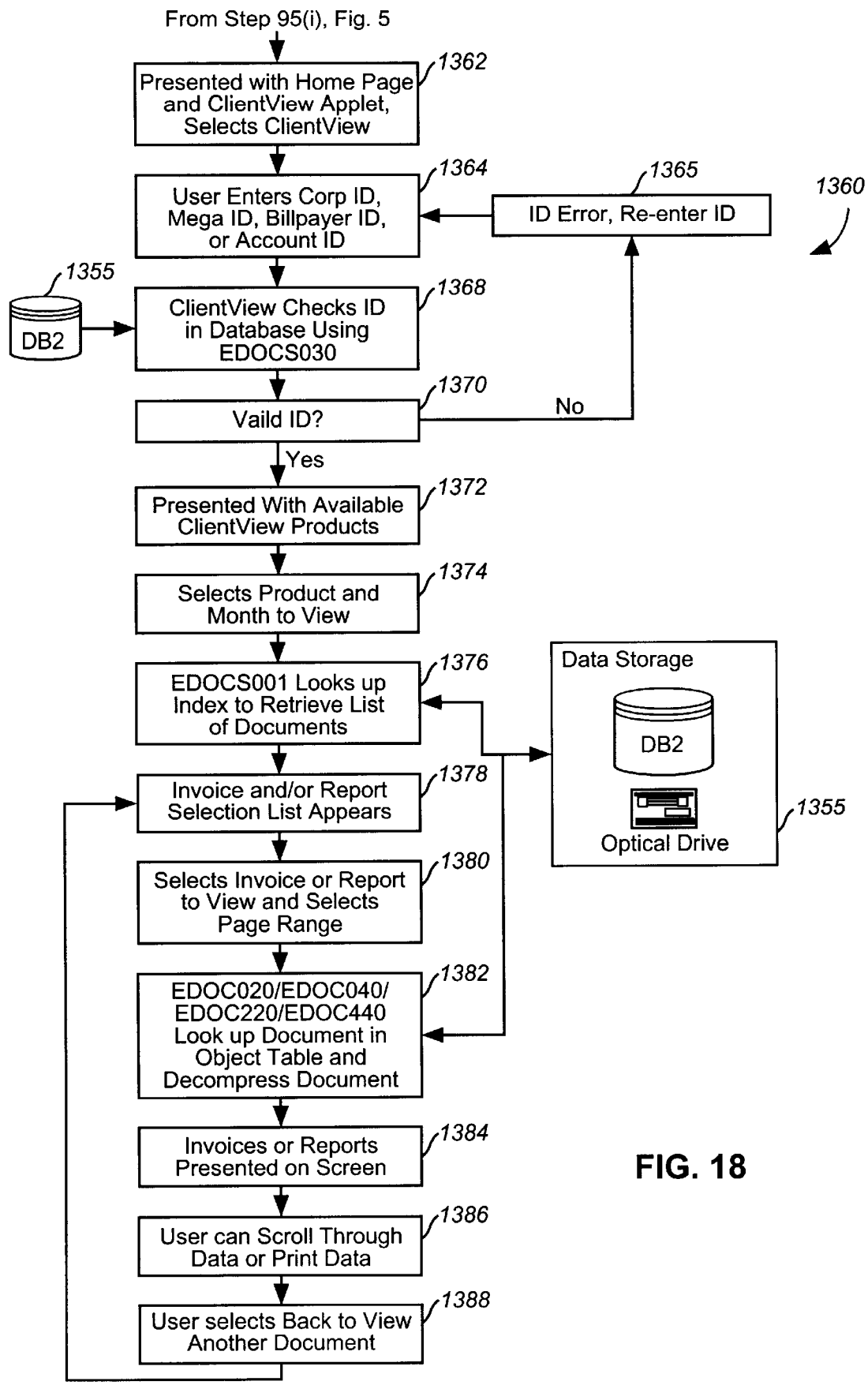
FIG. 18 is a flow diagram illustrating an online invoicing process flow.

An application-level process flow 1360 for the ClientView system is now presented in view of FIG. 18. After successful logon and entitlement determination (by OE server), and upon selection of the online invoice (ClientView) application from the downloaded home page to the user (FIG. 5), a ClientView applet is invoked at step 1362 to display an online invoice screen at the customer workstation. As indicated at step 1364, the user then enters the customer identifiers on the online invoice screen which are then checked against the available list of customer identifiers in the online invoice server's database at step 1368. If the customer identifier does not exist or is not a valid type at step 1370, the user is prompted to re-enter the identifier at step 1365. When the customer identifier is properly validated, the user is presented with the online invoicing products associated with the customer identifier at step 1372. The user then may select products by their date ranges at step 1374 for viewing. At step 1376, a server module then retrieves a list of document based on the selected product and date range from the online invoicing database, and at step 1378, the list is presented to the user, from which the user may select to view a document, at step 1380. Upon the user selection, the server modules retrieve the document from the database at step 1382. At step 1384, the invoice and/or report documents are presented to the user at the user's workstation. At step 1836, the user may scroll through, or print the data presented, or the user may, at step 1388, select to view another document at step 1378.

The information stored in the database 1355 generally originate from different billing systems. When data is available from these billing systems, the online invoicing server typically performs a conversion process and stores the converted data on tape until an audit approval. When the converted data is audited and approved, the data having the invoicing documents are stored to the database 1355. After the data has been stored in the database for a predetermined period, it may be moved from a direct access storage device (DASD) and stored on optical platters. These platters may remain in an optical jukebox for another predetermined period and then migrated to an optical shelf where the data may be available for a certain period.

Having described generally, an overview of the online invoicing application service and its integration with the networkMCI Interact's network and data infrastructure, the specific functionalities of the online invoicing application, namely the online invoicing GUI application on the client platform side and the online invoicing server in the enterprise Intranet, will now be described in detail below.

Online Invoicing GUI Application

Figure 19A:
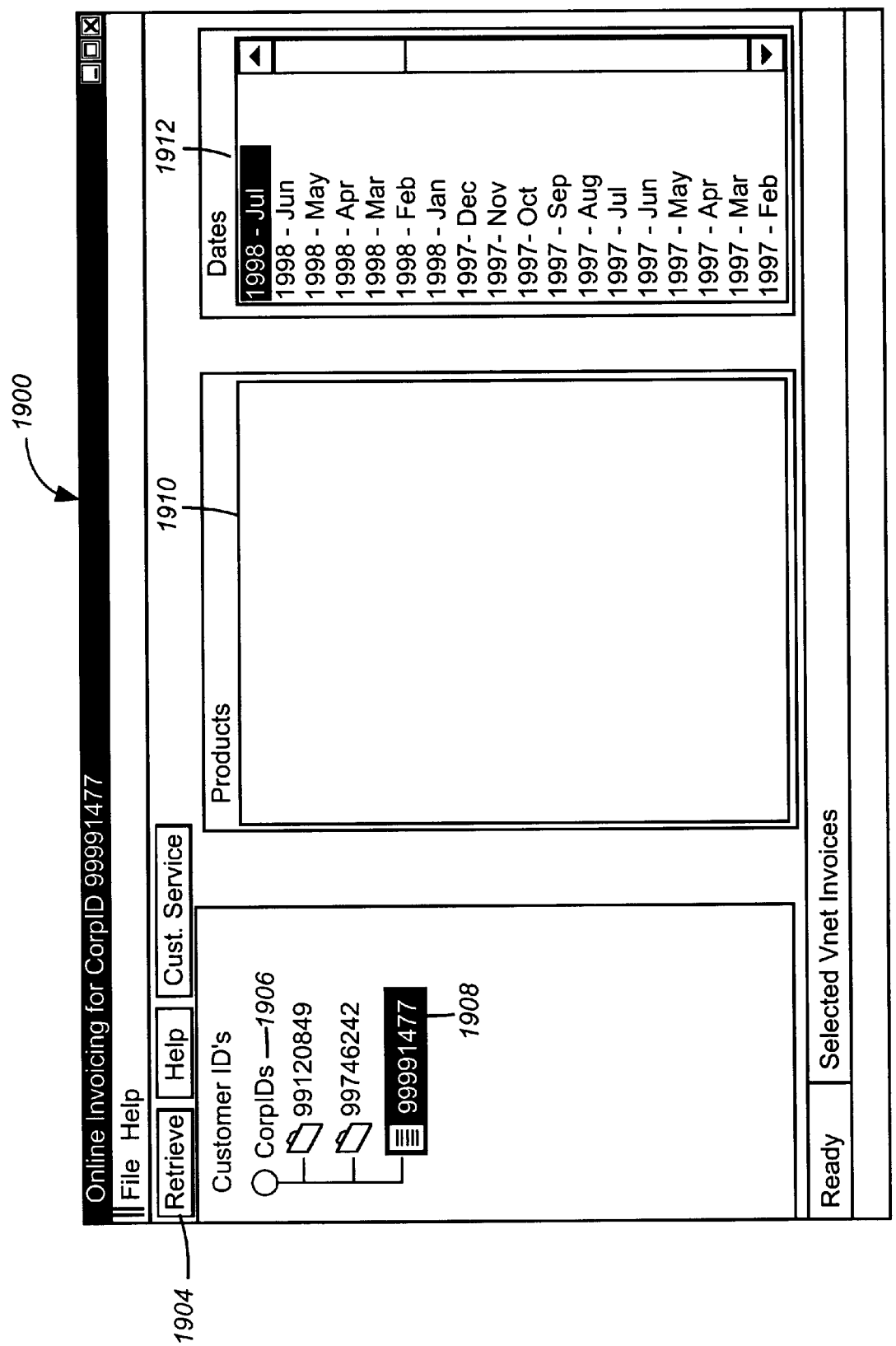
FIG. 19(a) is a sample criteria screen launched from the home page of the system of the present invention.

As in the other data management client applications of the present invention, the online invoicing client application is implemented in Java to ensure platform independence and particularly is developed in accordance with many of the common objects, as described herein, for achieving interoperability with the application backplane. The client component of the online invoicing includes a client interface for the user to select what data to retrieve. The data is then retrieved through various application processing, and a list of invoices and reports are provided for the user to choose from for online viewing. When a customer clicks on the "online invoice" icon 95i on the home page (FIG. 5), after a proper authentication via a logon, the customer is presented with a criteria screen 1900 as shown in FIG. 19(a) from which the customer may specify various types of, and date ranges for, invoices desired. The criteria screen 1900 is divided into a customer identifier section 1183, products section 1193, and dates section 1195. The customer identifier type may include identification by corporate id 1191, account id, bill payer id, etc. Each online invoicing user is given at least one identifier type 1191 and a customer identifier number 1908 associated with the type at the time of order entry via the OE. The OE maintains this customer information and communicates the information to the online invoicing GUI application, when the application is invoked by the backplane applet. Accordingly, at the same time the online invoicing GUI application displays the criteria screen 1900, it also populates the identifier type 1191 and customer identifier 1908 fields automatically as received from the OE user authentication and entitlement system.

The user may then select a desired identifier type from the list of identifier types shown at 1191. The online invoicing GUI application then automatically fills in the customer identifier field 1908 associated with the identifier type selected. In addition, if the customer's last selection was made with a certain type, e.g., corp id, the next time the customer views the criteria screen 1900, the corp id identifier type may be selected automatically. After selecting a desired identifier, the user typically then may execute the search of invoices available for that identifier by clicking on the retrieve button 1904, pressing an enter key, or using a fast key combination such as Alt+S.

The products and dates sections 1910, 1912 are used for displaying the service products for which invoice viewing is available for a given customer identifier type and the date range for the available invoices. When the user executes the search, the products field 1910 is filled in with the date ranges 1912, indicating available invoice reports for various period ranges. For retrieving invoice documents, the user may select ranges of dates including multiple ranges of dates as shown at 1195, and then click on the retrieve button 1904, press enter, use the fast key combination Alt+R, or click on any area within the date range list box 1912.

Figure 19B:
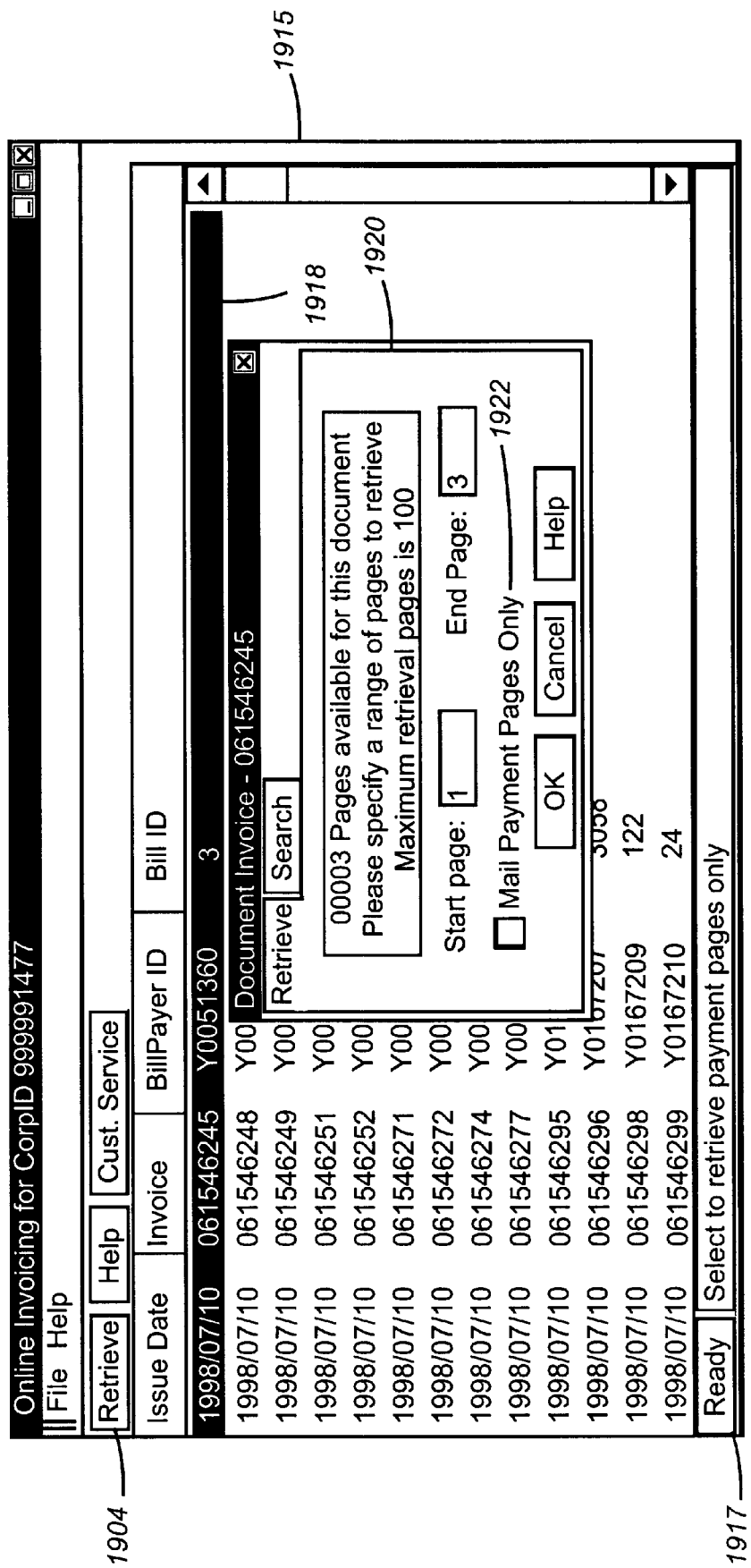
FIG. 19(b) is a sample screen displaying a list of invoice reports.

Upon executing the retrieve user command, the online invoicing GUI application displays the screen 1915 shown at FIG. 19(*b*) listing the report documents. For each document, date, invoice number, bill payer id, and number of pages are displayed as shown in screen display 1915. The status bar 1917 at the bottom of the screen may display a number of indices (document lists) loaded. The number of indices which may be loaded at one time may be configurable by a customer via the online invoicing GUI application. An invoice report listed then may be selected and retrieved by clicking on the retrieve button 1904, pressing an enter key or double clicking on a highlighted item 1918, or using a fast key combination such as alt+R. When a selection is entered, a page range selection box 1920 appears. The selection box 1920 allows customers to enter in the desired page range for viewing. The mail/payment option 1922 for retrieving only the remittance pages without having to retrieve additional invoice pages, is available from this screen.

FIG. 20 illustrates a sample invoice document 1925 retrieved when an invoice item is selected from a screen 1915 shown at FIG. 19(*b*). Using the menu bar 1927 or a tool bar 1928, a customer may access the following functions: open a saved document; save the current document; print the current document; fax the current document; Batch Print a document; Search the document for word(s); display the first downloaded page; display the previous page; display the next page; display the last downloaded page; Go to a specified page; increase the font size of the displayed document; reset the font of the displayed document to the default; decrease the font size of the displayed document; and, return to the screen that invoked the document.

With more particularity, the batch print option may allow customers to send a batch print job to be performed at the enterprise Intranet to the customers, e.g., via Federal Express, at a location specified by the customer. An example batch print data entry screen can be found in commonly owned, co-pending U.S. patent application Ser. No. 09/159, 405 entitled WEB BASED INTEGRATED CUSTOMER INTERFACE FOR INVOICE REPORTING, the contents and disclosure of which are incorporated by reference as if fully set forth herein.

Another feature provided by the ClientView system 1300 includes an accumulator function which allows customers to add up numerical figures, such as minutes and charges, by highlighting the numbers directly on the screen. Details regarding the accumulator function can be found in above-referenced, co-pending U.S. patent application Ser. No. 09/159,405.

The above-mentioned fax current document option offered by the online invoicing application includes an ability to fax to the customer, at a customer specified location, a current page, specified range of pages, or the entire document by making an appropriate selection in a fax dialog bon such as described in above-referenced, co-pending U.S. patent application Ser. No. 09/159,405.

Online Invoicing Server

As described above, the online invoicing provides on-line visibility to various documents. In presenting various documents online to a customer, the GUI client application communicates to a online invoicing server via the proxy for retrieving up-to-date information which the server maintains. These documents are indexed and stored in the online invoicing's database 1355 (FIG. 17). The online invoicing server includes several processes for performing the indexing and storing of the documents.

Figure 21:
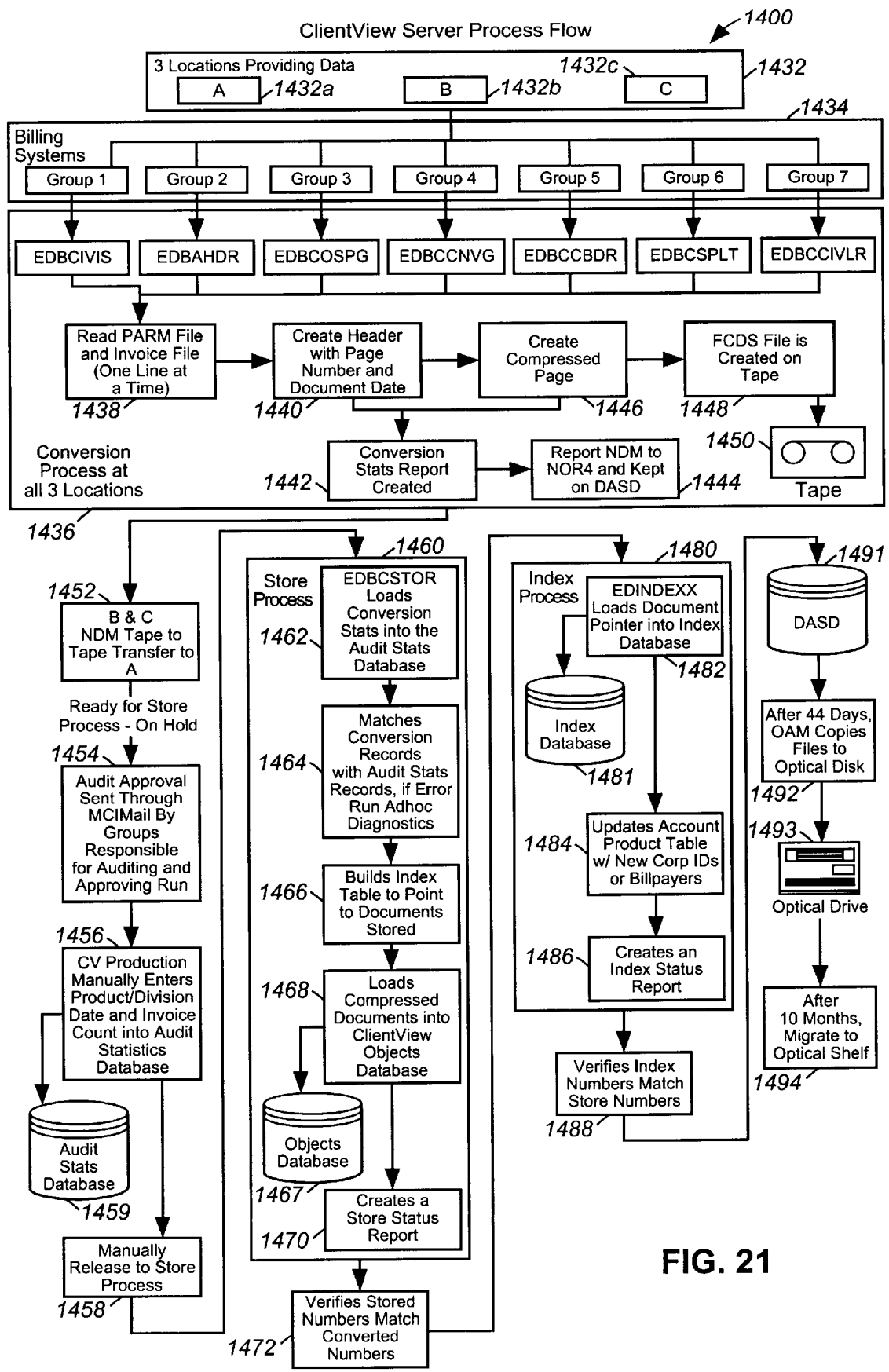
FIG. 21 is a flow diagram illustrating an online invoicing back-end server process flow 1400 during document indexing and storing.

FIG. 21 illustrates a process flow 1400 of the online invoicing server 1350. The server may receive data from a number of data centers 1432. FIG. 21 shows three data center locations: location "A" 1432*a*, location "B" 1432*b*, and location "C" 1432*c*, as illustrative examples. At each site, invoice data associated with various products is available from various billings systems associated with the products, as shown at 1434.

In a preferred embodiment, an online invoicing's conversion process 1436 is used to convert documents at each of the data centers. The conversion process generally defines the key information necessary to retrieve the document and compresses the document for storing. Each conversion process 1436 generally performs the same tasks. More specifically, these tasks include creating a formatted compressed data set (FCDS) file and a conversion stats report for each conversion run. The FCDS file is the document which may eventually be incorporated into the online invoicing database. At step 1438, the online invoicing conversion process reads in a PARM file and an invoice file. The PARM file includes document information such as the logical record length. The invoice file is read one line at a time and at step 1440, key information including page numbers and document dates is placed in a header record which is kept in memory until the FCDS file is created. At step 1446, the conversion process creates compressed pages of the document. The compressed pages follow the header record in the FCDS file. Once the FCDS file is created at step 1448, the file is stored on tape at step 1450, and the B and C locations NDM the tape to A at step 1452. At step 1452, the conversion stats report is also created which includes page information and conversion information associated with each conversion run. The last line of the report has the conversion stats record, which includes the number of pages converted and the number of headers created. This report is then NDM'd to A by B 1432*b* and C 1432*c* and kept on DASD for future reviews and audit verification.

The FCDS file is generally placed on hold, as indicated at step 1454, until audit approval is received typically via the e-mail, which is sent by various groups responsible for auditing and approving the document files sent to the online invoicing. Once the audit approval e-mail is received, an online invoicing production manually enters the product/ division date and the invoice count into the audit statistics database 1459, at step 1456. The store job is manually released at step 1458 by the online invoicing production control after audit approval is received.

The online invoicing includes a DB2 database subsystem residing in a NOR4 mainframe. The subsystem further includes an object database and an index database. An online invoicing store process 1460 loads the compressed document to an online invoicing object database and an online invoicing index load process 1480 stores index pointers to each document in the index database. An audit check is executed to ensure that the correct number of documents are added to the online invoicing databases during the object load and index load processes.

More particularly, the store process loads the conversion stats record into the audit stats database at step 1462. At step 1464, the conversion records are then matched against the manually entered audit stats records. The store process 1460 also includes loading of the FCDS file from which is builds an index for each object and an index file, which includes the pointers to the document, as shown at step 1466. The store process 1460, the loads the compressed documents into the online invoicing object database 1467, as indicated at step 1468. At step 1470, the store process 1460 then creates a store status report and loads the report into the audit stats database 1459. At step 1472, an audit checkpoint verifies that the stored numbers match the converted numbers. If there are nay errors with the numbers in the audit stats database at any point in this process, the job may automatically stop the store process 1460 until the feed/problem is corrected. Once these numbers are verified, the index process 1480 may begin.

The index process 1480 at step 1482, i.e., EDINDEXX as shown in FIG. 21 as an example, generally loads the index pointer for each document, which are typically created by the store process 1460. At step 1484, the process 1480 also updates the account product table with new customer identifiers such as the corp ids or bill payers. At step 1486, the index process 1480 creates an index status report. At step 1488, another audit checkpoint verifies that the index numbers match the stored numbers. The stored and indexed data are kept on DASD 1491 for a predetermined number of days, e.g., 45 days as shown at step 1492. After the predetermined number of days, the object access method (OAM) copies the files from DASD 1491 to an optical disk via the optical drive 1493. After another predetermined period, OAM migrates the objects from the optical disk to the optical shelf as shown at step 1494, where they remain available for another predetermined period of time. Once the indexes are loaded into the database, the documents are available for viewing.

The following database tables are included in the online invoicing database: a product cross reference table which assigns the online invoicing product code to the product name; a CDSPARM table which keeps the store precess run statistics to allow for a restart when necessary and which includes an entry for each product code and runstream; an EDBAAPPL table which assigns a product code to a store group; a statistics audit table which keeps audit statistics for each product/runstream logged by the store process; and a conversion program parameter file which defines where the conversion may find the documents key information.

The information on documents for imaging and storing are typically received from the various networkMCI Interact's application servers. A list of the various billing systems providing product feeds to online invoicing for document imaging is provided in above-referenced, co-pending U.S. patent application Ser. No. 09/159,405.

The online invoicing server application is typically written in COBOL II using CICS/DB2 and OAM. The persons skilled in the art would appreciate that the server application may also be implemented with any other compiler languages or software tools. The server application includes a startup transaction (EDUP), and a multipurpose transaction, EDS2. The EDUP transaction passes several DB2 tables such as a function table, a version control table, and the batch print request table. The EDUP transaction also calls OAM to verify OAM is active and to get the token for future calls to OAM. An in-core table is built for system information and temp storage records are built for version control and batch print pricing. The EDUP is generally executed at CICS startup time.

EDS2 is a multi-purpose transaction which is started when a request is received from a client GUI application. Its functions may include product and date listing, index retrieval such as shown at 1915 FIG. 19(*b*), and batch print request storing. The transaction uses the common top-level function (EDOCS000) and links to a lower level function designed to perform a specific task, based on a specific function. The lower level function results are passed back to the top-level function which checks return codes for possible error. The data result is then passed to the client GUI application via the proxy and the Web/dispatcher 1335 (FIG. 17), and statistics are written to a VSAM file. EDS2 is also executed for document retrieval for retrieving invoice documents shown at 1925 FIG. 20. It uses the common top-level function and links to lower level functions to perform the retrieval processing.

Figure 22:
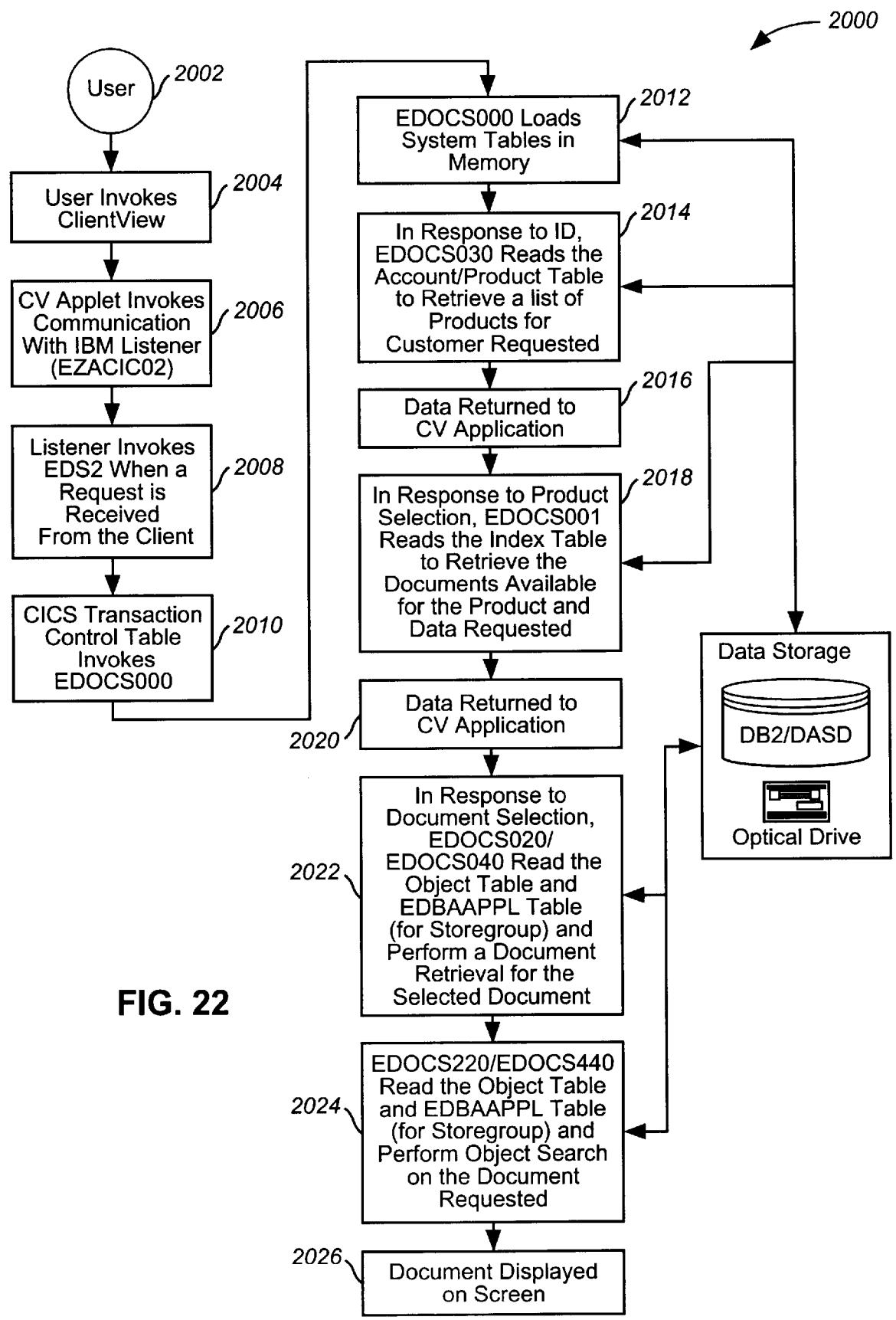
FIG. 22 is a flow diagram illustrating an online invoicing back-end server process flow when responding to client requests for document presentation.

FIG. 22 is a detailed ClientView server process flow diagram 2000 illustrating the server processes for responding to the client requests. After a user 2002 properly logs on the system of the present invention and invokes the online invoicing application at step 2004, by selecting an appropriate icon on the home page (FIG. 5), the online invoicing client GUI application, at step 2006, generally requests communications with a listener process running in the server as described above with reference to FIG. 6.

Generally, the communications from the online invoicing server to the client workstation is performed by a set of calls to the TCP/IP address space. As an example, a listener process, EZACIC02 is activated at CICS initiation, and constantly "listens" for activities. When a request is received from the client, the listener, e.g., EZACIC02, invokes the EDS2 transaction, at step 2008. At step 2010, CICS invokes the first program, i.e., EDOCS000 in the example shown, in the transaction EDS2 via the CICS transaction control table. Then, at step 2012, EDOCS000 loads system tables into memory. In addition, EDOCS000 also makes calls to TCP/IP to communicate with the client GUI application. EDOCS000 is also responsible for logging both successful and unsuccessful requests, as well as routing the request to one of many sub-programs, based on a function code and an object name. The sub-programs include EDOCS030, EDOCS001, EDOCS020/EDOCS040, and EDOCS220/EDOCS440, each of which will be described in more detail below.

When the listener process has a data to pass to EDOCS000, EDOCS000 invokes a RETRIEVE command to get the data. EDOCS000 then performs a take socket and responds to the client by a write socket. The client then typically responds to the server with a function code and additional data such as a customer identifier, dates, etc. EDOCS000 performs data validation such as function codes, checks to see if the system is up, supplies pricing information for batch print, links to lower level functions, checks the results of the lower level results, produces error entries where needed, writes statistics, and passes any data retrieved (or an error) back to the client GUI application.

After each call to a subroutine, EDOCS000 checks a return code. EDOCS000 also checks return codes from calls to the TCP/IP and posts an error message when the TCP/IP return code is a non-zero value, indicating an error. The errors are generally logged in the TCP data file and may be reviewed as needed. When all the processing necessary for responding to the client is complete and response data is successfully sent to the client, the client GUI application sends an acknowledgment for the receipt of the data, back to the server. The socket is then closed, freeing it for another request to be communicated.

Referring back to FIG. 22 at step 2014, EDOCS030 is executed when a request is made to retrieve all products and dates associated with a customer identifier. This process gets all entries from the account/product cross-reference table for the customer identifier received from the client GUI application. For each entry in the account/product cross-reference table found, the process looks up the product on the product cross-reference table. If the group is different than any group processed yet, then the process adds an additional entry at the group level, gets the product description from the product cross-reference, and gets distinct dates for addition to the table. When the entries in the table have been exhausted, the process sorts the products, e.g., in an alphabetical order by product description followed by dates sorted in descending order, for proper display at the client workstation. At step 2016, the sorted data is returned to the client GUI application for viewing by the user.

EDOCS000 links to EDOCS001 and executes it when a client GUI application requests index retrieval for specified dates within specified products. EDOCS000 passes in the customer identifier, the product and a list of dates received from the client GUI application as entered in the criteria screen 1900 at FIG. 19(a). At step 2018, EDOCS0001 reads the index table and extracts from the online invoicing database all matching entries and sorts them in order of date and invoice numbers. Different sorting order may be utilized for different products. The entries meeting the product/date criteria are then sent back to the client GUI application for presentation to a customer at step 2020. The matching entry message, which is sent to the client GUI application includes a subset of entry records found.

EDOCS000 links to EDOCS020/EDOCS040 and executes either one when a client GUI application requests for document retrieval such as the invoice document 1925 shown at FIG. 20. EDOCS020 and EDOCS040 are generally used for document retrieval and are clones of each other. The difference between the two is that EDOCS020 was written for new style objects and EDOCS040 was written to handle old style objects. In their operation, EDOCS020 and EDOCS040 generally allocate storage for the document and retrieve the document meeting the requested page range into the allocated storage as shown at step 2022. The retrieved document is then sent back to the client GUI application for presentation to the customer.

At step 2024, EDOCS220 and EDOCS440 are used for object searches on the document requested. These processes perform similar functions as do the EDOCS020 and EDOCS040 processes. They typically get the collection name and the object, and loop through the index portion of the object to find pages in the requested range for the requested document. At step 2026, the retrieved document is sent back to the client GUI application and is displayed on the user's workstation.

For servicing batch-printing requests, EDOCS00O may link to EDOCS050 and execute it. A next available request number is determined by getting the EDBPREQ record in the database and adding one to the last request number.

EDBPREQ record is then updated. The information passed to EDOCS050 is then mapped into the EDBPRINT table layout, and a new row is inserted into DB2. Errors from EDOCS050 are sent to EDOCS000, which reports them to the client GUI application.

Communications Security

Communications security, which relates to the authenticity of the enterprise Web servers 24 (FIG. 2) and the security of the transmitted data will be described with respect to an implementation in the preferred embodiment of the invention of the Secure Sockets Layer (SSL) version of HTTPS.

In order for a communication to be secure, it must be known that the message comes from the correct source, that it arrives at the correct destination, that it has not been modified, and has not been intercepted and understood by a third party. Normal encryption protects against understanding the message, even if intercepted, and certain types of cipher encryption provide the ability to determine that the message has been tampered with and in some cases reconstruct the message even if intercepted and intentionally garbled. The disadvantage of normal encryption is the difficulty associated with the secure distribution and updates of the keys used for encryption and decryption.

Public key encryption solves the distribution and update problem, but does not, for the public Internet, ensure the identity of the party with whom one is communicating. A spoofer who appropriates the DNS address of an enterprise for a leg of the Internet can substitute the spoofer's public key for the public key of the enterprise with whom the user is attempting to communicate, thereby fooling the user into revealing the user name and password used on the enterprise system. To avoid this problem, digital signatures have been developed to ensure the identity of the sender. They also, simultaneously, commit the sender to the message, avoiding subsequent repudiation.

The communications link between the enterprise and the user may be secured with S-HTTP, HTTPS, or proprietary encryption methodologies, such as VNP or PPTP tunneling, but in the preferred embodiment utilizes the Secure Sockets Layer (SSL) protocol developed by Netscape Communications. It is noted that these solutions are intended for use with IPv4, and that Ipv6, presently under comment by the Internet Engineering Steering Group, may enable secure transmissions between client and server without resort to proprietary protocols. The remaining security protocols of the present invention may be used with Ipv6 when it becomes an available standard for secure IP communications.

The SSL component of the HTTPS also includes non-repudiation techniques to guarantee that a message originating from a source is the actual identified sender. One technique employed to combat repudiation includes use of an audit trail with electronically signed one-way message digests included with each transaction. This technique employs SSL public-key cryptography with one-way hashing functions.

Another communications issue involving the secure communications link, is the trust associated with allowing the download of the Java common objects used in the present invention, as discussed earlier with respect to the browser, since the Java objects used require that the user authorize disk and I/O access by the Java object.

Digital Certificates, such as those developed by VeriSign, Inc. entitled Verisign Digital ID™ provide a mechanism to simultaneously verify the server to the user, and to verify the source of the Java object to be downloaded as a trusted source as will hereinafter be described in greater detail.

The above-mentioned authentication and encryption processes are performed in the handshake protocol, which can be summarized as follows: The client sends a client hello message to which the server must respond with a server hello message, or else a fatal error will occur and the connection will fail. The client hello and server hello are used to establish security enhancement capabilities between client and server. The client hello and server hello establish the following attributes: Protocol Version, Session ID, Cipher Suite, and Compression Method. Additionally, two random values are generated and exchanged: ClientHello.random and ServerHello.random.

Following the hello messages, the server will send its digital certificate. Alternately, a server key exchange message may be sent, if it is required (e.g. if their server has no certificate, or if its certificate is for signing only). Once the server is authenticated, it may optionally request a certificate from the client, if that is appropriate to the cipher suite selected.

The server will then send the server hello done message, indicating that the hello-message phase of the handshake is complete. The server will then wait for a client response. If the server has sent a certificate request Message, the client must send either the certificate message or a no_certificate alert. The client key exchange message is now sent, and the content of that message will depend on the public key algorithm selected between the client hello and the server hello. If the client has sent a certificate with signing ability, a digitally-signed certificate verify message is sent to explicitly verify the certificate.

At this point, a change cipher spec message is sent by the client, and the client copies the pending Cipher Spec into the current Cipher Spec. The client then immediately sends the finished message under the new algorithms, keys, and secrets. In response, the server will send its own change cipher spec message, transfer the pending to the current Cipher Spec, and send its finished message under the new Cipher Spec. At this point, the handshake is complete and the client and server may begin to exchange user layer data.

| Client | Server |
| --- | --- |
| ClientHello | - - - - - - - - > |
|  | ServerHello |
|  | Certificate* |
|  | ServerKeyExchange* |
|  | CertificateRequest* |
|  | < - - - - - - - ServerHelloDone |
| Certificate* |  |
| ClientKeyExchange |  |
| CertificateVerify* |  |
| [ChangeCipherSpec] |  |
| Finished | - - - - - - - - > |
|  | [ChangeCipherSpec] |
|  | < - - - - - - - - |
| Finished |  |
| Login Data | < - - - - - - - > Login HTML |

*Indicates optional or situation-dependent messages that are not always sent.

Figure 23:
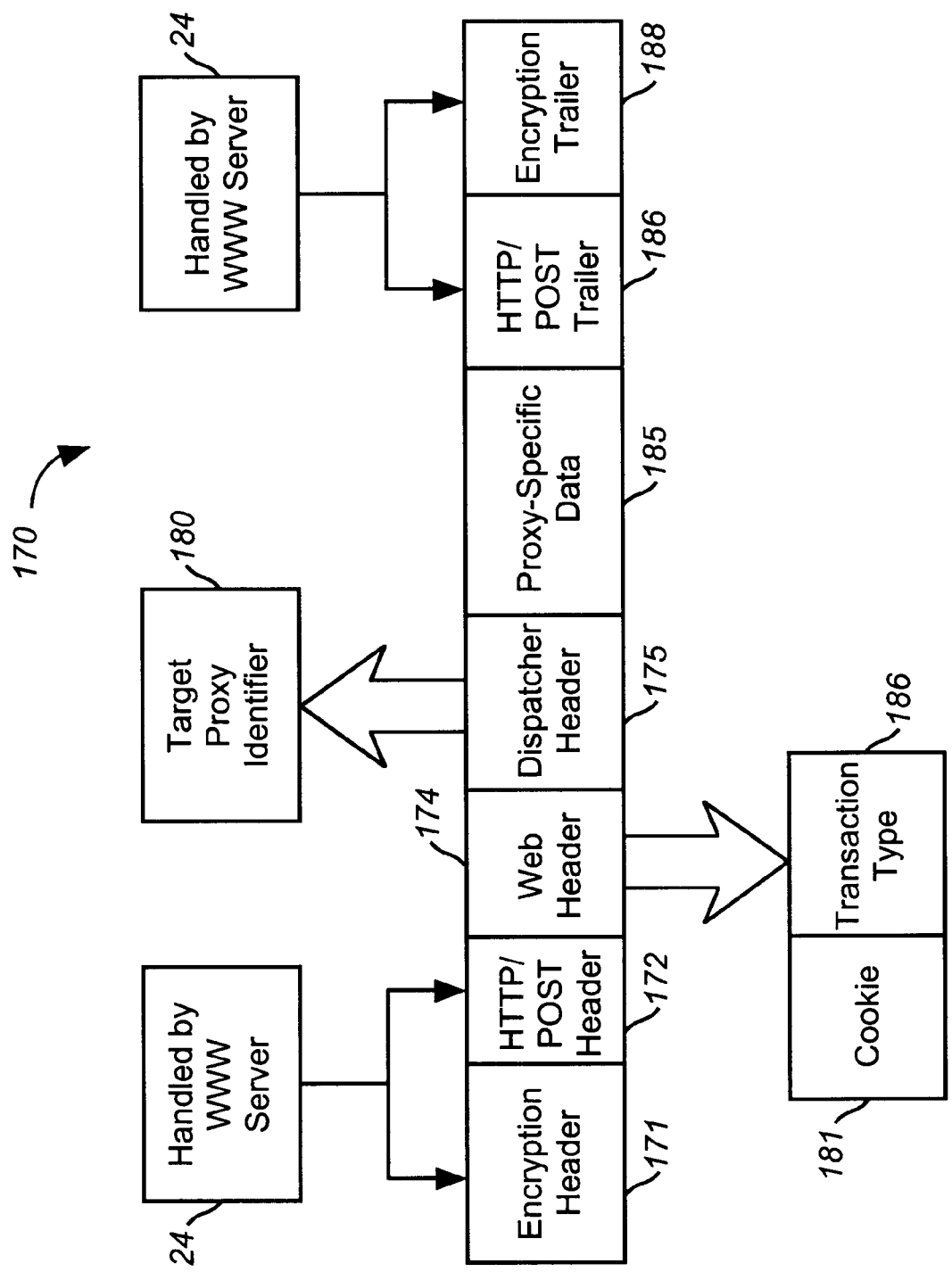
FIG. 23 is a schematic illustration of the message format passed from the user workstation 20 to the secure Web server 24 over the public Internet.

FIG. 23 is a schematic illustration of a logical message format sent from the client browser to the desired middle tier server for a particular application.

As mentioned herein with respect to FIG. 2, the messages created by the client Java software are transmitted to the secure Web Servers 24 over HTTPS. For incoming (client-to-server) communications, the Secure Web servers 24 decrypt a request, authenticate and verify the session information. The logical message format from the client to the Web server is shown as follows:

∥TCP/IP∥encryption∥http∥web header∥
dispatcher header∥proxy-specific data∥ where "∥" separates a logical protocol level, and protocols nested from left to right. FIG. 23 illustrates a specific message sent from the client browser to the desired middle tier server for the particular application. As shown in FIG. 23, the client message 170 includes an SSL encryption header 171 and a network-level protocol HTTP/POST header 172 which are decrypted by the Secure Web Server(s) 24 to access the underlying message; a DMZ Web header 174 which is used to generate a cookie 181 and transaction type identifier 186 for managing the client/server session; a dispatcher header 175 which includes the target proxy identifier 180 associated with the particular type of transaction requested; proxy specific data 185 including the application specific metadata utilized by the target proxy to form the particular messages for the particular middle tier server providing a service; and, the network-level HTTP/POST trailer 186 and encryption trailer 188 which are also decrypted by the secure DMZ Web server 24.

Referring back to FIG. 2, after establishing that the request has come from a valid user and mapping the request to its associated session, the request is then forwarded through the firewall 25b over a socket connection 23 to one or more decode/dispatch servers 26 located within the corporate Intranet 30. The messaging sent to the Dispatch Server 26 will include the user identifier and session information, the target proxy identifier, and the proxy specific data. The decode/dispatch server 26 then authenticates the user's access to the desired middle-tier service from cached data previously received from the OE server as will be hereinafter described in greater detail in connection with User Identification and Authentication.

As shown in FIG. 2, the Secure Web server 24 forwards the Dispatcher header and proxy-specific data to the Dispatch Server 26 "enriched" with the identity of the user (and any other session-related information) as provided by the session data/cookie mapping, the target proxy identifier and the proxy-specific data. The dispatch server 26 receives the requests forwarded by the Secure Web server(s) 24 and dispatches them to the appropriate application server or its proxy. The message wrappers are examined, revealing the user and the target middle-tier service for the request. A first-level validation is performed, making sure that the user is entitled to communicate with the desired service. The user's entitlements in this regard are fetched by the dispatch server from OE server 39 at logon time and cached. Assuming that the Requestor is authorized to communicate with the target service, the message is then forwarded to the desired service's prox. Each of these proxy processes further performs: a validation process for examining incoming requests and confirming that they include validly formatted messages for the service with acceptable parameters; a translation process for translating a message into an underlying message or networking protocol; and, a management process for managing the communication of the specific customer request with the middle-tier server to actually get the request serviced. Data returned from the middle-tier server is translated back to client format, if necessary, and returned to the dispatch server as a response to the request.

It should be understood that the application server proxies can either reside on the dispatch server 26 itself, or, preferably, can be resident on the middle-tier application server, i.e., the dispatcher front end code can locate proxies resident on other servers.

Session Security

As described previously, the SSL protocol includes one level of session security, and may negotiate and change in cipher code between sessions. Additionally, the present invention employs the "cookie" feature set of contemporary browsers to maintain session security, and prevent session hijacking or the use of a name and password obtain by sniffing, spoofing or EMR monitoring.

Figure 24:
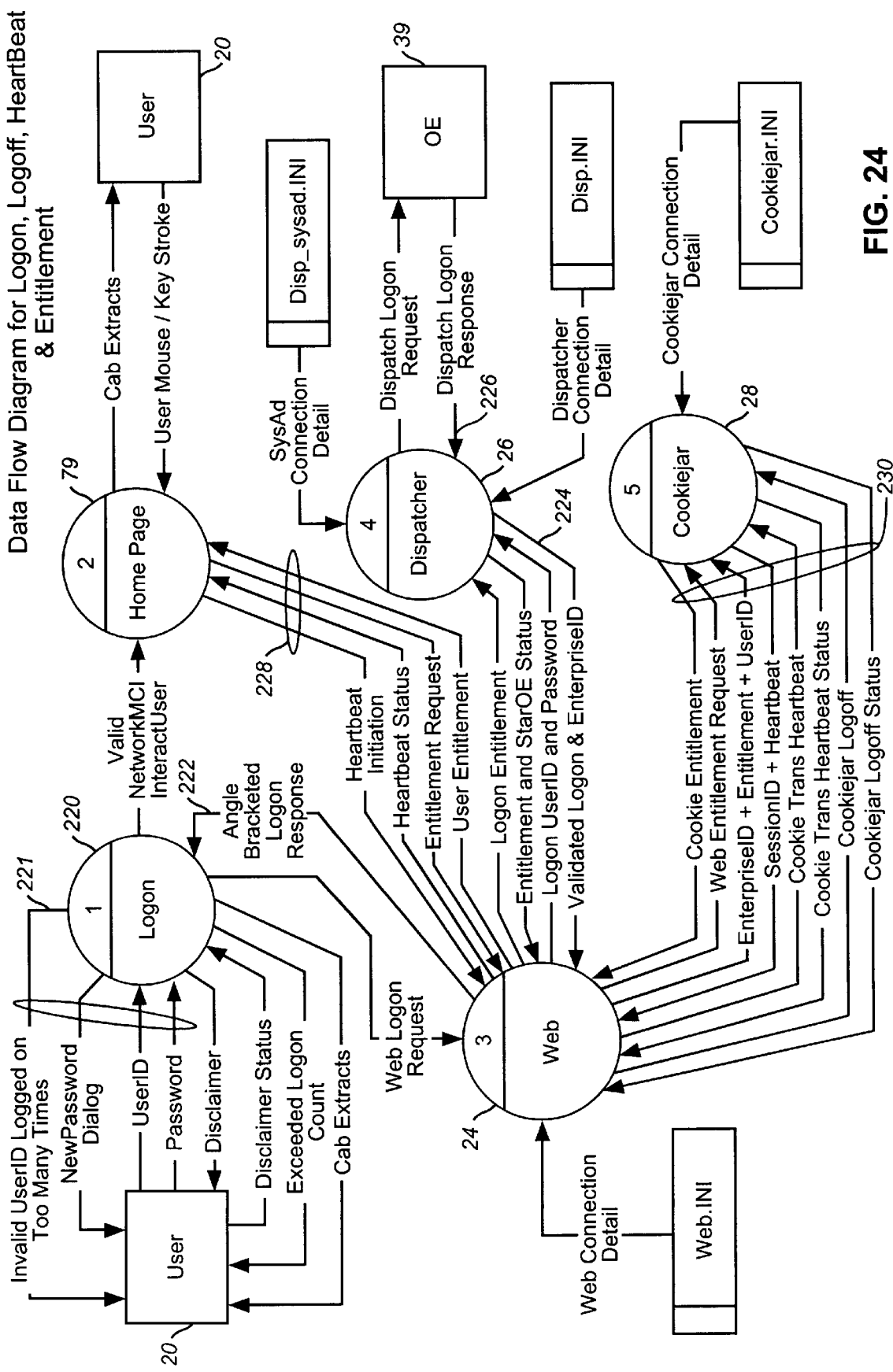
FIG. 24 is a data flow diagram illustrating the present invention's process flow during logon, entitlement request/response, heartbeat transmissions and logoff procedures.

FIG. 24 is a data flow diagram illustrating data flow among the processing modules of the system of the present invention during the logon, entitlement request/response, heartbeat transmissions and logoff procedures. As shown in FIG. 24, the client platform includes the user 20 representing a customer, a logon Web page having a logon object for logon processing 220, a home page having the backplane object. The Web server 24, the dispatcher 26, cookie jar server 28, and OE server 39 are typically located at the enterprise site.

As described above, following the SSL handshake, certain cab files, class files and disclaimer requests are downloaded with the logon Web page as shown at 221. At the logon Web page, the customer 20 then enters a user identifier (userid) and password for user authentication as illustrated at 221. The customer also enters disclaimer acknowledgment 221 on the logon page 220. If the entered userid and password are not valid or if there were too many unsuccessful logon transactions, the logon object 220 communicates the appropriate message to the customer 20 as shown at 221. A logon object 220, typically an applet launched in the logon Web page, connects to the Web server 24, for communicating a logon request to the system as shown at 222. The logon data, having an encrypted userid and password, is sent to the dispatcher 26 when the connection is established as shown at 224. The dispatcher 26 then decrypts the logon data and sends the data to the OE 39 after establishing a connection as shown at 26. The OE server 39 validates the userid and password and sends the results back to the dispatcher 26 as illustrated at 226 together with the user application entitlements. The dispatcher 26 passes the data results obtained from the OE 39 to the Web server 24 as shown at 224, which passes the data back to the logon object 220 as shown at 222. The customer 20 is then notified of the logon results as shown as 221.

When the customer 20 is validated properly, the customer is presented with another Web page, referred to as the home page 79, from which the backplane is launched typically. After the user validation, the backplane generally manages the entire user session until the user logs off the system of the present invention. As shown at 228, the backplane initiates a session heartbeat which is used to detect and keep the communications alive between the client platform and the enterprise Intranet site. The backplane also instantiates a COUser object for housekeeping of all client information as received from the OE 39. For example, to determine which applications a current customer is entitled to access and to activate only those application options on the home page for enabling the customer to select, the backplane sends a "get application list" message via the Web server 24 and the dispatcher 26 to the OE 39 as shown at 228, 224, and 226. The entitlement list for the customer is then sent from the OE 39 back to the dispatcher 26, to the Web server 24 and to the backplane at the home page 79 via the path shown at 226, 224, and 228. The application entitlements for the customer are kept in the COUser object for appropriate use by the backplane and for subsequent retrieval by the client applications.

The entitlement information for COUser is stored in a cookie jar 28, maintained in the cookie jar server 32 (illustrated in FIGS. 2 and 59). When the Web server receives the entitlement requests from the backplane at the home page 79 or from any other client applications, the Web server 24 makes a connection to the cookie jar 28 and checks if the requested information is included in the cookie jar 28 as shown at 230. The cookie jar 28 is a repository for various customer sessions and each session details are included in a cookie including the entitlement information from the OE server 39. During the logon process described above, the OE server 39 may include in its response, the entitlements for the validated customer. The dispatcher 26 transfers the entitlement data to the Web server 24, which translates it into a binary format. The Web server 24 then transmits the binary entitlement data to the cookie jar 28 for storage and retrieval for the duration of a session. Accordingly, if the requested information can be located in the cookie jar 28, no further request to the OE 39 may be made. This mechanism cuts down on the response time in processing the request. Although the same information, for example, customer application entitlements or entitlements for corp identifiers, may be stored in the COUser object and maintained at the client platform as described above, a second check is usually made with the cookie jar 28 via the Web server 24 in order to insure against a corrupted or tampered COUser object's information. Thus, entitlements are typically checked in two places: the client platform 10 via COUser object and the Web server 24 via the cookie jar 28.

When a connection is established with the cookie jar 28, the Web server 24 makes a request for the entitlements for a given session as shown at 230. The cookie jar 28 goes through its stored list of cookies, identifies the cookie for the session and returns the cookie to the Web server 24 also shown at 230. The Web server 24 typically converts the entitlements which are received in binary format, to string representation of entitlements, and sends the entitlement string back to the backplane running on the client platform 10.

Furthermore, the cookie jar 28 is used to manage heartbeat transactions. Heartbeat transactions, as described above, are used to determine session continuity and to identify those processes which have died abnormally as a result of a process failure, system crash or a communications failure, for example. During a customer session initialization, the cookie jar 28 generates a session id and sets up "heartbeat" transactions for the customer's session. Subsequently, a heartbeat request is typically sent from a process running on a client platform to the Web server 24, when a connection is established, as shown at 228. The Web server 24 connects to the cookie jar 28 and requests heartbeat update for a given session. The cookie jar 28 searches its stored list of cookies, identifies the cookie for the session and updates the heartbeat time. The cookie jar 28 then sends the Web server 24 the updated status heartbeat as shown at 230. The Web server 24 then sends the status back to the client platform process, also as shown at 230.

When a customer wants to logoff, a logoff request transaction may be sent to the Web server 24. The Web server 24 then connects to the cookie jar 28 and requests logoff for the session as shown at 230. The cookie jar 28 identifies the cookie for the session and deletes the cookie. After deleting the cookie, the cookie jar 28 sends a logoff status to the Web server 24, which returns the status to the client platform.

Figure 25:
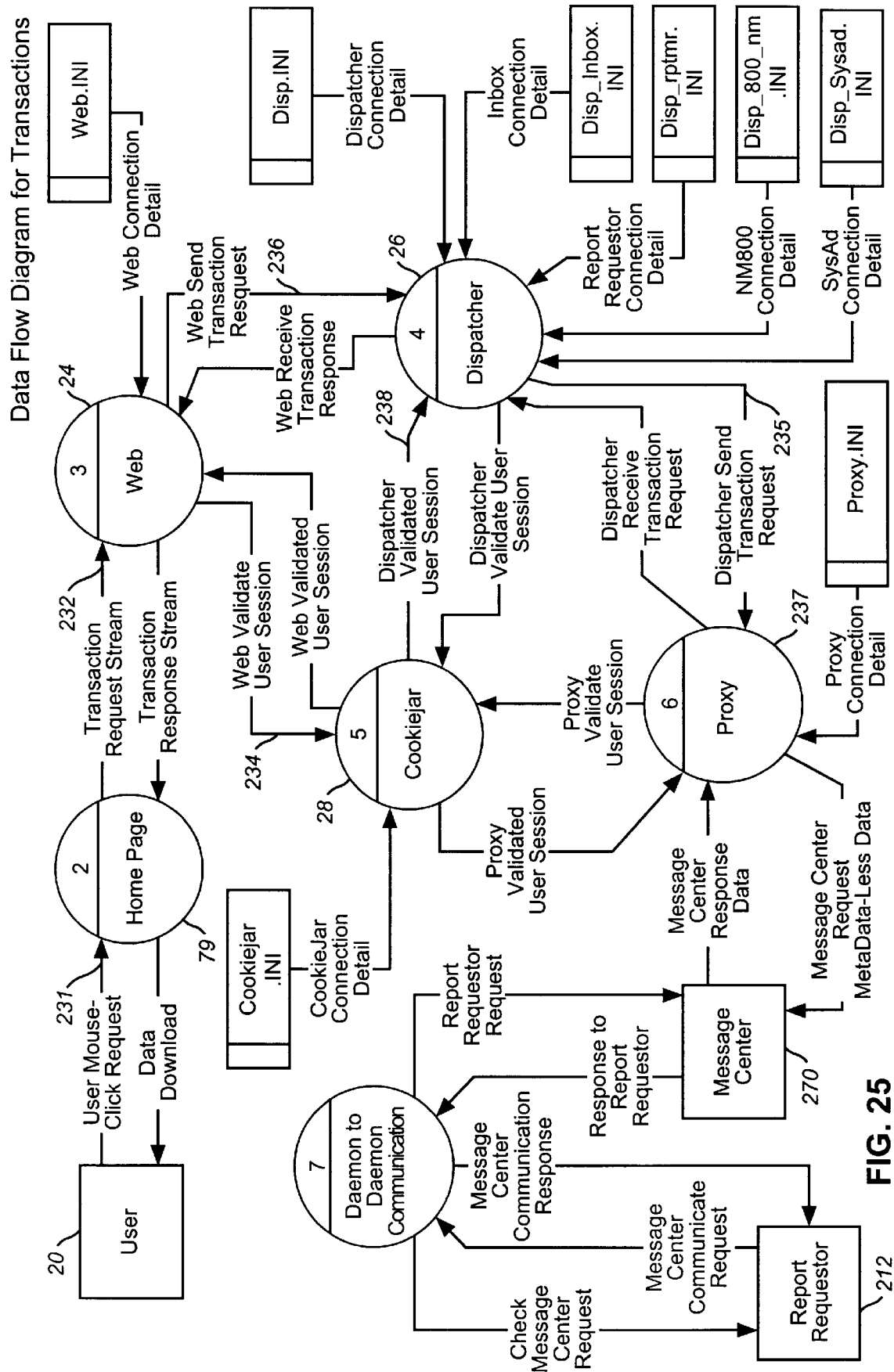
FIG. 25 is a data flow diagram for various transactions communicated in the system of the present invention.

Other transaction requests are also sent via the Web server 24 and the cookie jar 28 as shown in FIG. 25. FIG. 25 is a data flow diagram for various transactions communicated in the system of the present invention. Typically, when a customer enters a mouse click on an application link as shown at 231, an appropriate transaction request stream is sent to the Web server as shown at 232. The Web server 24 typically decrypts the transaction stream and connects to the cookie jar 28 to check if a given session is still valid as shown at 234. The cookie jar 28 identifies the cookie for the session and sends it back to the Web server 24 as shown at 234. The Web server 24 on receipt of valid session connects to the dispatcher 26 and sends the transaction request as shown at 236. When the dispatcher 26 obtains the request, it may also connect to the cookie jar 28 to validate the session as shown at 238. The cookie jar 28 identifies the cookie for the session and sends it back to the dispatcher 26 as shown at 238. The dispatcher 26, upon receiving the valid session connects to a targeted application server or proxy 237, which may include OE, and sends the request transaction to the target as shown at 235. The server or proxy 237 processes the request and sends back the response as stream of data which is piped back to the dispatcher 26 as shown at 235. The dispatcher 26 pipes the data back to the Web server 24 as shown at 236, which encrypts and pipes the data to the client platform as shown at 232, referred to as the home page 79 in FIG. 25.

The present invention includes a client communications unit for providing a single interface from which the backplane and the applications may send messages and requests to back-end services. The client communications unit includes a client session unit and a transactions unit. The client session unit and the transactions unit comprise classes used by client applications to create objects that handle communications to the various application proxies and or servers. Generally, the entire communications processes start with the creation of a client session after a login process. This is started through the login process. The user logs into user's Web page with a username and password. During a login process, a client session object of class COClientSession is created, and the COClientSession object passes the username and password information pair obtained from the login process to a remote system administrative service which validates the pair. The following code instructions are implemented, for example, to start up a session using the COClientSession class.
COClientSession ss =new COClientSession( );
  try {
    ss.setURL(urlString);
    ss.logon("jsmith", "myPassword");
  } catch (COClientLogonException e) {. . .
  } catch (MalformedURLException e) {. . . };
In addition, the COClientSession object contains a reference to a valid COUser object associated with the user of the current COClientSession object.

The client session object also provides a session, where a customer logs on to the system at the start of the session, and if successfully authenticated, is authorized to use the system until the session ends. The client session object at the same time provides a capability to maintain session-specific information for the life/duration of the session. Generally, communications to and from the client takes place over HTTPS which uses the HTTP protocols over an SSL encrypted channel. Each HTTP request/reply is a separate TCP/IP connection, completely independent of all previous or future connections between the same server and client. Because HTTP is stateless, meaning that each connection consists of a single request from the client which is answered by a single reply by a server, a novel method is provided to associate a given HTTP request with the logical session to which it belongs.

When a user is authenticated at login via the system administrative server, the client session object is given a "cookie", a unique server-generated key which identifies a session. The session key is typically encapsulated in a class COWebCookie, "public CoWebCookie (int value).", where value represents a given cookie's value. The client session object holds this key and returns it to the server as part of the subsequent HTTP request. The Web server maintains a "cookie jar" which is resident on the dispatch server and which maps these keys to the associated session. This form of session management also functions as an additional authentication of each HTTPS request, adding security to the overall process. In the preferred embodiment, a single cookie typically suffices for the entire session. Alternatively, a new cookie may be generated on each transaction for added security. Moreover, the cookie jar may be shared between the multiple physical servers in case of a failure of one server. This mechanism prevents sessions being dropped on a server failure.

In addition, to enable a server software to detect client sessions which have "died", e.g., the client session has been disconnected from the server without notice because of a client-side crash or network problem, the client application using the client session object "heartbeats" every predefined period, e.g., 1 minutes to the Web server to "renew" the session key (or record) The Web server in turn makes a heartbeat transaction request to the cookie jar. Upon receipt of the request, the cookie jar service "marks" the session record with a timestamp indicating the most recent time the client communicated to the server using the heartbeat. The cookie jar service also alarms itself, on a configurable period, to read through the cookie jar records (session keys) and check the timestamp (indicating the time at which the client was last heard) against the current time. If a session record's delta is greater than a predetermined amount of time, the cookie jar service clears the session record, effectively making a session key dead. Any subsequent transactions received with a dead session key, i.e., nonexistent in the cookie jar, are forbidden access through the Firewall. The heartbeat messages are typically enabled by invoking the COClientSession object's method "public synchronized void enableSessionHeartbeat (boolean enableHeartbeat)", where enableartbeat is a flag to enable or disable heartbeat for a session. The heartbeat messages are typically transmitted periodically by first invoking the COClientSession object's method "public synchronized void setHeartbeatInterval (long millsecsInterval)", where the heartbeat interval is set in milliseconds, and by the COClientSession object's method "protected int startHeartbeat( )", where the heartbeat process starts as soon as the heartbeat interval is reached. Failure to "heartbeat" for consecutive predefined period, e.g., one hour, would result in the expiration of the session key.

Enterprise Security

Enterprise Security is directed to the security of the enterprise network and the data maintained by the various enterprise applications with respect to the open nature of the Internet, and the various attacks on the system or data likely to result from exposure to the Internet. Usual enterprise security is focused on internal procedures and employees, since this represents the biggest single area of exposure. Strong passwords, unique user identifiers and the physical security of the workstations are applicable to both internal employees and external customers and users who will access the enterprise applications. It is noted that many of the previously described features relating to data encryption for communications security and session security are essential parts of enterprise security, and cooperate with enterprise architecture and software infrastructure to provide security for the enterprise.

For example, as will be hereinafter described in detail, the present invention uses strong symmetric key encryption for communications through the firewalls to the application servers. This internal symmetric key encryption, when coupled with external public key encryption provides an extra level of security for both the data and the software infrastructure.

Figure 26:
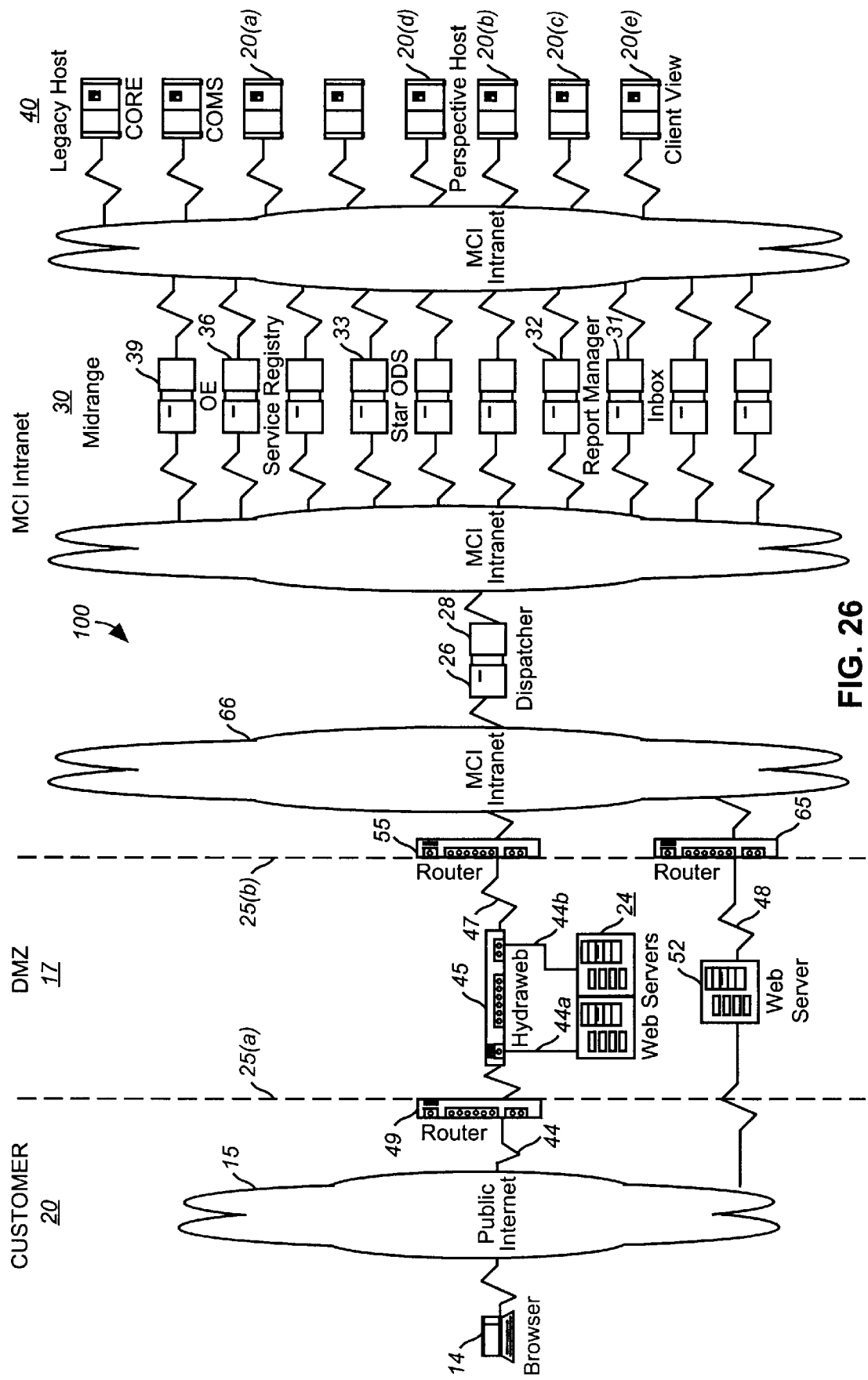
FIG. 26 is a diagram depicting the physical network architecture of the system of the present invention.

FIG. 26 is a diagram depicting the physical system architecture 100. As shown in FIG. 26, the system is divided into three major architectural divisions including: 1) the customer workstation 20 which include those mechanisms enabling customer connection to the Secure Web servers 24; 2) a secure network area 17, known as the DeMilitarized Zone "DMZ" set aside on MCI premises double firewalled between the both the public Internet 25 and the MCI Intranet to prevent potentially hostile customer attacks; and, 3) the enterprise Intranet Mid-range Servers 30 and Legacy Mainframe Systems 40 which comprise the back end business logic applications.

As illustrated in FIG. 26, the present invention includes a double or complex firewall system that creates a "demilitarized zone" (DMZ) between two firewalls 25a, 25b. In the preferred embodiment, one of the firewalls 25 includes port specific filtering routers, which may only connect with a designated port on a dispatch server within the DMZ. The dispatch server connects with an authentication server, and through a proxy firewall to the application servers. This ensures that even if a remote user ID and password are hijacked, the only access granted is to one of the Web servers 24 or to intermediate data and privileges authorized for that user. Further, the hijacker may not directly connect to any enterprise server in the enterprise intranet, thus ensuring internal company system security and integrity. Even with a stolen password, the hijacker may not connect to other ports, root directories or applications within the enterprise system.

The DMZ acts as a double firewall for the enterprise Intranet because the Web servers located in the DMZ never store or compute actual customer sensitive data. The Web servers only put the data into a form suitable for display by the customer's Web browser. Since the DMZ Web servers do not store customer data, there is a much smaller chance of any customer information being jeopardized in case of a security breach.

As previously described, the customer access mechanism is a client workstation 20 employing a Web browser 14 for providing the access to the system of the present invention via the public Internet 15. When a subscriber connects to the Web site of the present invention by entering the appropriate URL, a secure TCP/IP communications link 22 is established to one of several Web servers 24 located inside a first firewall 29a in the DMZ 17. Preferably at least two Web servers are provided for redundancy and failover capability. In the preferred embodiment of the invention, the system employs SSL encryption so that communications in both directions between the subscriber and the system of the present invention are secure.

In the preferred embodiment, all DMZ Secure Web servers 24 are preferably DEC 4100 systems having Unix or NT-based operating systems for running services such as HTTPS, FTP, and Telnet over TCP/IP. The Web servers may be interconnected by a fast Ethernet LAN running at 100 Mbit/sec or greater, preferably with the deployment of switches within the Ethernet LANs for improved bandwidth utilization. One such switching unit included as part of the network architecture is a HydraWEB™ unit 45, manufactured by HydraWEB Technologies, Inc., which provides the DMZ with a virtual IP address so that subscriber HTTPS requests received over the Internet will always be received. The HydraWeb™ unit 45 implements a load balancing algorithm enabling intelligent packet routing and providing optimal reliability and performance by guaranteeing accessibility to the "most available" server. It particularly monitors all aspects of Web server health from CPU usage, to memory utilization, to available swap space so that Internet/Intranet networks can increase their hit rate and reduce Web server management costs. In this manner, resource utilization is maximized and bandwidth (throughput) is improved. It should be understood that a redundant HydraWeb™ unit may be implemented in a Hot/Standby configuration with heartbeat messaging between the two units (not shown). Moreover, the system architecture of the present invention affords Web server scaling, both in vertical and horizontal directions. Additionally, the architecture is such that new secure Web servers 24 may be easily added as customer requirements and usage increases. The use of the HydraWEB™ enables better load knt distribution when needed to match performance requirements.

As shown in FIG. 26, the most available Web server 24 receives subscriber HTTPS requests, for example, from the HydraWEB™ 45 over a connection 35a and generates the appropriate encrypted messages for routing the request to the appropriate Intranet mid-range Web server over connection 35b, router 55 and connection 23. Via the HydraWeb™ unit 45, a TCP/IP connection 38 links the Secure Web server 24 with the Intranet Dispatch server 26.

Further as shown in the DMZ 17 is a second server 52 having its own connection to the public Internet via a TCP/IP connection 32. An additional TCP/IP connection 48 links this second Web server 52 with the Intranet Dispatch server 26.

With more particularity, as further shown in FIG. 26, the physical architecture for the system of the present invention includes two routers: a first router 55 for routing encrypted subscriber messages from a Secure Web server 24 to the Dispatch server 26 located inside the second firewall 29b; and, a second router 65 for routing encrypted subscriber messages from the second Web server 52 to the Dispatch server 26 inside the second firewall. Although not shown, each of the routers 55, 65 may additionally route signals through a series of other routers before eventually being routed to the Dispatch server 26. In operation, each of the Secure servers 24 function to decrypt the client message, preferably via the SSL implementation, and unwrap the session key and verify the users session from the COUser object authenticated at Logon.

After establishing that the request has come from a valid user and mapping the request to its associated session, the Secure Web servers 24 will re-encrypt the request using symmetric RSA encryption and forward it over a second secure socket connection 23 to the dispatch server 26 inside the enterprise Intranet.

Figure 27A:
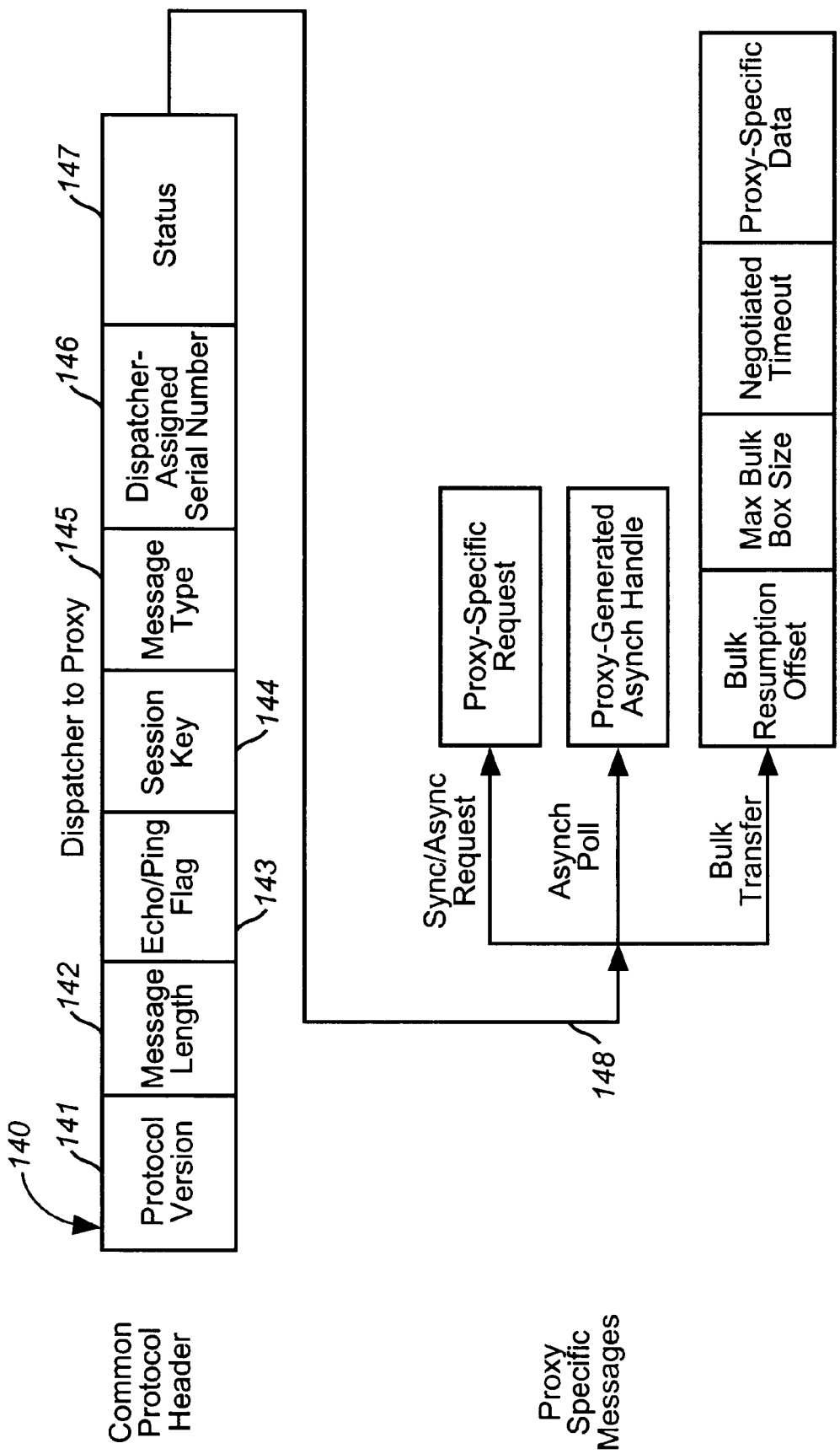
FIGS. 27(a) is a schematic illustration showing the message format passed between the Dispatch server and the application specific proxy.
Figure 27B:
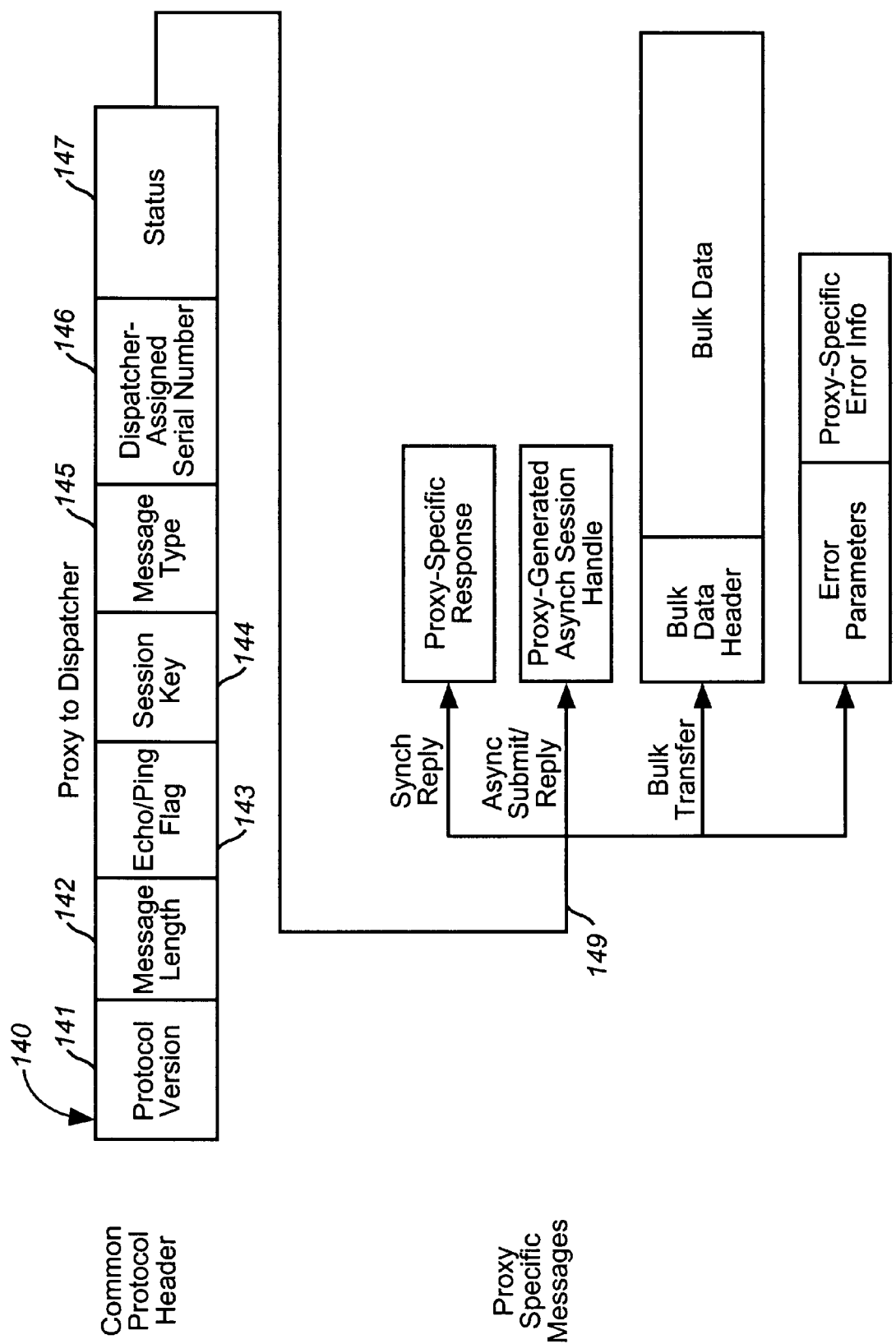
FIGS. 27(b) is a schematic illustration of the message format passed between the application specific proxy back to the Dispatch server.

FIGS. 27(a) and 27(b) are schematic illustrations showing the message format passed between the dispatcher 26 and the relevant application specific proxy, (FIG. 27(a)) and the message format passed between the application specific proxy back to the Dispatcher 26 (FIG. 27(b)). As shown in FIG. 27(a), all messages between the Dispatcher and the Proxies, in both directions, begin with a common header 140 to allow leverage of common code for processing the messages. A first portion of the header includes the protocol version 141 which may comprise a byte of data for identifying version control for the protocol, i.e., the message format itself, and is intended to prevent undesired mismatches in versions of the dispatcher and proxies. The next portion includes the message length 142 which, preferably, is a 32-bit integer providing the total length of the message including all headers. Next is the echo/ping flag portion 143 that is intended to support a connectivity test for the dispatcher-proxy connection. For example, when this flag is non-zero, the proxy immediately replies with an echo of the supplied header. There should be no attempt to connect to processes outside the proxy, e.g. the back-end application services. The next portion indicates the Session key 144 which is the unique session key or "cookie" provided by the Web browser and used to uniquely identify the session at the browser. As described above, since the communications middleware is capable of supporting several types of transport mechanisms, the next portion of the common protocol header indicates the message type/mechanism 145 which may be one of four values indicating one of the following four message mechanisms and types: 1)Synchronous transaction, e.g., a binary 0; 2) Asynchronous request, e.g., a binary 1; 3) Asynchronous poll/reply, e.g., a binary 2; 4) bulk transfer, e.g., a binary 3.

Additionally, the common protocol header section includes an indication of dispatcher-assigned serial number 146 that is unique across all dispatcher processes and needs to be coordinated across processes (like the Web cookie (see above)), and, further, is used to allow for failover and process migration and enable multiplexing control between the proxies and dispatcher, if desired. A field 147 indicates the status in the request header but is used in the response header to indicate the success or failure of the requested transaction. More complete error data will be included in the specific error message returned. The status field 147 is included to maintain consistency between requests and replies. As shown in FIG. 27(a), the proxy specific messages 148 are the metadata message requests from the report requester client and can be transmitted via synchronous, asynchronous or bulk transfer mechanisms. Likewise, the proxy specific responses are metadata response messages 149 again, capable of being transmitted via a synch, asynch or bulk transfer transport mechanism.

It should be understood that the application server proxies can either reside on the dispatch server 26 itself, or, preferably, can be resident on the middle-tier application servers 30, i.e., the dispatcher front end code can locate proxies resident on other servers.

As mentioned, the proxy validation process includes parsing incoming requests, analyzing them, and confirming that they include validly formatted messages for the service with acceptable parameters. If necessary, the message is translated into an underlying message or networking protocol. If no errors are found, the proxy then manages the communication with the middle-tier server to actually get the request serviced. The application proxy supports application specific translation and communication with the back-end application server for both the Web Server (java applet originated) messages and application server messages.

For example, in performing the verification, translation and communication functions, the Report Manager server, the Report Scheduler server and Inbox server proxies each employ front end proxy C++ objects and components. For instance, a utils.c program and a C++ components library, is provided for implementing general functions/objects. Various C++ parser objects are invoked which are part of an object class used as a repository for the RM metadata and parses the string it receives. The class has a build member function which reads the string which contains the data to store. After a message is received, the parser object is created in the RMDispatcher.c object which is file containing the business logic for handling metadata messages at the back-end. It uses the services of an RMParser class. Upon determining that the client has sent a valid message, the appropriate member function is invoked to service the request. Invocation occurs in MCIRMServerSocket.C when an incoming message is received and is determined not to be a Talarian message. RMSErverSocket.c is a class implementing the message management feature in the Report Manager server. Public inheritance is from MCIServerSocket in order to create a specific instance of this object. This object is created in the main loop and is called when a message needs to be sent and received; a Socket.c class implementing client type sockets under Unix using, e.g., TCP/IP or TCP/UDP. Socket.C is inherited by ClientSocket.C:: Socket(theSocketType, thePortNum) and ServerSocket.C:: Socket(theSocketType, thePortNum) when ClientSocket or ServerSocket is created. A ServerSocket.c class implements client type sockets under Unix using either TCP/IP or TCP/UDP. ServerSocket.C is inherited by RMServerSocket when RMServerSocket is created. An InboxParser.c class used as a repository for the RM Metadata. The class' "build" member function reads the string which contains the data to store and the class parses the string it receives. After a message has been received, the MCIInboxParser object is created in inboxutl.c which is a file containing the functions which process the Inbox requests, i.e, Add, Delete, List, Fetch and Update. Additional objects/classes include: Environ.c which provides access to a UNIX environment; Process.c which provides a mechanism to spawn slave processes in the UNIX environment; Daemon.c for enabling a process to become a daemon; Exception.c for exception handling in C++ programs; and, RMlog.c for facilitating RM logging. In addition custom ESQL code for RM/database interface is provided which includes the ESQC C interface (Informix) stored procedures for performing the ARD, DRD, DUR, URS, GRD, CRD, and GPL messages. The functions call the stored procedures according to the message, and the response is build inside the functions depending on the returned values of the stored procedures. A mainsql.c program provides the ESQL C interface for messages from the report manager and report viewer.

Outgoing (server-to-client) communications follow the reverse route, i.e., the proxies feed responses to the decode/dispatch server 26 and communicate them to the DMZ Web servers 24 over the socket connection. The Web servers 26 will forward the information to the client 10 using SSL. The logical message format returned to the client from the middle tier service is shown as follows:

||TCP/IP||encryption||http||web response dispatcher response||proxy-specific response|| where "||" separates a logical protocol level, and protocols nested from left to right.

While the invention has been particularly shown and described with respect to preferred embodiments thereof, it will be understood by those skilled in the art that the foregoing and other changes in form and details may be made therein without departing from the spirit and scope of the invention.

What is claimed is:

1. An integrated data management system for providing one or more data management services from an enterprise over the Internet to a customer having a workstation at a customer site, comprising:
- a user interface executable in a customer workstation located at the customer site for authenticating the customer's access to the integrated data management system, the user interface further presenting one or more data management services according customer entitlements, for the customer to select, wherein the customer entitlements include a subscription to one of the data management services;
- one or more client applications representing the one or more data management services, each of the client applications initiated by the user interface in response to a customer selection and providing an interface to a corresponding data management service selected by the customer;
- one or more secure servers located between the customer workstation and the enterprise for providing a secure transportation of data transactions between the user interface and the one or more secure servers, the one or more further forwarding the data transactions for processing at the enterprise;
- at least one dispatch server located at the enterprise for receiving the data transactions from the one or more secure servers through a firewall, the dispatch server further verifying the customer's access to the system and determining one of the data management services in the enterprise to which the data transactions need be routed for processing; and
- one or more application servers providing the one or more data management services offered by the enterprise, the one or more application servers receiving the data transactions from the dispatch server for processing and forwarding response transactions back to the one or more client applications for presentation to the customer via the dispatch server and the one or more secure servers,
- wherein the customer is enabled at the customer site to request and receive the data management services according to the customer's entitlements in a secure Internet-based. computing environment.

2. The integrated data management system as claimed in claim 1, wherein the one or more secure servers support a secure sockets layer communications protocol for encrypted communication between the user interface, including the client applications, and the secure servers, the secure servers also providing session management including client identification, validation and session management to link the session with the customer.

3. The integrated data management system as claimed in claim 2, wherein the system further includes digital certificates to authenticate the one or more secure servers to the user interface.

4. The integrated data management system as claimed in claim 2, wherein the one or more application servers include an order entry server for providing authentication services, the order entry server further enabling the customer to enter orders over the Internet from the customer workstation for the one or more data management services available at the enterprise, wherein the customer is enabled, via the user interface, to enter new orders, modify existing orders, and cancel orders for the one or more data management services within the customer entitlements.

5. The integrated data management system as claimed in claim 4, wherein the order entry system fulfills order requests from the customer and electronically transmits fulfillment packages to the customer workstation.

6. The integrated data management system as claimed in claim 4, wherein the user interface includes a Web-based graphical user interface (GUI) having a backplane object downloaded with and launched by the Web-based GUI, the backplane object capable of launching the one or more client applications upon initiation by the customer according to the customer's entitlements determined from the order entry server, the backplane object further enabling inter-application communications among the client applications,
- wherein the backplane object and the client applications interoperate with one another to provide an integrated customer interface to the one or more data management services subscribed by the customer.

7. The integrated data management system as claimed in claim 6, wherein the user interface further includes a logon object downloaded and launched by the user interface for accepting logon transactions from the customer, the logon object creating a session object for communicating with the order entry server to provide the customer authentication,
- wherein upon successful customer validation, the user interface downloads the one or more client applications and the Web-based GUI having the backplane object.

8. The integrated data management system as claimed in claim 6, further comprising:
- a user object for representing a current customer, the user object further communicating with the order entry server to determine the customer's entitlements to the Web enabled data management services,
- wherein the backplane uses the entitlements to present, via the Web-based GUI, only those Web enabled services to which the user has privilege.

9. The integrated data management system as claimed in claim 8, wherein the client application is run directly by the backplane object when the customer selects the data management service associated with the client application, the client application running in a frame independent from a Web browser's window.

10. The integrated system as claimed in claim 8, wherein the client application is an application launched from a new browser window retrieved by the backplane object.

11. The integrated data management system as claimed in claim 8, wherein the one or more application servers include an inbox server, and the one or more client applications include an inbox client application, the inbox server providing a repository for storing information received from the one or more applications servers, the inbox server further transmitting the information received from the one or more application servers to the inbox client application for presentation to the customer at the customer workstation.

12. The integrated data management system as claimed in claim 11, wherein the inbox client application further includes a polling thread, the polling thread for detecting an incoming message from the inbox server via the one or more secure servers, the polling thread further starting a new thread upon detection of the incoming message, wherein the new thread starts and listens on a second one of the secure socket connections for detecting new messages, while the polling thread receives the incoming message on the first one of the secure socket connection,
- whereby multiple messages may be downloaded simultaneously as detected.

13. The integrated system as claimed in claim 12, wherein the inbox client application launches another client application associated with the information when the customer selects to access the information presented at the customer workstation.

14. The integrated data management system as claimed in claim 11, wherein the one or more application servers further includes a report manager remote server providing a data management reporting function, and wherein the one or more client applications related to the report manager remote server further includes:
   a report requestor application for initiating communication with the report manager remote server; and,
   a report viewer application enabling display of reports in accordance with customer-selected reporting options, the report requester and report viewer applications being downloaded from the one or more secure servers to the customer workstation for displaying one or more customer-selectable data reporting items for the customer via the interface in accordance with the customer's entitlements.

15. The integrated data management system as claimed in claim 14, wherein the report manager remote server further maintains an inventory of reports associated with the customer and receives a customer report request message via the interface, the report manager program accessing report items according to the report request message and generating a response message including a metadata description of reporting items to be displayed in the report,
   whereby customer-specific data from the one or more application servers and the metadata description of customer-selected reporting items are utilized to generate a completed report for presentation to the customer via the interface.

16. The integrated data management system as claimed in claim 15, wherein the report requester application enables customization of reporting items to be reported via the interface, the report manager remote server providing the reporting items capable of being customized according to the customer's entitlements to the report requestor application when generating a report request.

17. The integrated data management system as claimed in claim 15, wherein the one or more application servers further comprises a report scheduler application for enabling periodic generation of reports from the one or more application servers at a customer-specified frequency.

18. The integrated data management system as claimed in claim 17, wherein the inbox server further stores and maintains customer specific report data to be reported to the customer, and, further receives a notification from the report manager remote server including a metadata description for generating the report,
   the report data and the metadata description associated with the report data being downloaded to the customer workstation via the one or more secure servers for generation of reports according to the metatdata description, the generated reports being presented to the customer via the user interface.

19. The integrated data management system as claimed in claim 18, wherein the inbox server further comprises a pre-defined directory associated with each of the one or more data management application services, wherein each of the one or more application servers stores the report data and the information data to its respective pre-defined directory in the inbox server.

20. The integrated data management system as claimed in claim 19, wherein the one or more application servers further include an operational data component, the operational data component comprising:
   an application for extracting data records from a billing system which generates data records specific to a product provided to the customer;
   an application for harvesting the extracted data records for storage in an database storage device; and
   a decision support server for receiving customer requests for data, the decision support server accessing the customer-specific data from the database storage device and transmitting the customer-specific data to the inbox server in accordance with the customer request.

21. The integrated system as claimed in claim 20, wherein the database storage device organizes the customer specific data according to a star schema topology to facilitate access thereof.

22. The integrated data management system as claimed in claim 20, wherein a reporting option includes running a pre-defined report, the report scheduler application communicating a message to the decision support server to run the pre-defined report at a pre-determined time, the pre-defined report being updated with customer-specific data available at the pre-determined time.

23. The integrated data management system as claimed in claim 2, wherein the one or more data management services include an invoice viewing system for enabling the customer to retrieve an invoice, over the public Internet, which relates to the one or more data management services provided by the enterprise,
   the one or more client applications further including an invoice presentation application for enabling selection and presentation of invoice documents in accordance with the customer entitlement, the invoice presentation application further generating an invoice request message in response to customer selection of a specific invoice option and forwarding the invoice request message via the one or more secure servers, and
   the one or more application servers further include an invoice server for maintaining a database of image files associated with documents from the application services and receiving the invoice request message, the invoice server accessing the database in response to a request message and generating a response message for forwarding back to the invoice presentation application via the one or more secure servers,
   wherein the response message is assembled in a form suitable for display and the invoice presentation application presents a customer selected invoice document at the customer workstation.

24. The integrated data management system as claimed in claim 23, wherein the database of image files further includes an object database, the invoice server further comprising:
   a conversion device for imaging documents by defining key information necessary to retrieve documents from the data management application services and compress the documents for storing; and
   a store device for loading the compressed documents into the object database.

25. The integrated data management system as claimed in claim 23, wherein the database of image files further includes an index database, and the invoice server further includes an index load device for storing index pointers pointing to the compressed documents.

26. The integrated data management system as claimed in claim 2, wherein said session management provided by the one or more secure servers includes Web cookie generation at each instance of client identification to link a session with the customer through a plurality of discrete client communications in the session to verify the customer to the dispatch server at each transmission in the session.

27. The integrated data management system as claimed in claim 26, wherein the cookie is generated by a program on a separate server during an entitlements communications, after identification and authentication of the client.

28. The integrated data management system as claimed in claim 27, wherein the secure socket layer encrypts client identification, authentication and the session management cookie during each transmission.

29. The integrated data management system as claimed in claim 28, wherein the session cookies provide simultaneous session management for a plurality of system resource platforms.

30. The integrated data management system as claimed in claim 28, further including encryption for transmission of all customer data between the one or more secure servers and the dispatch server, and SSL encryption for transmission of all customer data between the one or more secure servers and the customer workstation.

31. The integrated data management system as claimed in claim 28, wherein each client request from the customer workstation is encrypted with a public key provided by the data management system, and each of the client requests includes an encrypted client cookie for client authentication.

32. The integrated data management system as claimed in claim 2, wherein the one or more client applications further includes a customer service application downloaded from the one or more secure servers for enabling a customer to generate trouble tickets to be processed by the enterprise; and, the one or more application servers further include a service application server for receiving requests for downloading customer's trouble ticket information to the customer workstation in response to a customer request, and for receiving information from the customer via the interface for generating new trouble tickets.

33. A method for enabling a customer to command and control one or more reporting and management applications relating to services and products offered by an enterprise via the public Internet, from a customer workstation employing a client browser and capable of receiving Web-based corrnunications from the enterprise, the method comprising the steps of:

managing one or more secure client sessions over the public Internet between the client browser and at least one secure server;

downloading and presenting Web-based GUI, from the secure server for initiating one or more client applications which provide user interfaces to the one or more reporting and management applications according to pre-determined customer entitlements, wherein the pre-determined customer entitlements include a subscription to one of the data management services;

processing customer requests received from the one or more client applications and providing responses from one or more remote application servers; and communicating the responses to the one or more client applications via the secure server for presentation to the customer at the customer workstation, whereby the customer is enabled at the customer site to command and control the one or more reporting and data management applications relating to services and products offered by the enterprise.

34. The method as claimed in claim 33, wherein the method further includes:

encrypting communications between the client browser and the secure server;

identifying and validating the customer; and linking the session with the customer.

35. The method as claimed in claim 33, wherein the step of processing customer requests further includes:

communicating through a firewall to at least one dispatch server to forward the customer requests to the one or more application servers using an internal network; and verifying system access by the dispatch server.

36. The method as claimed in claim 35, further comprising the step of:

exchanging digital certificates to authenticate the secure server to the client browser.

37. The method as claimed in claim 35, wherein the method further comprises:

downloading a backplane object with the Web-based GUI; and launching the backplane object which initiates the one or more client applications upon a selection by the customer, the backplane object further enabling inter-application communications among the client applications, wherein the backplane object and the client applications interoperate with one another to provide an integrated customer interface to the services and products subscribed by the customer.

38. The method as claimed in claim 37, wherein the method further includes the steps of:

downloading a logon object prior to the step of downloading the backplane object, the logon object for receiving a logon transaction from the customer and transmitting the logon transaction to an order entry server to authenticate the customer for access into the system, wherein upon a successful customer validation, the logon object sends a command to the one or more secure servers to download the Web-based GUI having the backplane object.

39. The method as claimed in claim 38, wherein the method further includes:

enabling the customer to enter orders over the Internet from the customer workstation for the one or more reporting and data management applications via the order entry server.

40. The method as claimed in claim 39, further comprising:

representing a current customer with a customer object, the customer object communicating with the order entry server to determine the customer entitlements to the one or more reporting and data management applications, wherein the backplane uses the entitlements to present via the Web-based GUI, only those Web-enabled services to which the current customer has privilege.

41. The method as claimed in claim 40, further comprising:

executing the one or more client applications directly by the backplane object when the customer selects a client application associated with a desired reporting and data management applications, the client application being run in a frame independent from a Web browser's window.

42. The method as claimed in claim 40, further comprising:

launching the one or more client applications from a new browser window retrieved by the backplane object.

43. The method as claimed in claim 40, wherein the method further comprises:

downloading a report requestor and a report viewer from the secure server to the customer workstation for presenting one or more customer-selectable data reporting items for the customer in accordance with the customer entitlements;

initiating communications between a report manager and the report requestor application; and enabling with the report viewer presentation of reports in accordance with customer-selected reporting options, the customer options specifying reporting views selected from graphical, tabular, and map views.

44. The method as claimed in claim 43, wherein the method further comprises the report manager:

maintaining an inventory of reports associated with the customer;

receiving a customer report request message via the Web-based GUI;

accessing report items according to the report request message; and generating a response message including a metadata description of reporting items to be presented in the report, wherein the customer-specific data from the one or more remote application servers and the metadata description of associated reporting items are utilized to generate a completed report for presentation by the report viewer to the customer.

45. The method as claimed in claim 44, wherein the method further comprises:

transmitting the reporting items for customization according to the customer entitlements to the report manager prior to generation of a report.

46. The method as claimed in claim 45, the method further comprising:

enabling with a report scheduler periodic generation of reports from the one or more remote application servers at a customer-specified frequency.

47. The method as claimed in claim 46, the method further comprising:

storing and maintaining with a centralized inbox server the customer-specific data from the one or more remote application servers, the customer-specific data including report data and notification data received from the one or more remote application servers, the centralized inbox server further storing a metadata description of the report data, downloading the report data and the metadata associated with the report data to the customer workstation via the secure server for generation of reports according to the metadata description, and for presentation of the generated reports to the customer via the Web-based GUI.

48. The method as claimed in claim 47, the method further comprising:

launching an inbox client application by the backplane;

retrieving customer-specific notification data which are stored in the centralized inbox server;

presenting the customer-specific notification data to the customer via the Web-based GUI.

49. The method as claimed in claim 48, the method further comprising:

launching the one or more reporting and management applications associated with the customer-specific notification data when the customer selects the notification data presented at the customer workstation.

50. The method as claimed in claim 48, the method further comprising:

detecting with a first polling thread of the inbox client application an incoming message from the inbox server via the secure server;

starting a second thread upon detection of the incoming message;

listening with the second thread for new messages; and receiving the incoming message upon detection by the first polling thread.

51. The method as claimed in claim 47, the method further comprising:

creating in an inbox database a pre-defined directory associated with each of the one or more remote application servers; and storing the customer-specific data to the respective pre-defined directory.

52. The method as claimed in claim 47, further including the steps of:

extracting data records from a billing system which generates records specific to products and services provided to the customer;

harvesting the extracted data records for storage in a database storage device; and communicating customer requests for data to a decision support server for accessing the customer-specific data from the database storage device and transmitting requested customer-specific data to the inbox server in accordance with the customer request.

53. The method as claimed in claim 52, further including the step of organizing the customer specific data according to a star schema topology to facilitate access thereof.

54. The method as claimed in claim 52, wherein the method further includes:

running a pre-defined report;

communicating a message from the report scheduler to the decision support server to run the pre-defined report at a pre-determined time, the pre-defined report being updated with the customer-specific data at the pre-determined time.

55. The method as claimed in claim 47, wherein the method further includes:

creating one or more invoice documents relating to the services and products offered by the enterprise;

downloading the one or more client applications from the secure server for enabling selection and presentation of invoice documents in accordance with the customer entitlements;

generating an invoice request message in response to customer selection of a specific invoice option and forwarding the invoice request message via the secure server to an invoice server; and maintaining a database of image files associated with the invoice documents;

accessing the database in response to the invoice request message and generating a response message for forwarding to the customer workstation via the secure server; and assembling the response message to include a customer selected invoice document in a form suitable for presentation via the Web-based GUI.

56. The method as claimed in claim 55, wherein the method further comprises:

imaging documents by defining key information necessary to retrieve documents from the one or more reporting and management applications; and loading the documents into an object database.

57. The method as claimed in claim 55, wherein the method further comprises:

storing index pointers in an index database, the index pointers pointing to the documents in the object database.

58. The method as claimed in claim 55, the method further including the step of:

generating a Web cookie at initial instance of client identification to link a session with the customer to verify the customer to the dispatch server at each transmission in the session.

59. The method as claimed in claim 58, wherein the step of generating the cookie is performed on a separate server from the secure server during an entitlements communications, after identification and authentication of the customer.

60. The method as claimed in claim 59, further including:

encrypting client identification, authentication and the session management cookie during each transmission.

61. The method as claimed in claim 60, wherein the method further includes:

managing sessions simultaneously with the session cookies for a plurality of system resource platforms.

62. The method as claimed in claim 61, the method further including:

encrypting transmissions of all customer data between the secure server and the dispatch server; and SSL encrypting transmissions of all customer data between the secure servers and the client browser.

63. The method as claimed in claim 61, further including:

encrypting each client request from the client browser with a public key; and including an encrypted client cookie with each of the client requests for client authentication.

* * * * *